(12) United States Patent
Lin

(10) Patent No.: US 12,477,060 B2
(45) Date of Patent: Nov. 18, 2025

(54) CALL PROMPT METHOD, CALL DEVICE, READABLE STORAGE MEDIUM, AND CHIP SYSTEM

(71) Applicant: Huawei Technologies Co., Ltd., Shenzhen (CN)

(72) Inventor: Nan Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 18/011,368

(22) PCT Filed: Mar. 11, 2021

(86) PCT No.: PCT/CN2021/080230
§ 371 (c)(1),
(2) Date: Dec. 19, 2022

(87) PCT Pub. No.: WO2022/001170
PCT Pub. Date: Jan. 6, 2022

(65) Prior Publication Data
US 2023/0328172 A1 Oct. 12, 2023

(30) Foreign Application Priority Data
Jun. 30, 2020 (CN) .......................... 202010618105.9

(51) Int. Cl.
*H04M 1/72469* (2021.01)
*H04M 1/72454* (2021.01)

(52) U.S. Cl.
CPC ... *H04M 1/72469* (2021.01); *H04M 1/72454* (2021.01)

(58) Field of Classification Search
None
See application file for complete search history.

(56) References Cited

U.S. PATENT DOCUMENTS

| 2005/0069117 | A1 | 3/2005 | Fernandez et al. |
| 2019/0116272 | A1* | 4/2019 | Freeman ............ H04N 1/00209 |
| 2020/0220977 | A1* | 7/2020 | Ravichandran ..... H04L 65/1093 |

FOREIGN PATENT DOCUMENTS

| CN | 104125324 A | 10/2014 |
| CN | 104917899 A | 9/2015 |
| CN | 105100512 A | 11/2015 |
| CN | 109151220 A | 1/2019 |
| CN | 109151227 A | 1/2019 |
| CN | 104618593 B | 10/2019 |

* cited by examiner

*Primary Examiner* — Frantz Bataille
(74) *Attorney, Agent, or Firm* — Slater Matsil, LLP

(57) ABSTRACT

This application provides a call prompt method, a call device, a readable storage medium, and a chip system. The method includes: enabling a call prompt mode; identifying a first audio feature of call audio received by the call device; determining a call state based on the first audio feature; and performing call prompting based on a call prompting manner corresponding to the call state.

20 Claims, 39 Drawing Sheets

CALL PROMPT METHOD, CALL DEVICE, READABLE STORAGE MEDIUM, AND CHIP SYSTEM

CROSS-REFERENCE TO RELATED APPLICATIONS

This application is a National Stage of International Application No. PCT/CN2021/080230, filed on Mar. 11, 2021, which claims priority to Chinese Patent Application No. 202010618105.9, filed on Jun. 30, 2020. Both of the aforementioned applications are hereby incorporated by reference in their entireties.

TECHNICAL FIELD

This application belongs to the call field, and in particular, to a call prompt method, a call device, a readable storage medium, and a chip system.

BACKGROUND

When a user uses a call device to make a call, a case of call waiting or user response waiting often occurs. For example, a user dials an operator service number and waits for a manual attendant to answer the call when the call is transferred to the manual attendant. Alternatively, when a user dials a bank service number, the user is waited to press a button to jump to a different feature menu. In the case of call waiting or user response waiting, the user can only stick the call device to an ear to listen to prompt information to determine an end of the call waiting or to determine an action for response.

In the conventional technology, call audio may be played by using an external call apparatus, such as a headset, a Bluetooth headset, or a Bluetooth speaker. In this way, when the case of call waiting or user response waiting occurs, the user may listen to the prompt information by using the external call apparatus.

However, if the user does not use the external call apparatus, when the case of call waiting or user response waiting occurs, the user can still only hold the call device to the ear to listen to the prompt information, resulting in inconvenience for the user to operate, and affecting the user to carry out other work.

SUMMARY

Embodiments of this application provide a call prompt method, a call device, a readable storage medium, and a chip system, to reduce an inconvenient operation of a user and an influence on other work of the user that are caused because the user can only hold a call device to an ear for prompt information listening when a case of call waiting or user response waiting occurs and the user does not use an external call apparatus.

To achieve the foregoing objective, this application uses the following technical solutions.

According to a first aspect, an embodiment of this application provides a call prompt method. The call prompt method is executed by an electronic device, and the electronic device may be a call device with a call capability. For example, the call device includes a smartphone, a smart phone booth, a tablet computer with a call capability, a wearable device, a vehicle-mounted computer, or the like.

In the first aspect, the call prompt method includes: enabling a call prompt mode; identifying a first audio feature of received call audio; determining a call state based on the first audio feature; and performing call prompting based on a call prompting manner corresponding to the call state.

In an implementation, the enabling a call prompt mode indicates that call prompting needs to be performed for an ongoing call. In this case, the call device may determine the call state based on the first audio feature of the received call audio. In some implementations, types of the call state include: a call waiting state, a response waiting state, or a call failed state. It should be noted that, if a voice is identified in the call audio, the first audio feature may be a keyword in the received call audio, for example, "please wait" or "please press". If no voice is identified in the call audio, the call audio may include music, a phone signal tone, and the like. In this case, the first audio feature may be a recognized type of pure music or a phone signal tone, for example, a call connection tone, an occupation tone, or a call waiting tone. Each call state corresponds to a plurality of first audio features. After the corresponding audio feature is identified, the current call state may be determined based on the audio feature. Each call state includes different call prompting manners. For example, in the call waiting state, after a keyword indicating that waiting ends is identified, the user may be prompted in manners of vibration, prompt information displaying, and the like, to answer the call. In the response waiting state, prompt information including to-be-responded content may be displayed, or a button associated with the to-be-responded content may be provided to prompt the user to make a response.

The call device prompts the user based on different call states, so that the user can receive prompt information in a timely manner without using an external call apparatus or sticking the call device to an ear for answering. Therefore, hands can be freed to perform other work, and an operation is more convenient and free, thereby effectively improving call experience of the user.

In some implementations, the enabling a call prompt mode includes: if a preset operation entered by the user is received, enabling the call prompt mode, or if an automatic enabling condition is met, enabling the call prompt mode.

The call prompt mode is automatically enabled, or the call prompt mode is enabled based on a preset operation input by the user, so that a call prompt service can be provided more flexibly. This improves user experience when the user uses the call prompt service.

In some implementations, that a preset operation entered by the user is received includes: receiving a touch operation applied to a virtual button having a function of enabling a call prompt mode; or receiving a button operation applied to a preset physical button; or receiving a preset operation gesture.

The virtual button having a function of enabling a call prompt mode may be a virtual button in a graphical interface displayed on a touchscreen of the electronic device. Alternatively, the virtual button may be a sensing area on the electronic device. For example, a touch sensor is added to an area of the electronic device, and after the touch sensor senses a touch, the call prompt mode is enabled. The button operation applied to a preset physical button may include, for example, double-clicking a "volume-" button, or simultaneously pressing "volume+" and "volume-" buttons. The preset operation gesture may be a graphic, a character, a special operation gesture, or the like, drawn on the touchscreen of the electronic device. For example, "Z" or "S" is written on the touchscreen, or the touchscreen is tapped three times with a knuckle.

In some implementations, that an automatic enabling condition is met includes: determining that the user does not listen to the call audio; or identifying that a called number of a call is a preset enabling number.

In a case in which the user does not listen to the call audio or the called number is the preset enabling number, there is a high probability that a call prompt function is required. Therefore, when it is detected that the user does not listen to the call audio or the called number is the preset enabling number, the call prompt mode is automatically enabled, which can better provide a call prompt service for the user, and improve user experience.

In some implementations, the determining that the user does not listen to the call audio includes: determining that an external call apparatus is not enabled to play the call audio, and identifying that the user does not listen to the call audio by using an audio listening device of the electronic device.

The external call apparatus may be a device such as a wired headset, a wireless headset, a smart screen, or an intelligent speaker. The determining that an external call apparatus is not enabled to play the call audio includes determining that the electronic device is not connected to any external call apparatus. Alternatively, the electronic device is connected to an external call apparatus, but the call audio is not played by using the connected external call apparatus.

In some embodiments, the audio listening device includes a receiver and a speaker.

The identifying that the user does not listen to the call audio by using an audio listening device of the electronic device includes: determining that the user does not listen to the call audio by using the receiver, and determining that the user does not listen to the call audio by using the speaker.

In some implementations, the determining that the user does not listen to the call audio by using the receiver includes: obtaining a distance between the receiver and a face of the user, and if the distance is greater than a preset threshold, determining that the user does not listen to the call audio by using the receiver.

The distance between the receiver and the face of the user may be obtained by using a sensor disposed near the receiver. For example, the distance may be obtained by using a distance sensor. Alternatively, luminance is obtained by using a light sensor. If the obtained luminance is greater than a preset luminance value, it may be determined that the distance between the receiver and the face of the user is greater than a preset threshold. Alternatively, an image may be obtained by using a front camera. If a proportion of a face image in the image is less than a preset proportion value, it may be determined that a distance between the receiver and the face of the user is greater than a preset threshold.

In some implementations, the determining that the user does not listen to the call audio by using the speaker includes: reading audio play setting information of the electronic device; and if the call audio is not played by using a speaker in the audio play setting information, determining that the user does not listen to the call audio by using the speaker.

In some implementations, after the enabling a call prompt mode, the method further includes: reading setting information of a preset call prompt mode.

In some implementations, the setting information includes keyword information. The identifying a first audio feature of received call audio includes: identifying the first audio feature of the received call audio based on the keyword information included in the setting information.

In some implementations, the setting information includes preset operation information. After the enabling a call prompt mode, the method further includes performing a preset operation based on the preset operation information.

The preset operation may be automatic dialing, automatic redialing, or the like.

In a possible implementation, the call state is a call waiting state. The performing call prompting based on a call prompting manner corresponding to the call state includes: if a second audio feature indicating that the call waiting state ends is identified in the call audio, performing answer prompting, where the answer prompting is used to indicate the user to answer the call.

In some implementations, if it is determined that the first audio feature includes the audio feature of call waiting, it may be determined that the call state is the call waiting state. For example, the audio feature indicating call waiting may include a keyword indicating call waiting, such as "queue", "wait", "later", or "do not hang up".

In the call waiting state, if it is identified that the call audio includes the second audio feature, for example, a keyword indicating that the call waiting state ends, such as "Hi", "Hello", "Mr.", and "Ms.", the user is prompted to answer the call. In this way, the user does not need to stick the call device to the ear for answering, and can answer the call in time after the call waiting ends, thereby improving call experience of the user.

In some implementations, after it is determined that the call state is the call waiting state, if a third audio feature indicating a response waiting state is identified in the call audio, it is determined that the call state is switched from the call waiting state to the response waiting state.

Correspondingly, the performing call prompting based on a call prompting manner corresponding to the call state includes: performing operation prompting based on the third audio feature, where the operation prompting is used to prompt the user to perform call responding.

The third audio feature may be keywords used to indicate the user to respond, such as "please press", "please dial", and "please say". In the call waiting state, it is determined that the call state is the response waiting state by identifying the third audio feature, so that the call device can flexibly switch between the call waiting state and the response waiting state. Application is more flexible, an application scope is wider, and an effect of the call prompting is more user-friendly.

In some implementations, the call state is a response waiting state.

The performing call prompting based on a call prompting manner corresponding to the call state includes: performing operation prompting based on the first audio feature. The operation prompting is used to prompt the user to perform call responding.

In the response waiting state, the user is prompted to respond based on the obtained first audio feature or the obtained third audio feature. In this way, the user can determine content that needs to be responded and respond without always sticking the call device to the ear to answer the call, so that hands of the user can be freed, and an operation is more convenient.

In some implementations, after the performing operation prompting, the method further includes: receiving a response operation of the user; and performing an operation indicated by the response operation.

For example, the operation prompting is used to indicate the user to press a button, and after receiving a response (that is, a button operation) from the user, an operation corresponding to the button is performed.

In some implementations, the call state is a call failed state.

The performing call prompting based on a call prompting manner corresponding to the call state includes: perform call failed prompting, and perform a hang-up operation or a redial operation.

In some implementations, when the first audio feature includes a call failed audio feature, it may be determined that the call state is the call failed state. The call failed audio feature includes keywords such as "call failed", "does not exist", and "Please dial again later" indicating the call failed.

In a possible implementation, it may be first determined whether there is a preset redial operation, and if there is the preset redial operation, the redial operation is performed. If there is no preset redial operation, a hang-up operation is performed.

It should be noted that, when the redial operation is performed, a corresponding redialing manner may be selected based on the call failed audio feature. For example, when the unreachable audio feature is "call failed" or "Please try again later", redial can be performed continuously until redial stops. When the call failed audio feature is "does not exist", if the call failed audio feature is still "does not exist" after three redials, redial may be stopped and the user is prompted that a dialed number does not exist.

When the call state is the call failed state, it indicates that the called call device is temporarily unreachable. In this case, call failed prompting may be performed. For example, the user is notified that the call failed through voice, vibration, or display of a prompt text. A hang-up operation or a redial operation is performed to reduce a number of operations performed by the user and further improve operation convenience.

In some implementations, after the call device enters the corresponding call state based on the audio feature, the method further includes: if it is identified that the call device meets a termination condition of the call prompt mode, terminating the call prompting.

In some implementations, that it is identified that the call device meets a termination condition of the call prompt mode includes: identifying, during a call, a mid-call prompt termination instruction; or identifying, during a call, that the user starts to listen to the call audio.

In some implementations, the terminating the call prompt mode includes: if it is identified that the call device enables the external call apparatus to play the call audio, or it is identified that the user listens to the call audio by using the audio listening device of the call device, terminating the call prompt mode.

According to a second aspect, an embodiment of this application provides a call prompt apparatus, applied to an electronic device, and the apparatus includes:
  an enabling module, configured to enable a call prompt mode; an identification module, configured to identify a first audio feature of received call audio; a determining module, configured to determine a call state based on the first audio feature; and a prompting module, configured to perform call prompting based on a call prompting manner corresponding to the call state.

In some implementations, the enabling module is specifically configured to: if a preset operation entered by the user is received, enable the call prompt mode, or if an automatic enabling condition is met, enable the call prompt mode.

In some implementations, the enabling module is specifically configured to: receive a touch operation applied to a virtual button having a function of enabling a call prompt mode; or receive a button operation applied to a preset physical button; or receive a preset operation gesture.

In some implementations, the enabling module is specifically configured to: determine that the user does not listen to the call audio; or identify that a called number of a call is a preset enabling number.

In some implementations, the enabling module is specifically configured to: determine that an external call apparatus is not enabled to play the call audio, and identify that the user does not listen to the call audio by using an audio listening device of the electronic device.

In some embodiments, the audio listening device includes a receiver and a speaker. The enabling module is specifically configured to: determine that the user does not listen to the call audio by using the receiver, and determine that the user does not listen to the call audio by using the speaker.

In some implementations, the enabling module is specifically configured to: obtain a distance between the receiver and a face of the user, and if the distance is greater than a preset threshold, determine that the user does not listen to the call audio by using the receiver.

In some implementations, the enabling module is specifically configured to read the audio play setting information of the electronic device. If the call audio is not played by using a speaker in the audio play setting information, it is determined that the user does not listen to the call audio by using the speaker.

In some implementations, the apparatus further includes a reading module, configured to read setting information of the preset call prompt mode.

In some implementations, the setting information includes keyword information. The identification module is specifically configured to identify the first audio feature of the received call audio based on the keyword information included in the setting information.

In some implementations, the setting information includes preset operation information. The apparatus further includes an execution module, configured to perform a preset operation based on the preset operation information.

In a possible implementation, the call state is a call waiting state. The prompting module is specifically configured to: if a second audio feature indicating that the call waiting state ends is identified in the call audio, perform answer prompting, where the answer prompting is used to indicate the user to answer the call.

In some implementations, if it is determined that the first audio feature includes the audio feature of call waiting, it may be determined that the call state is the call waiting state.

In some implementations, the identification module is further configured to: after it is determined that the call state is the call waiting state, if a third audio feature indicating a response waiting state is identified in the call audio, determine that the call state is switched from the call waiting state to the response waiting state.

Correspondingly, the prompting module is specifically configured to perform operation prompting based on the third audio feature, where the operation prompting is used to prompt the user to perform call responding.

In some implementations, the call state is a response waiting state.

The prompting module is specifically configured to perform operation prompting based on the first audio feature. The operation prompting is used to prompt the user to perform call responding.

In some implementations, the apparatus further includes a response module, configured to: receive a response operation of the user; and perform an operation indicated by the response operation.

In some implementations, the call state is a call failed state.

The prompting module is specifically configured to: perform call failed prompting, and perform a hang-up operation or a redial operation.

In some implementations, the identification module is specifically configured to: if it is identified that the call device meets a termination condition of the call prompt mode, terminate the call prompting.

In some implementations, the identification module is specifically configured to identify, during a call, a mid-call prompt termination instruction; or identify, during a call, that the user starts to listen to the call audio.

In some implementations, the identification module is specifically configured to: if it is identified that the call device enables the external call apparatus to play the call audio, or it is identified that the user listens to the call audio by using the audio listening device of the call device, terminate the call prompt mode.

According to a third aspect, an embodiment of this application provides a call device, including: a memory, a processor, and a computer program that is stored in the memory and that can be run on the processor. When the processor executes the computer program, the method according to the first aspect is implemented.

According to a fourth aspect, an embodiment of this application provides a computer-readable storage medium. The computer-readable storage medium stores a computer program. When the computer program is executed by a processor, the method according to the first aspect is implemented.

According to a fifth aspect, an embodiment of this application provides a computer program product. When the computer program product runs on a terminal device, the terminal device performs the method according to the first aspect.

According to a sixth aspect, an embodiment of this application provides a chip system. The chip system includes a memory and a processor. The processor executes a computer program stored in the memory, to implement the method according to the first aspect.

According to a seventh aspect, an embodiment of this application provides a chip system. The chip system includes a processor, the processor is coupled to the computer-readable storage medium according to the fourth aspect, and the processor executes the computer program stored in the computer-readable storage medium, to implement the method according to the first aspect.

It should be understood that, for beneficial effects of the second aspect to the seventh aspect, refer to related descriptions in the first aspect. Details are not described herein again.

DETAILED DESCRIPTION OF ILLUSTRATIVE EMBODIMENTS

Figure 1:
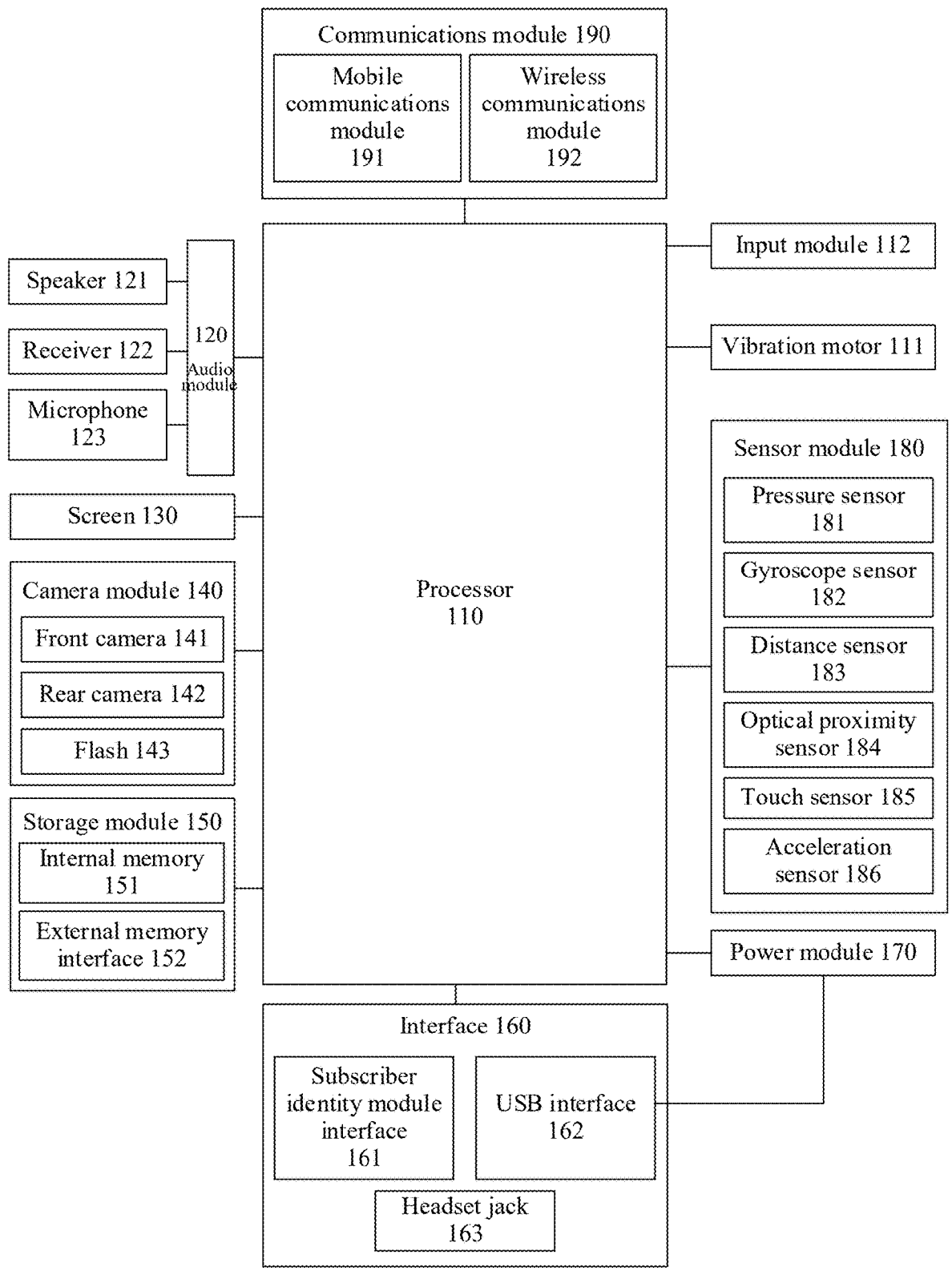
FIG. 1 is a system module diagram of a call device according to an embodiment of this application.

In the following descriptions, for illustration instead of limitation, specific details such as a particular system structure and a technology are provided to make a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, the term "if" may be interpreted as "when", "once", "in response to determining", or "in response to detecting" depending on the context. Similarly, the phrase "if it is determined" or "if it is identified" may be interpreted as meaning "once it is determined" or "in response to determination" or "once it is identified" or "in response to identification" depending on the context.

In addition, in the descriptions of the specification and appended claims of this application, the terms "first", "second", "third", and the like are merely intended for distinction and description, but shall not be understood as an indication or an implication of relative importance.

Refer to "an embodiment", "some embodiments", or the like in the specification of this application indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The call prompt method provided in embodiments of this application may be applied to a call device such as a mobile phone, a tablet computer with a call function, a wearable device, a vehicle-mounted device, a personal digital assistant (personal digital assistant, PDA), or a desktop computer or a laptop computer on which a voice over internet protocol (Voice over Internet Protocol) phone is installed. For example, the call device may be a smartphone, a smart landline phone, a smart phone booth, a smartwatch with an embedded subscriber identity module (embedded Subscriber Identity Module, eSIM) card, or a vehicle-mounted computer with a call function. A specific type of the call device is not limited in embodiments of this application.

FIG. 1 is a structural diagram of a call device to which a call prompt method according to this application can be applied.

Refer to FIG. 1. The call device includes components such as a processor 110, a vibration motor 111, an input module 112, an audio module 120, a screen 130, a photographing module 140, a storage module 150, an interface 160, a power module 170, a sensor module 180, and a communications module 190. A person skilled in the art may understand that the call device structure shown in FIG. 1 does not constitute a limitation on the call device, components more or fewer than those shown in FIG. 1 may be included, some components may be combined, or the components may be arranged in a different way.

The following specifically describes the components and modules of the call device with reference to FIG. 1.

The processor 110 is a control center of the call device, may be connected to various parts of the call device by using various interfaces and lines, and runs or executes a software program and/or a module stored in the storage module 150 and invokes data stored in the storage module 150 to perform various functions of the call device and process data to prompt a call.

In some implementations, the processor 110 may include one or more processing units. For example, the processor may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic component, a discrete gate or a transistor logic device, a discrete hardware component, or the like.

In still some implementations, the processor 110 may integrate an application processor and a modem processor. The application processor mainly processes an operating system, a user interface, an application program, and the like, and the modem processor mainly processes wireless communication. It may be understood that the modem processor may not be integrated into the processor 110. This is not limited in this application.

The vibration motor 111 may vibrate upon receiving a signal to prompt in a form of vibration.

The input module 112 may be configured to receive input information and a button signal, where the input information includes digital or character information, touch information, and the like, and the button signal includes a pressing signal of a physical button, a pressing signal of a virtual button, and the like.

In an implementation, the input module 112 may include a touch panel and another input device. The touch panel and the screen 130 may form a touchscreen, and the touch panel may collect a touch operation performed by a user on or near the touch panel, (for example, an operation performed by the user on or near the touch panel by using an object or accessory that can generate a touch signal on the touch panel, such as a finger or a stylus) and is driven to execute the corresponding function based on a preset program. Optionally, the touch panel may include two parts: a touch detection apparatus and a touch controller. The touch detection apparatus detects a touch position of a user, detects a signal generated by a touch operation, and transmits the signal to the touch controller. The touch controller receives touch information from the touch detection apparatus, converts the touch information into touch point coordinates, and then sends the touch point coordinates to the processor 110. The processor 180 receives the sent touch point coordinates, converts the touch information into a touch control instruction, and executes the touch control instruction. The touch panel may be implemented in a plurality of types, such as a resistive type, a capacitive type, an infrared type, and a surface acoustic wave type. The another input device may include but is not limited to one or more of a physical keyboard, a function button (such as a volume control button or a power button), a trackball, a mouse, a joystick, and the like.

The audio module 120 is connected to an audio listening device and an audio receiving device, and is configured to process an audio signal. The audio listening device includes a speaker 121 and a receiver 122, and the audio receiving device includes a microphone 123. For example, the audio module 120 may convert an analog audio signal received by the microphone 123 into digital audio data, and send the digital audio data to the processor 110. Alternatively, digital audio data sent by the processor 110 is converted into an analog signal that can be played by the speaker 121 and the receiver 122, and the analog signal is sent to the speaker 121 or the receiver 122, to play audio.

The screen 130 is configured to display, by using visual output, content output by the calling device. For example, information input by the user may be displayed, information provided for the user may be displayed, and a system interface of the call device and an interface of an application program running on the call device may be displayed. A material of a display panel of the screen 130 may be a liquid crystal display (Liquid Crystal Display, LCD), a thin film transistor (Thin Film Transistor, TFT), a light-emitting semiconductor (Light-Emitting Diode, LED), an organic light emitting semiconductor (Organic Light-Emitting Diode, OLED), or the like. This is not limited herein.

In some implementations, the touch panel may cover the display panel of the screen. After detecting the touch operation on or near the touch panel, the touch panel transfers the touch operation to the processor 110, to determine a type of a touch event. Subsequently, the processor 110 provides a corresponding visual output on the display panel based on the type of the touch event. Although the screen and the touch panel (not shown) in FIG. 1 are two components that are independent of each other to implement input and input functions of a mobile phone, in some implementations, the touch panel and the display panel may be integrated to implement the input and output functions of the mobile phone. After being integrated with the screen, the touch panel may be used as a touchscreen. The touchscreen may receive a touch signal on the touch panel and feedback the touch signal to the processor 110. The processor 110 responds based on the touch signal, and displays a result obtained after the response on the display panel of the screen.

The photographing module 140 includes at least one camera, and the camera may be a front camera 141 or a rear camera 142.

For example only, the call device may have a single camera, a dual camera, a triple-lens camera, or a quad-lens camera. For example, when the call device has a quad-lens camera, one camera is a front camera 141, and three are rear cameras 142. The three rear cameras 142 may be camera with different focal lengths, such as a primary camera with an equivalent focal length of 35 mm, a wide-angle camera with an equivalent focal length of 20 mm, and a long-focus camera with an equivalent focal length of 105 mm. This is not limited in embodiments of this application.

It should be noted that when the call device includes a plurality of cameras, all of the plurality of cameras may be front, or rear, or some of the cameras may be front, and the other cameras may be rear. This is not limited in embodiments of this application.

The storage module 150 includes an internal memory 151 and an external memory interface 152. The internal memory 151 may be a flash memory, a hard disk, an operational memory, or the like. For example, the internal memory may include at least one hard disk or flash memory, and one operational memory. The external memory interface 152 is configured to connect to an external memory. The external memory may include a memory card, a removable hard disk, a USB flash drive, an optical disc, and the like.

The storage module 150 may be configured to store a software program and a module. The processor 110 performs various function applications of the call device and data processing by running the software program and the module that are stored in the storage module 150. The storage module 150 may mainly include a program storage area and a data storage area. The program storage area is usually located on the internal memory 151, and may store an operating system and an application program (such as a sound playing function and a touch response function) required by at least one function. The data storage area may be located on the internal memory 151, or on the external memory connected to the external memory interface 152, or on both the internal memory and the external memory. The data storage area may store data (such as audio data, image data, and video data) created based on use of the mobile phone.

The interface 160 includes but is not limited to a subscriber identity module (Subscriber Identity Module, SIM) card interface 161, a USB interface 162, and a headset interface 163. The SIM card interface is configured to insert a SIM card provided by an operator, so that when communicating with a base station by using a mobile communications module 191, the call device identifies and verifies an identity of a user, and after the verification succeeds, sends a call request and a data request to the base station, and receives a call, data, a short message, and the like, forwarded by the base station.

The USB interface 162 may connect the call device to a computer by using a USB data cable, to exchange data. In addition, the USB interface 162 is further connected to the power module 170. When a USB data cable is connected to a computer or a charging jack, input electric energy may be transmitted to the power module 170 to charge the call device. The USB interface 162 may be a micro-USB interface, a mini-USB interface, a USB Type-c interface, or the like. This is not limited herein.

The headset interface 163 is configured to connect a headset. The headset interface 163 may be an independent interface. For example, the headset interface 163 may be a 3.5 mm headset jack. Alternatively, the headset interface 163 may be further integrated into the USB interface 162. For example, the headset interface may be integrated into a USB Type-c interface. When a headset is inserted into the headset interface 163, the audio module 120 may no longer send an output analog audio signal to the speaker 121 or the receiver 122, but send the output analog audio signal to the headset through the headset interface 163, and the audio is played by using the headset. When the headset is inserted, if it is detected that the headset does not include a microphone, in this case, the audio module still receives an analog audio signal sent by the microphone 123. If it is detected that the headset includes a microphone, the audio module receives an analog audio signal sent by the headset microphone, processes the analog audio signal, and sends a processed analog audio signal to the processor 110.

The call device further includes the power module 170 that supplies power to each component. The power module may include a battery, a power management module, and the like. The power management module may be logically connected to the processor 110, so that functions such as battery charging and discharging management and power consumption management are implemented by using the power management module.

The call device may further include the sensor module 180. The sensor module includes at least one sensor, for example, a pressure sensor 181, a gyroscope sensor 182, a distance sensor 183, an optical proximity sensor 184, a touch sensor 185, or an acceleration sensor 186. Specifically, the optical proximity sensor 184 may include an ambient light sensor and a proximity sensor. The ambient light sensor may adjust luminance of a display panel 141 based on brightness of ambient light. The proximity sensor may power off the display panel and/or backlight of the screen 130 when the mobile phone moves to an ear. As one type of motion sensor, the acceleration sensor 186 may detect magnitudes of accelerations in various directions (generally three axes), and may detect magnitudes and directions of gravity when the device is still, may be configured to identify a posture of the call device (for example, picking up or dropping the call device, or placing the call device horizontally or vertically), and may be further configured to identify a related action (for example, step counting or tapping) by vibration. Other sensors of the call device are not described herein.

The communications module 190 may include a mobile communications module 191 and a wireless communications module 192. The mobile communications module 191 may support any communications standard or protocol, including but not limited to a global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), time-division multiplexing WCDMA (Time-Division WCDMA, TD-WCDMA), time-division multiplexing LTE (Time-Division LTE, TD-LTE), the fifth generation new radio (the 5th generation New Radio, 5G NR), and the like. The wireless communications module 192 may support Bluetooth (Bluetooth), Wireless Fidelity (Wireless Fidelity, Wi-Fi), Near Field Communication (Near Field Communication, NFC), and the like.

The mobile communications module 191 may be configured to connect to a communications base station by using an antenna, to establish a call link between the call device and another call device, and receive call audio. The wireless communications module 192 is configured to be wirelessly connected to an external call apparatus, where the external call apparatus may be an external apparatus that has functions of playing and receiving voices, such as a Bluetooth headset or a Bluetooth speaker. When the external call apparatus is connected to the call device by using the wireless communications module 192, the external call apparatus may play audio by using the external call apparatus, receive an analog audio signal collected by the external call apparatus, process the analog audio signal, and send the analog audio signal to the processor 110.

In a call process, the mobile communications module 191 sends received call audio data to the processor 110 for processing, and the processor 110 may implement the call prompt method provided in this application by running a software program stored in the storage module 150.

Figure 2:
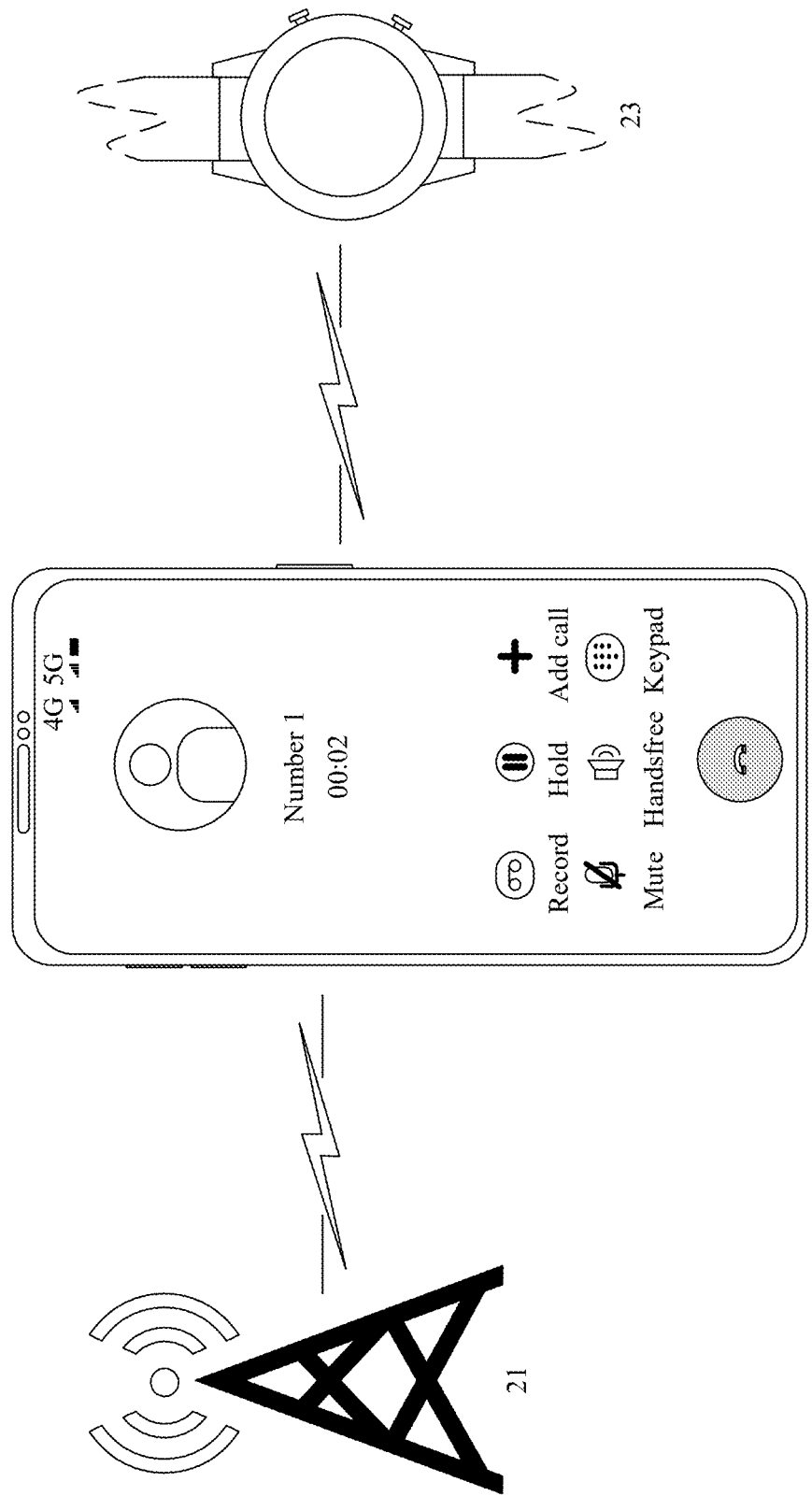
FIG. 2 is a diagram of an application scenario of a call prompt method according to an embodiment of this application.

FIG. 2 is a schematic diagram of an application scenario of a call prompt method. In this scenario, an example in which a call device is a smartphone is used for description.

Refer to FIG. 2. The scenario includes a base station 21, a smartphone 22, and a smartwatch 23. For a structure of the smartphone 22, refer to the structure of the call device in FIG. 1. The smartphone 22 is communicatively connected to the base station 21 by using a mobile communications module. When the smartphone 22 dials a number (a number 1), the smartphone 22 sends the number 1 to the base station 21 that is communicatively connected to the smartphone 22, and the base station 21 establishes, based on the number 1, a call channel between the smartphone 22 and a call device corresponding to the number 1, so that the smartphone 22 can make a call with the call device corresponding to the number 1. The smartphone 22 may be connected to the smartwatch 23 by using Bluetooth. The smartwatch 23 may receive call prompt information sent by the smartphone 22, and display a call prompt. When the call prompt needs to be responded by a user, the smartwatch 23 may be further configured to perform touch selection, to respond to the call prompt.

It should be noted that the smartwatch 23 connected to the smartphone 22 is only an example, and does not necessarily exist. The smartwatch 23 may not be connected to, or may be replaced with another device. For example, the smartphone 22 may be further connected to a device such as a Bluetooth headset, a smart band, a smart speaker, or a smart display.

In the foregoing scenario, after the smartphone 22 is connected to a device that can be used as an external call apparatus, such as a headset, a Bluetooth headset, or a smart speaker, if call waiting or response waiting occurs, call audio may be played by using the external call apparatus. This enables the user to receive the prompt information and determine when waiting ends or how to respond.

However, when no device that can be used as the external call apparatus is connected and it is inconvenient for the user to hold the call device to answer the call continuously, the user can only clamp the call device between a face and a shoulder or listen to whether the waiting ends at a specific interval. Clamping the call device between the face and the shoulder may cause the call device to fall down and be damaged. Listening at the specific interval is complex in operation and may cause the user to miss a time point to answer the call. As a result, the call cannot be answered in a timely manner after the call waiting ends.

In view of this, this application provides a call prompt method, to perform call prompting for a user when call audio is not played by using an external call apparatus or an audio listening device of a call device, so that the user can receive prompt information, and answer a call in a timely manner or respond to the call.

Figure 3:
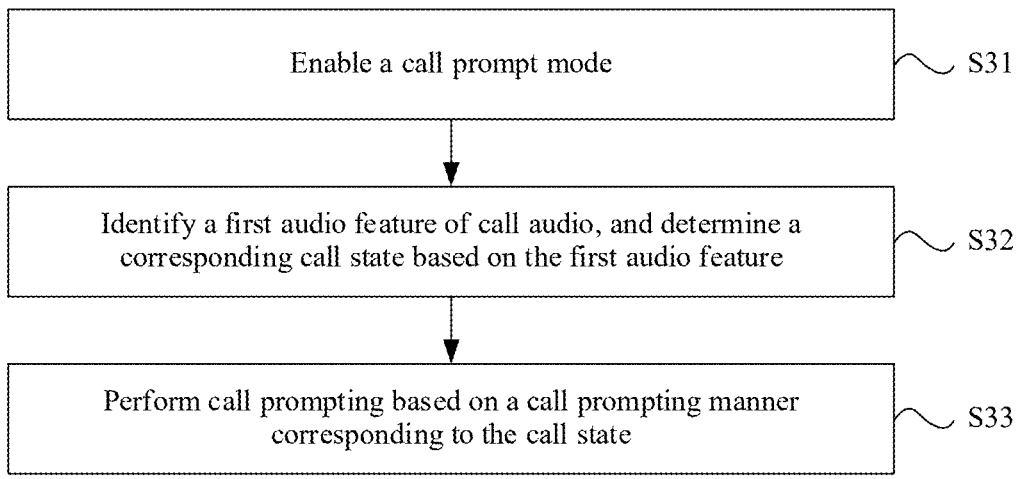
FIG. 3 is a schematic flowchart of a prompt method according to an embodiment of this application.

FIG. 3 is a schematic flowchart of a call prompt method according to an embodiment of this application. The method may be applied to the foregoing call device.

Refer to FIG. 3. The method includes:

S31: Enable a call prompt mode.

In some implementations, when the call prompt mode is enabled, setting information of the call prompt mode may be first read, and the call prompt mode is enabled based on the setting information. The setting information of the call prompt mode includes setting information about whether the call prompt mode is enabled, preference information during call prompting, and the like. When establishing a call connection, the call device may determine, based on the read setting information of the call prompt mode, whether the call prompt mode is enabled, and a manner in which call prompting is performed after the call prompt mode is enabled.

The call device enables the call prompt mode, and the call prompt mode may be enabled when the call device meets an enabling condition of the call prompt mode.

Figure 23:
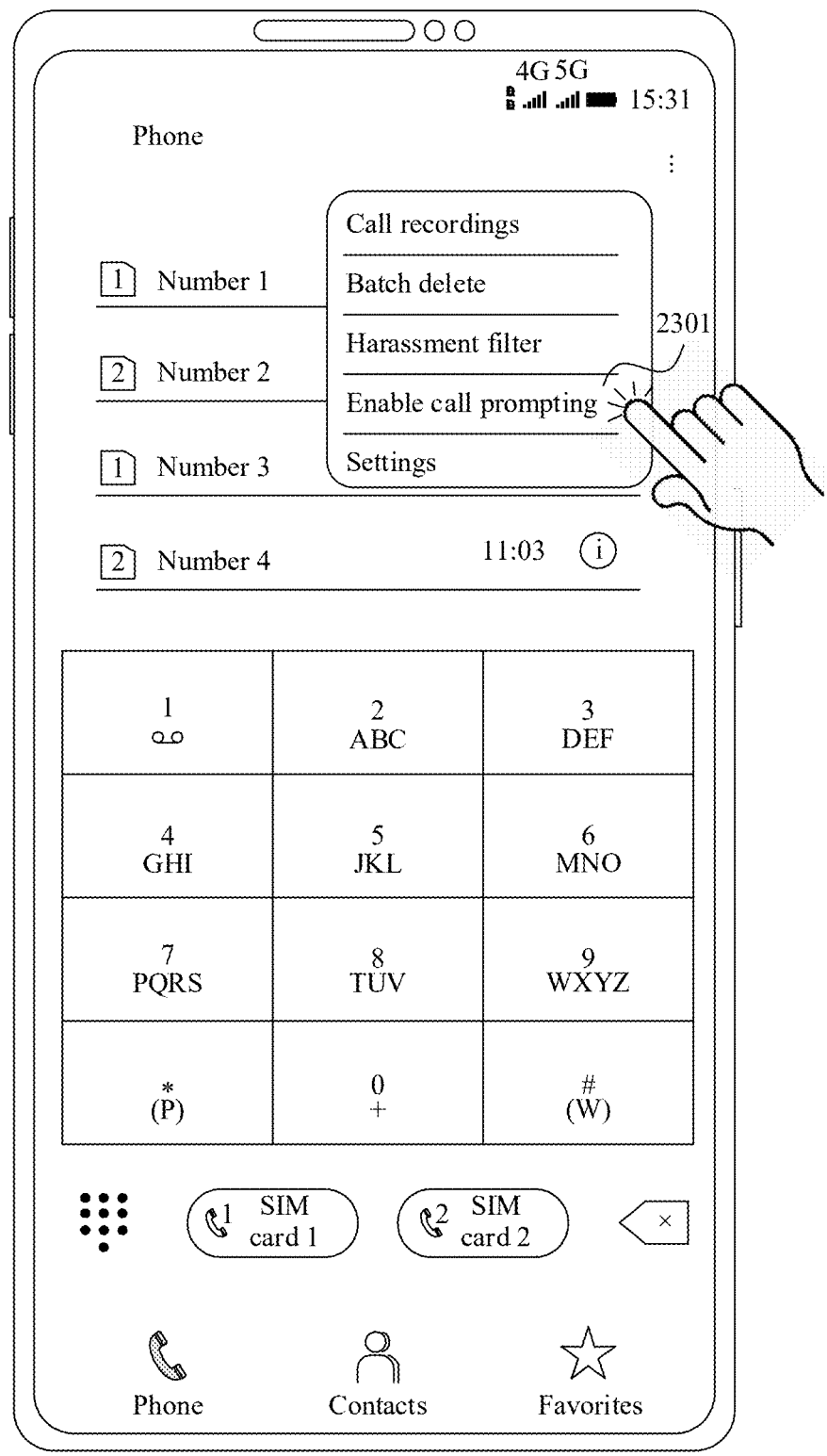
FIG. 23 is a schematic diagram of an interface when a call prompt method is applied according to another embodiment of this application.

There are at least two cases in which the enabling condition of the call prompt mode is met. In some embodiments, when detecting that a user enters a preset operation, the call device enables the call prompt mode. In other words, the call device enables the call prompt mode in response to the user operation. The operation may be a touch operation, or may be that the user taps a physical button, or may be a specific gesture, a body action, or the like. In some other embodiments, the user may further enable the call prompt mode by using a voice. For example, refer to FIG. 17. The operation may be that the user taps a call prompt button 1701. For another example, refer to FIG. 23. The operation may be that the user taps a call prompt enabling button 2301. It may be understood that a specific implementation of the operation is not limited in this embodiment of this application.

In some other embodiments, if an automatic enabling condition is met, the call device may automatically enable the call prompt mode. That an automatic enabling condition is met includes at least two cases. One case is determining that the call device meets a preset enabling condition, for example, it is detected that the user does not listen to call audio during a call. For example, it is identified that the call device does not enable an external call apparatus to a play call audio, and it is identified that the user does not listen to the call audio by using an audio listening device of the call device. The external call apparatus may be a wired headset or a Bluetooth headset. The audio listening device of the call device may be a speaker, a receiver, or the like. For example, refer to an application scenario in FIG. 2. A smartphone is connected to a smartwatch, and handsfree is not enabled on the smartphone. In this case, if the user does not stick the call device to an ear for answering, the call device meets the condition for enabling the call prompt. Alternatively, if it is detected that a called number is a preset enabling number, the call device meets the condition for enabling the call prompt. The preset enabling number may be an emergency number, for example, 110, 119, or a preset operator service number. This is not limited herein.

In some implementations, when it is identified that the call device does not enable an external call apparatus to play the call audio, whether the call device is connected to the external call apparatus may be first determined in a manner of detecting load of a headset interface, obtaining a wireless device list, or the like. If there is an external call apparatus, a setting option that is for outputting audio and that is of the call device further needs to be read, to determine whether the external call apparatus is used to play the call audio.

That it is identified that the user does not listen to the call audio by using an audio listening device of the call device includes: identifying that the user does not listen to the call audio by using the speaker, and identifying that the user does not listen to the call audio by using the receiver. For the identifying that the user does not listen to the call audio by using the speaker, whether the call device plays the call audio by using the speaker may be determined by reading the setting option that is for outputting audio and that is of the call device. If the call device does not play the call audio by using the speaker, it needs to be continuously identified that the user does not listen to the call audio by using the receiver. In some implementations, it may be determined, by detecting whether the receiver is close to an ear, whether the user listens to the call audio by using the receiver. For example, a sensor disposed near the receiver is used to detect whether the receiver is close to a face, and if the receiver is close to the face, it is determined that the user listens to the call audio by using the receiver.

The other case is that the call prompt mode is enabled by default before delivery of the call device. In this case, as long as no instruction for disabling the call prompt mode is received, the call prompt mode is kept enabled during each call.

S32: Identify a first audio feature of the call audio, and determine a corresponding call state based on the first audio feature.

In some implementations, the first audio feature is used to determine the call state. The call state includes a call waiting state, a response waiting state, or a call failed state. The call waiting state indicates that a peer party does not answer the call temporarily or the peer party cannot answer the call temporarily although the call is connected, and there is a need to wait for the peer party to answer or respond to the call. For example, when a user dials a customer service number and the call is transferred to a manual service, the user waits for a manual attendant to answer the call. Alternatively, when a user makes a call, the user waits a peer party to answer the call.

The response waiting state is state of waiting for a user to input a response instruction (for example, a button instruction or a voice instruction), for example, waiting for the user to input button information. For example, when a user dials a service number, a voice answering robot of a peer party indicates that "Please say the problem you want to resolve". In this case, there is a need to wait for the user to input a voice instruction, such as "Perform warranty" or "Check phone bill". Alternatively, when a user dials a service number, if a voice answering robot of a peer party indicates that "Press 1 to check a phone bill; press 2 to handle a service; and press 0 to transfer to the manual service", the voice answering robot needs to wait for a button instruction input by the user.

The call failed state means that a peer party cannot be connected. For example, the peer party is busy, a dialed number does not exist, or an attendant is busy and cannot provide a manual service.

Each call state is set with a plurality of corresponding first audio features. For example, first audio features corresponding to the call waiting state may be "Please wait", "Please hold on", "Connecting", and the like. First audio features corresponding to the response waiting state may be "please press", "please dial", and the like. First audio features corresponding to the call failed state may be "call failed", "not exist", "suspended", and the like. It may be determined that the call state corresponding to the first audio feature is the current call state.

The first audio feature corresponding to the call state may be preset by the user, or may be automatically obtained. For example, the user may perform setting on a setting page. The call waiting state corresponds to features such as song A, "waiting", and "hold on"; the waiting response state corresponds to features such as "please press", "please dial", and "please say"; and the call failed state corresponds to features such as an occupation tone, "call failed", and "not exist".

In a possible implementation, when the call state corresponding to the first audio feature is automatically identified, correspondences between a plurality of call states and first audio features may be preset first, and these correspondences are stored in a call state identification database. For example, "call waiting state-waiting" and "call waiting state-song B" may be set, where "waiting" and "song B" are audio features of the call waiting state. Further, "response waiting state-please press", "response waiting state-please dial", and "response waiting state-please say" may be set, where "please press", "please dial", and "please say" are third audio features. Then, "call failed state-no answer", "call failed state-not exist", and "call failed state-please dial again later" may be further set, where "no answer", "not exist", and "please dial again later" are audio features of the call failed state. Finally, all correspondences are stored in the call state identification database.

During a call, the identified first audio feature is matched with the correspondence in the call state identification database, to obtain a determined call state. For example, when it is identified that a keyword is "waiting", and a corresponding call state matched to "waiting" in the call state identification database is "call waiting state", it is determined that the current call state is the call waiting state.

It should be noted that the call state identification database may be disposed on a server end, or may be disposed on the call device, or may be disposed on both the server end and the call device. This is not limited herein. When the call state identification database is set on the server end, maintenance personnel may update the call state identification database at a preset interval, to determine the call state more accurately. When the call state identification database is set on both the server end and the call device, the call state identification database on the call device may be synchronized with that on the server end, to implement update. The synchronization may be performed manually, or may be updated automatically at a preset interval. This is not limited herein.

S33: Perform call prompting based on a call prompting manner corresponding to the call state.

In some implementations, there are different prompt manners in different call states. For example, for the call waiting state, after a peer party answers or responds to the call, the user needs to be prompted in a manner such as text or vibration to answer the call. For the response waiting state, the user needs to be prompted to make a response, and to-be-responded content may be displayed on a touchscreen for the user to make a response. For the call failed state, the user needs to be prompted that the peer party is unreachable, and may further perform a hang-up or redial operation, and the user may be prompted in a vibration manner different from that of the call waiting state. In this application, the prompt manner of each call state is only an example, and is not limited thereto.

In this embodiment, during a call, a corresponding call state is determined based on an identified first audio feature. Based on the determined call state, call prompting is performed on the user in different manners. The user may determine, based on the call prompting without sticking the call device to the ear for answering, whether to answer the call or respond to the call. In this way, when call waiting or user response waiting occurs and the user does not use the external call apparatus, the user can release both hands to perform other work, so that call experience of the user is improved.

Figure 4:
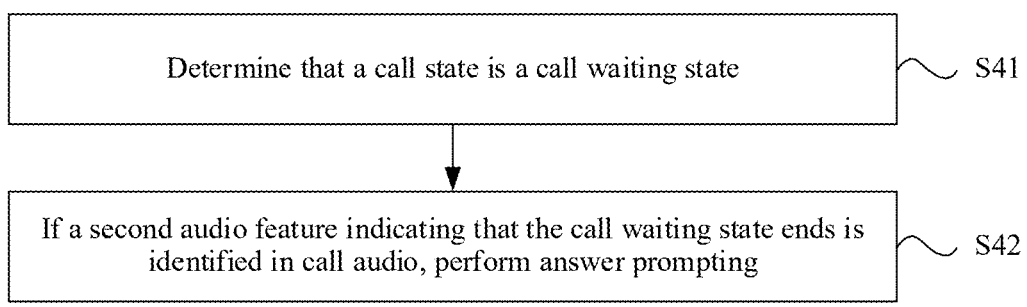
FIG. 4 is a schematic flowchart of a prompt method according to another embodiment of this application.
Figure 5:
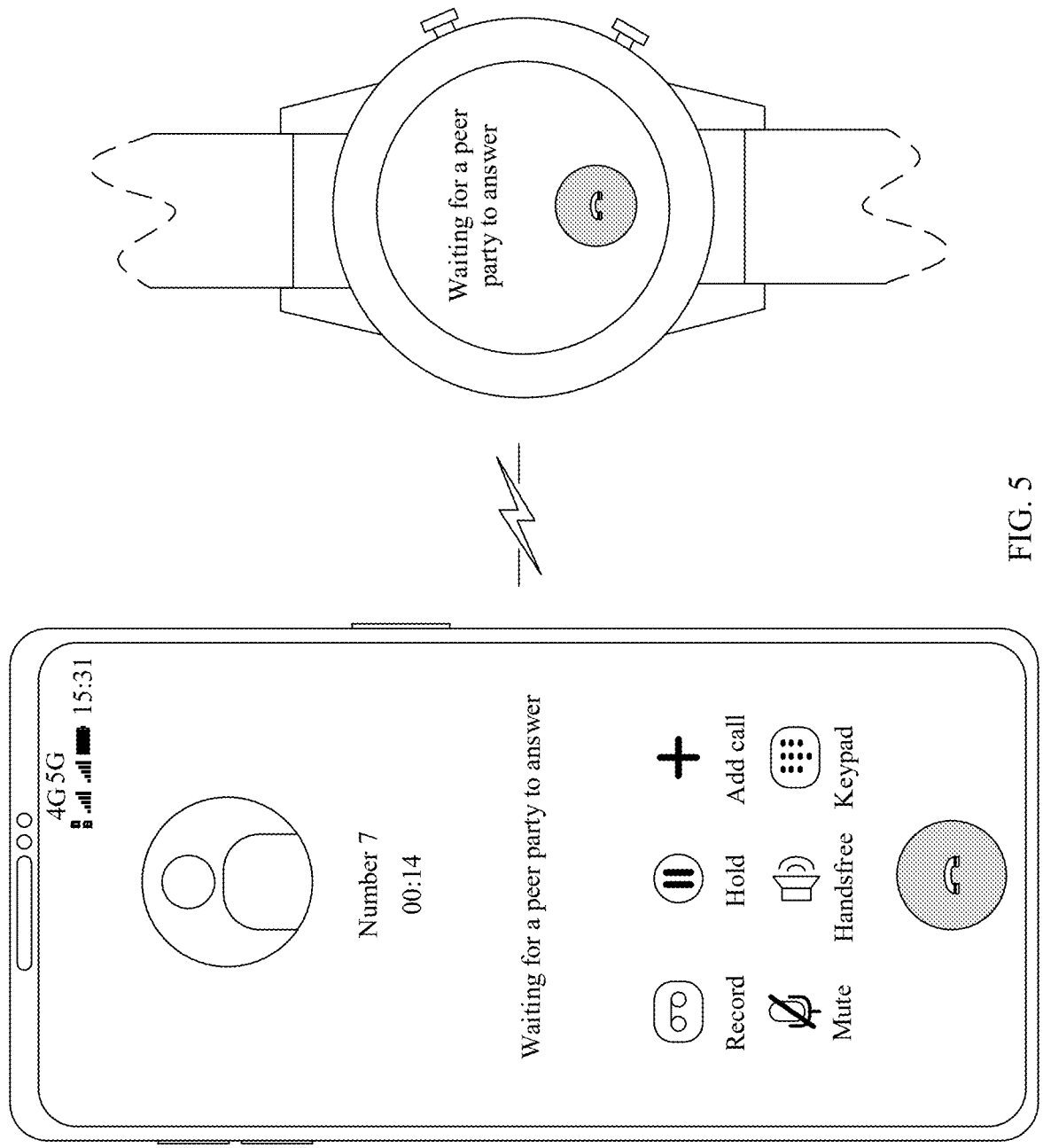
FIG. 5 is a schematic diagram of an interface when a call prompt method is applied according to another embodiment of this application.
Figure 6:
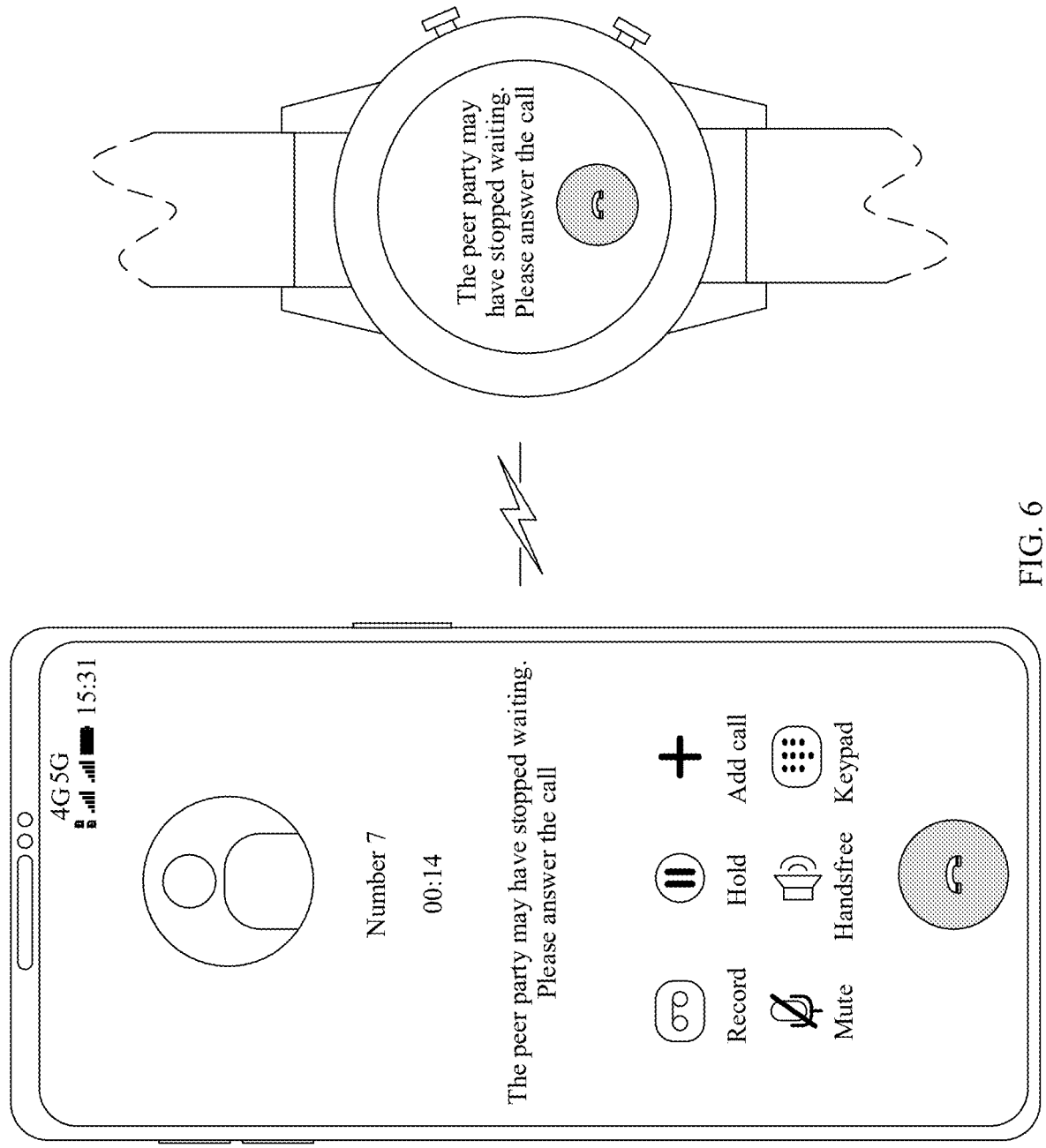
FIG. 6 is a schematic diagram of an interface when a call prompt method is applied according to another embodiment of this application.

In a possible implementation, FIG. 4 shows a call prompt method. The method is an embodiment of step S33 in FIG. 3. FIG. 5 and FIG. 6 show an example of performing call prompting in a call waiting state.

It should be noted that, in the following accompanying drawings, a mobile phone is connected to a smartwatch, so that the smartwatch may be used as a component for performing call prompting. Similarly, when the mobile phone is connected to a device such as a smart band or a smart screen, the connected device may also be used as a component for performing call prompting. A person skilled in the art should clarify that performing call prompting by using a device such as a smartwatch, a smart band, or a smart screen is only a scenario of performing call prompting, but is not a limitation. In this application, a type of a device that is connected to the call device to perform prompting is not limited.

Refer to FIG. 4. The performing call prompting includes:

S41: Determine that a call state is the call waiting state.

If it is determined, based on the identified first audio feature, that the call state is the call waiting state, refer to FIG. 5 in which "Waiting for a peer party to answer" is displayed on a call interface to prompt the user that the peer party has not answered the call currently. In addition, when there is a smartwatch connected to the call device, prompt information may be displayed on the smartwatch. For example, when there is a smartwatch connected to a call device, if the call device displays prompt information "Waiting for a peer party to answer", a prompt instruction may be generated based on the prompt information, and sent to the smartwatch. After receiving the prompt instruction, the smartwatch displays, on a screen of the smartwatch based on the prompt instruction, the prompt information "Waiting for a peer party to answer".

S42: If a second audio feature indicating that the call waiting state ends is identified in the call audio, perform answer prompting.

Figure 22:
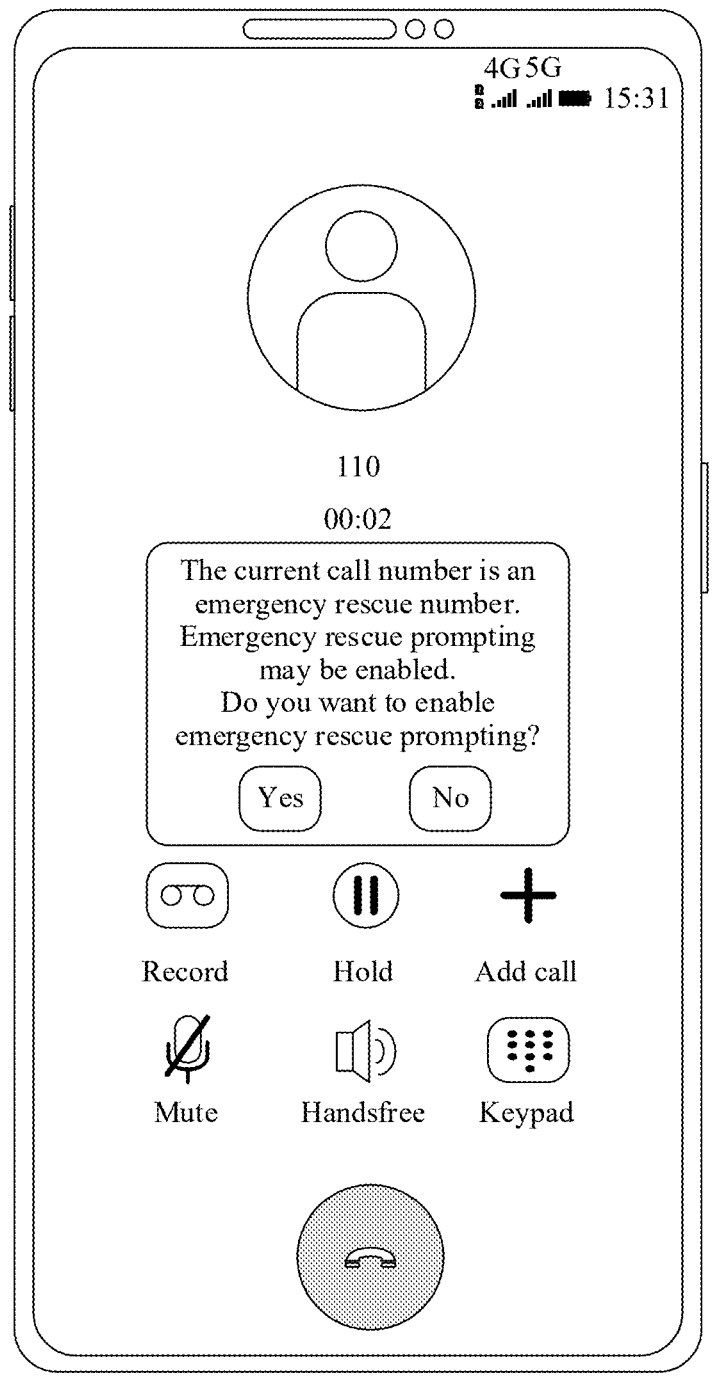
FIG. 22 is a schematic diagram of an interface when a call prompt method is applied according to another embodiment of this application.

Refer to FIG. 6. After the second audio feature is identified in the call audio, prompt information "The peer party may have stopped waiting. Please answer the call" may be displayed on a screen. The second audio feature includes keywords such as "Hi", "Hello", "Mr.", and "Ms." that may indicate that call waiting ends and that the peer party has answered or responded to the call. In addition, the call device may further prompt the user in a manner such as continuous or intermittent vibration, intermittent lighting of a flash, or intermittent turning on or turning off of screen backlight, to answer the call. Similar to FIG. 22, when there is a smartwatch connected to the call device, the foregoing prompt instruction may be generated and sent to the smartwatch. A difference lies in that, when the foregoing prompt instruction is generated, an instruction for instructing the smartwatch to vibrate may be added to the prompt instruction. After receiving the instruction, the smartwatch displays prompt information "The peer party may have stopped waiting. Please answer the call" on a screen of the smartwatch, and the smartwatch continuously vibrates to prompt the user to answer the call.

Figure 7:
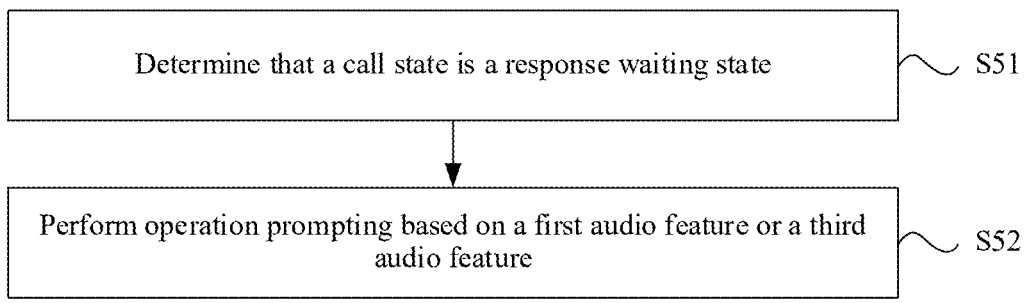
FIG. 7 is a schematic flowchart of a prompt method according to another embodiment of this application.
Figure 8:
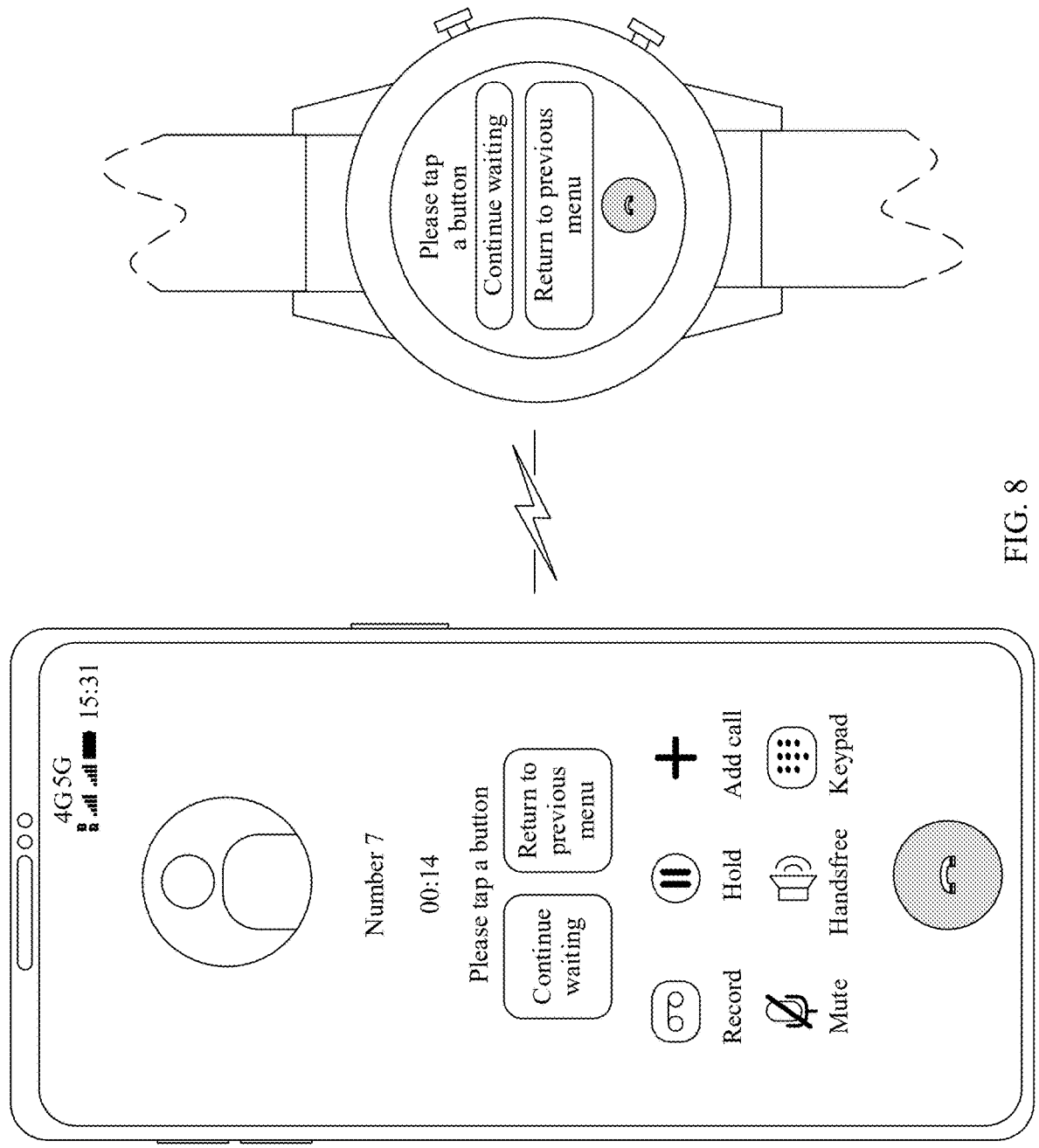
FIG. 8 is a schematic diagram of an interface when a call prompt method is applied according to another embodiment of this application.
Figure 9:
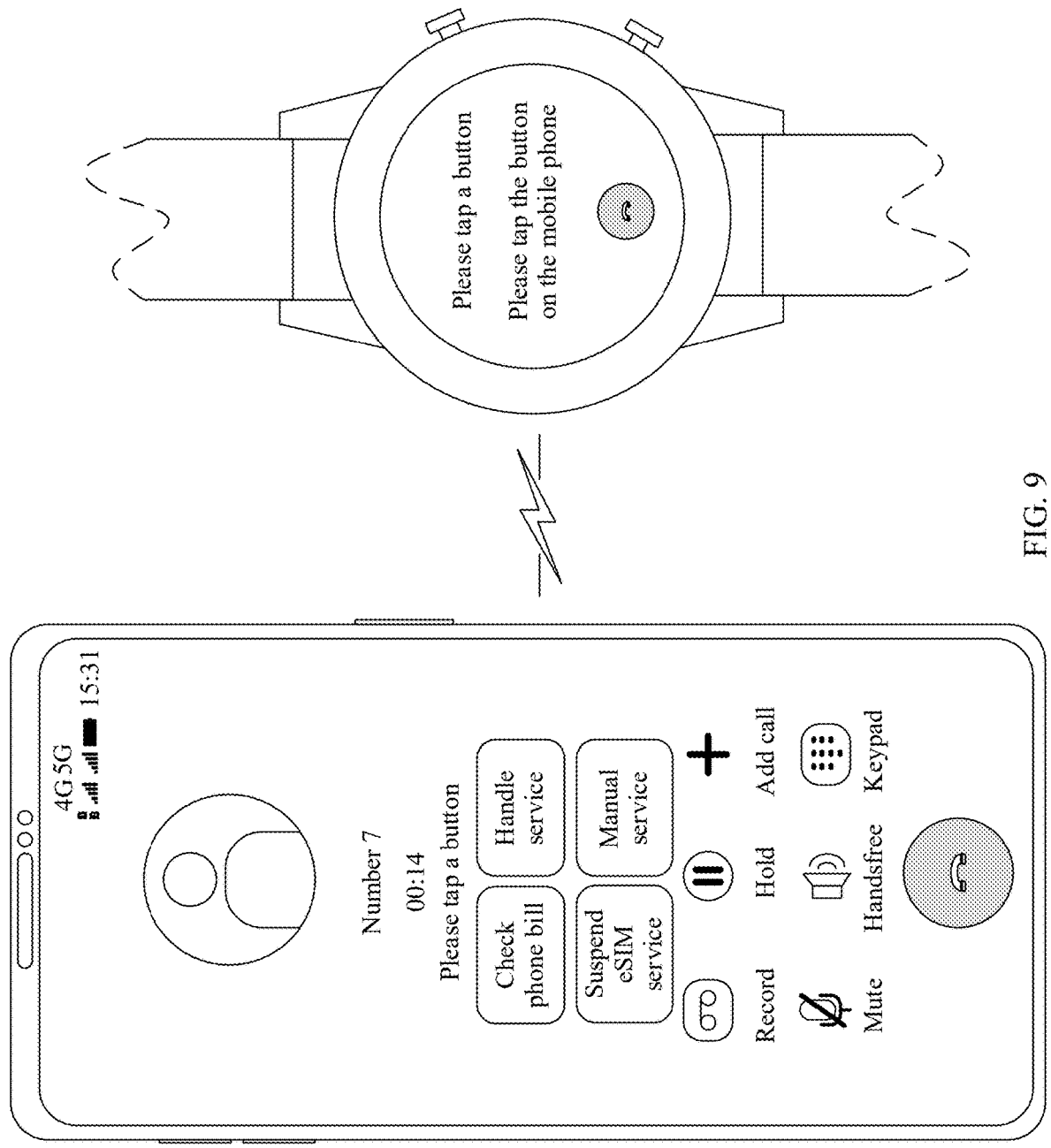
FIG. 9 is a schematic diagram of an interface when a call prompt method is applied according to another embodiment of this application.

FIG. 7 shows a call prompt method. The method is another embodiment of step S33 in FIG. 3. FIG. 8 and FIG. 9 show an example of performing call prompting in a response waiting state.

Refer to FIG. 7. The performing call prompting includes:

S51: Determine that a call state is a response waiting state.

In some implementations, the determining that a call state is a response waiting state includes two cases. In one case, when the call state is the response waiting state, the third audio feature indicating the response waiting state is identified; it is determined that the call state is the response waiting state; and operation prompting is performed based on the third audio feature. In the other case, if an identified first audio feature indicates response waiting, it is determined that the call state is the response waiting state. For example, refer to FIG. 8. When a dialed number is an operator service number, after the call is transferred to a manual service, there may be long waiting duration, and the call device enters a call waiting state. When the waiting duration reaches preset duration (for example, 1 minute), a prompt that "The attendant is busy, and please press 1 to continue waiting, or press 0 to return to previous menu" may be displayed. In this case, it may be identified that the call audio includes the third audio feature "Please press", and the call waiting state is switched to the response waiting state. Alternatively, after the call is connected, voice prompts "Press 1 to check a phone bill." and "Press 0 to transfer to the manual service." may appear. In this case, it may be identified that the call audio includes the first audio feature "Please press", and the call waiting state is switched to the response waiting state.

S52: Perform operation prompting based on the first audio feature or the third audio feature.

In S51, the response waiting state is determined by using the first audio feature or the third audio feature. The performing operation prompting may be displaying, on a screen, prompt information that includes the first audio feature or the third audio feature (that is, "Please press") and that is used to indicate to make a response. For example, if "The attendant is busy, and please press 1 to continue waiting, or please press 0 to return to previous menu" is identified, "Continue waiting" and "Return to previous menu" may be displayed on the screen. In addition, the call device may further prompt the user in a manner such as continuous or intermittent vibration, or intermittent lighting of a flash, to answer the call.

If a tap operation performed on the prompt information is received, a response is made based on the prompt information on which the tap operation is performed. For example, reference may be made to an example of performing button simulation during automatic dialing. When a tap operation performed on a "Continue waiting" area is received, button information of "1" is generated and sent to a processor; and when a tap operation performed on a "Return to previous menu" area is received, button information of "0" is generated and sent to the processor. The processor sends the digit or character corresponding to the received button information to a number in the call. If the tap operation performed on "Continue waiting" is received, the call device dials "1" to the called party, and exits the response waiting state. After exiting the response waiting state, if an audio feature of the call waiting is identified in the call audio, the call device enters the call waiting state. If the tap operation performed on "Return to previous menu" is received, the call device dials "0" to the called party. After exiting the response waiting state, the call device may identify other audio features used to indicate a call response state, for example, "Press 1 to check a phone bill." and "Press 0 to transfer to the manual service". If the other audio features are identified, the call device enters the response waiting state again.

In some implementations, when there is a smartwatch connected to the call device, a prompt instruction may be further sent to the smartwatch, so that the smartwatch can synchronously display response waiting prompt information. When the smartwatch receives a tap operation performed on the prompt information on the smartwatch, the smartwatch sends a corresponding button instruction to the call device. After receiving the button instruction, the call device performs a button operation based on button information included in the button instruction, and dials a number corresponding to the prompt information. For example only, when there is a smartwatch connected to a call device, if prompt information of the call device is "Continue waiting" and "Return to previous menu", the call device generates a prompt instruction based on the prompt information and button information corresponding to the prompt information, and sends the prompt instruction to the smartwatch. After receiving the prompt instruction, the smartwatch displays the prompt information "Continue waiting" and "Return to previous menu" in the prompt instruction. When a tap operation performed on a display area of "Continue waiting" or "Return to previous menu" is received, the smartwatch sends, to the call device, the button information corresponding to the area on which the tap operation is performed, and the call device dials to a called party based on the button information. For example, refer to FIG. 24. If a tap operation performed on "Continue waiting" is received, a call device dials "1" to a called party, and exits a response waiting state.

Refer to FIG. 9. In another possible implementation, if received audio is "Press 1 to check a phone bill, press 2 to handle a service, press 3 to suspend the eSIM service, and press 0 to transfer to the manual service.", it may be identified that content for performing prompting is "Check phone bill", "Handle service", "Suspend eSIM service", and "Manual service". Similar to the foregoing prompt manner, the response waiting prompt information may be displayed on the call device. Details are not described herein.

It should be noted that, when there is a smartwatch connected to the call device, if there is a relatively large amount of response waiting prompt information that needs to be displayed, and the prompt information cannot be completely and clearly displayed on a touchscreen of the smartwatch, a sliding operation of the user may need to be received, to turn pages. Alternatively, only some prompt information is displayed on the smartwatch. For example, "Please tap the button on the mobile phone" is displayed on the smartwatch, and the smartwatch vibrates to prompt the user to make a response.

Figure 10:
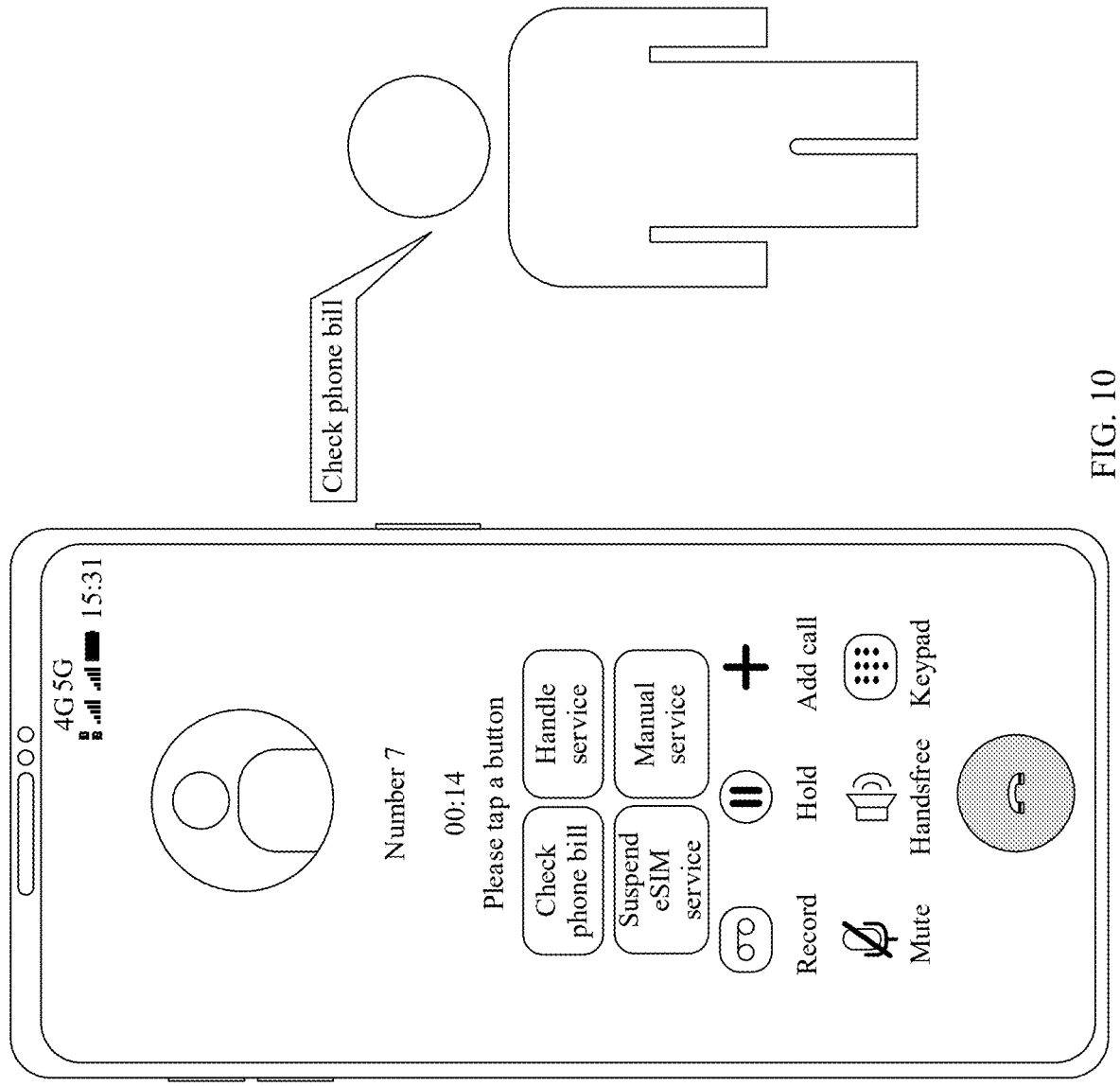
FIG. 10 is a schematic diagram of an interface when a call prompt method is applied according to another embodiment of this application.

In a possible implementation, a voice instruction input by the user may be alternatively received, and a response is made based on the voice instruction. Refer to FIG. 10. After displaying response waiting prompt information, a call device may collect, by using a microphone, voice information input by a user, and identify whether there is a voice instruction matching the response waiting prompt information in the voice information. If there is a voice instruction matching the response waiting prompt information in the voice information, a response is made based on the voice instruction matching the response waiting prompt information. For example, when the response waiting prompt information displayed by the call device is "Check phone bill", "Handle service", "Suspend eSIM service", and "Manual service", and the user does not make a response, the microphone receives voice information input by the user. If a voice instruction of "Check phone bill" is identified in the voice information, the call device performs a button operation based on button information corresponding to "Check phone bill", and dials "1" to a called party.

Figure 11:
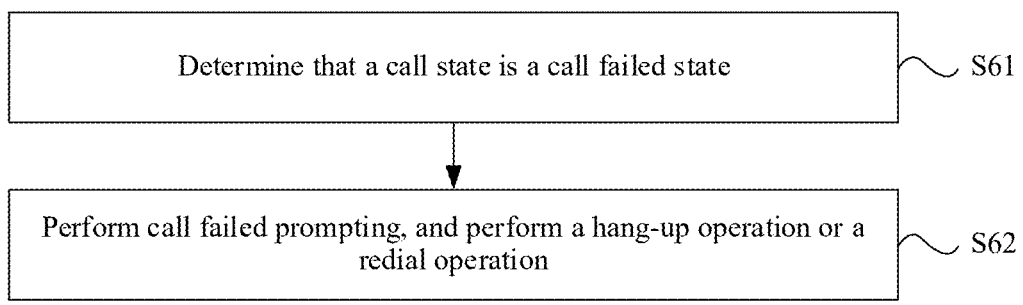
FIG. 11 is a schematic flowchart of a prompt method according to another embodiment of this application.
Figure 12:
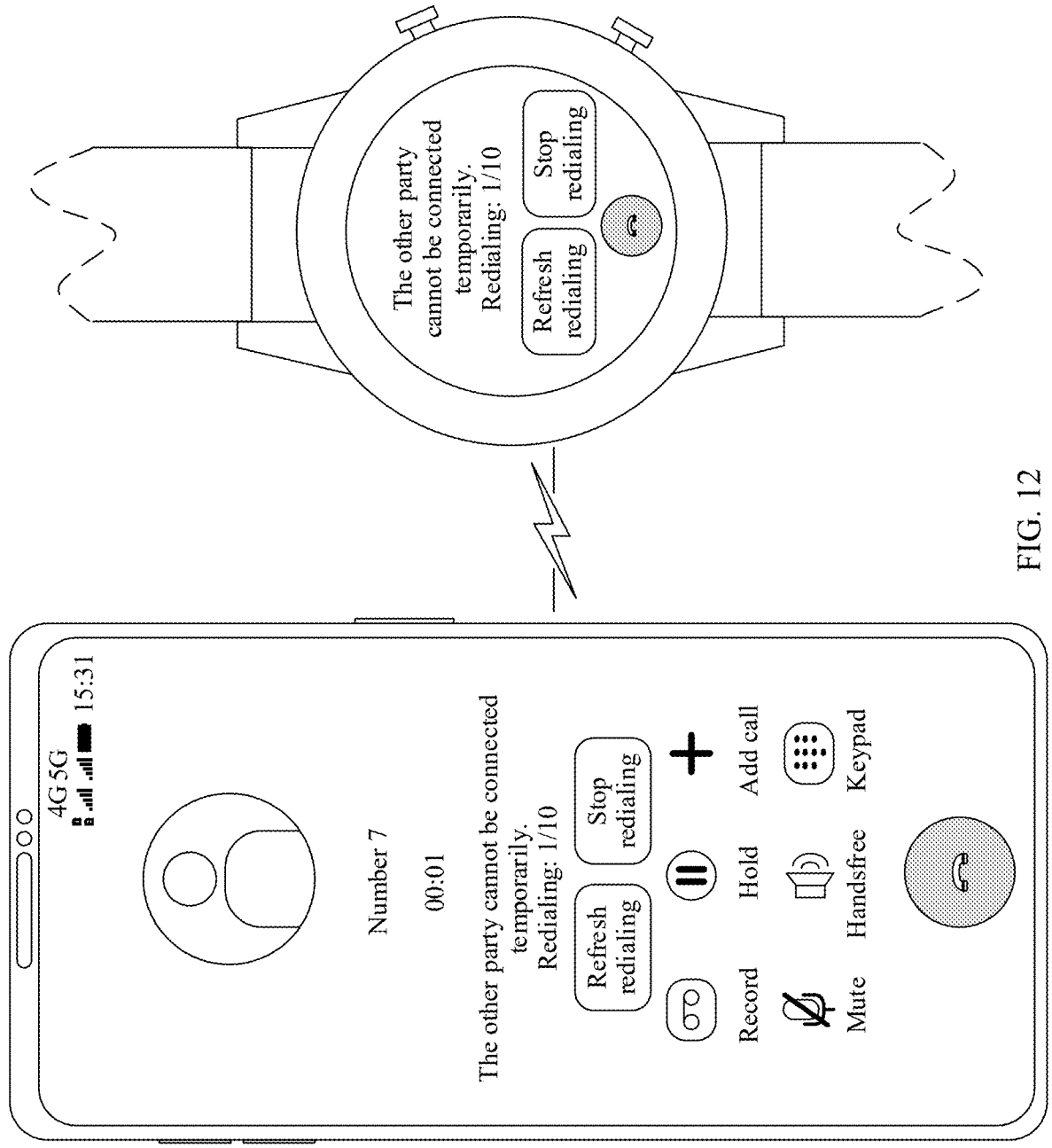
FIG. 12 is a schematic diagram of an interface when a call prompt method is applied according to another embodiment of this application.

FIG. 11 shows a call prompt method. The method is still another embodiment of step S33 in FIG. 3. FIG. 12 shows an example of performing a redial operation in a call failed state. Refer to FIG. 11. The performing call prompting includes:

S61: Determine that a call state is a call failed state.

S62: Perform call failed prompting, and perform a hang-up operation or a redial operation.

In some implementations, when the call state is the call failed state, if there is no preset redial operation, "The called party cannot be connected temporarily" may be displayed on a screen, and a call is hung up. If there is a preset redial operation, as shown in FIG. 12, "The other party cannot be connected temporarily. Redialing: 1/10" may be displayed on a screen, to prompt a user that redialing is being performed, a quantity of times of redialing is 10 times, and the current redial is the 1st redial. In this case, a call device performs a redial operation after the call is hung up. In addition, the user may be prompted in a manner such as continuous or intermittent vibration, or intermittent lighting of a flash that redialing is being performed.

In a possible implementation, two pieces of prompt information "Refresh redialing" and "Stop redialing" may be further displayed on a screen. When the user taps the "Refresh redialing", the current time of redial is reset to the 1st time. When a tap operation performed on the "Stop redialing" is received, redial is terminated, and after it is determined that the call state is the call failed state, the call is hung up.

It should be noted that, when there is a smartwatch connected to the call device, a prompt instruction may be sent to the smartwatch, and the smartwatch displays, on a touchscreen based on the prompt instruction, information "The other party cannot be connected temporarily. Redialing: 1/10", and displays two pieces of prompt information "Refresh redialing" and "Stop redialing". In addition, the smartwatch may further vibrate to prompt the user that redialing is being performed. When a tap operation performed on the "Refresh redialing" or "Stop redialing" is received on the smartwatch, the smartwatch sends button information corresponding to the tap operation to the call device. After receiving the button information, the call device performs an operation of refreshing redialing or stopping redialing.

Figure 13A:
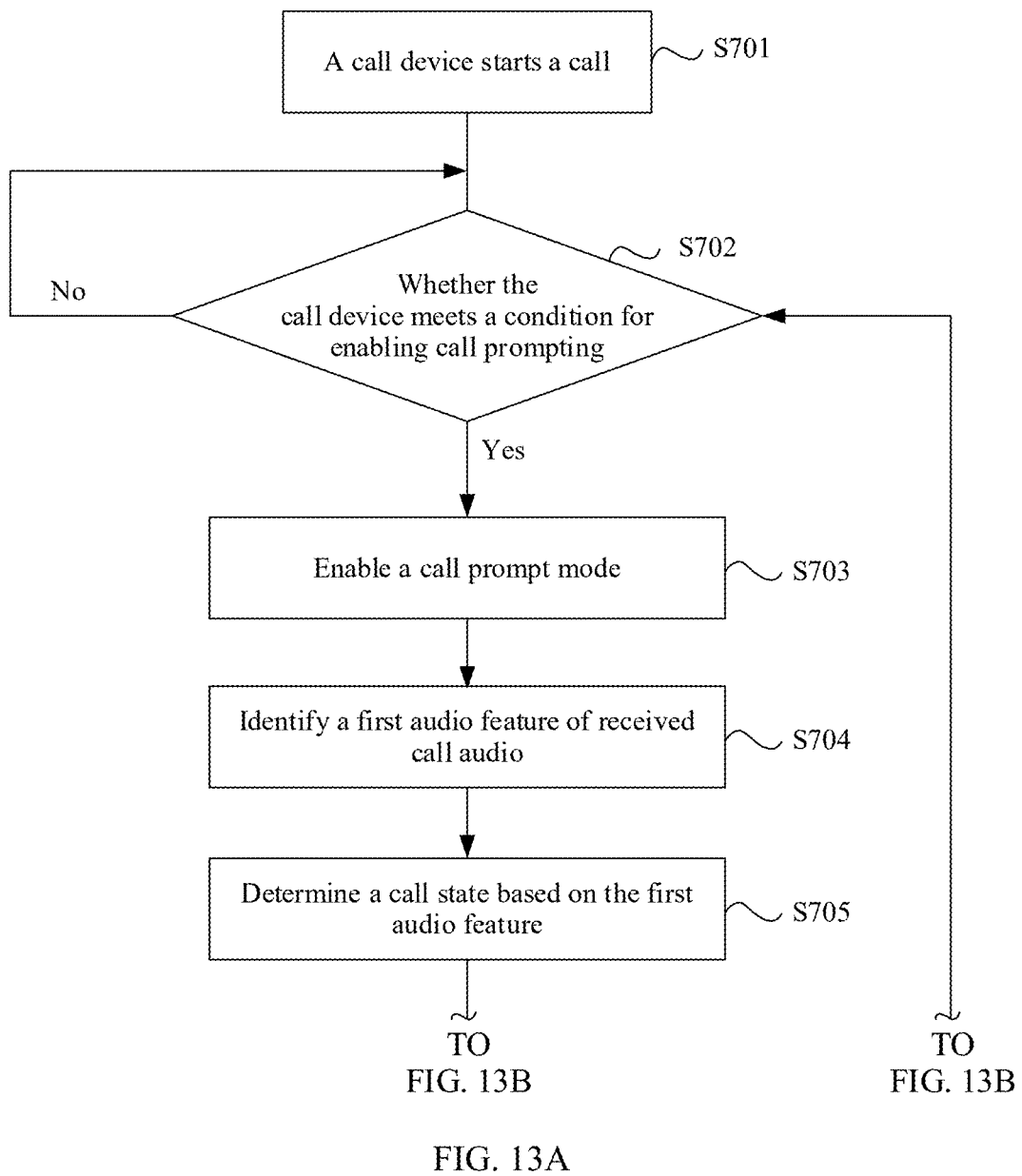
FIG. 13A and FIG. 13B are a schematic flowchart of a prompt method according to another embodiment of this application.
Figure 13B:
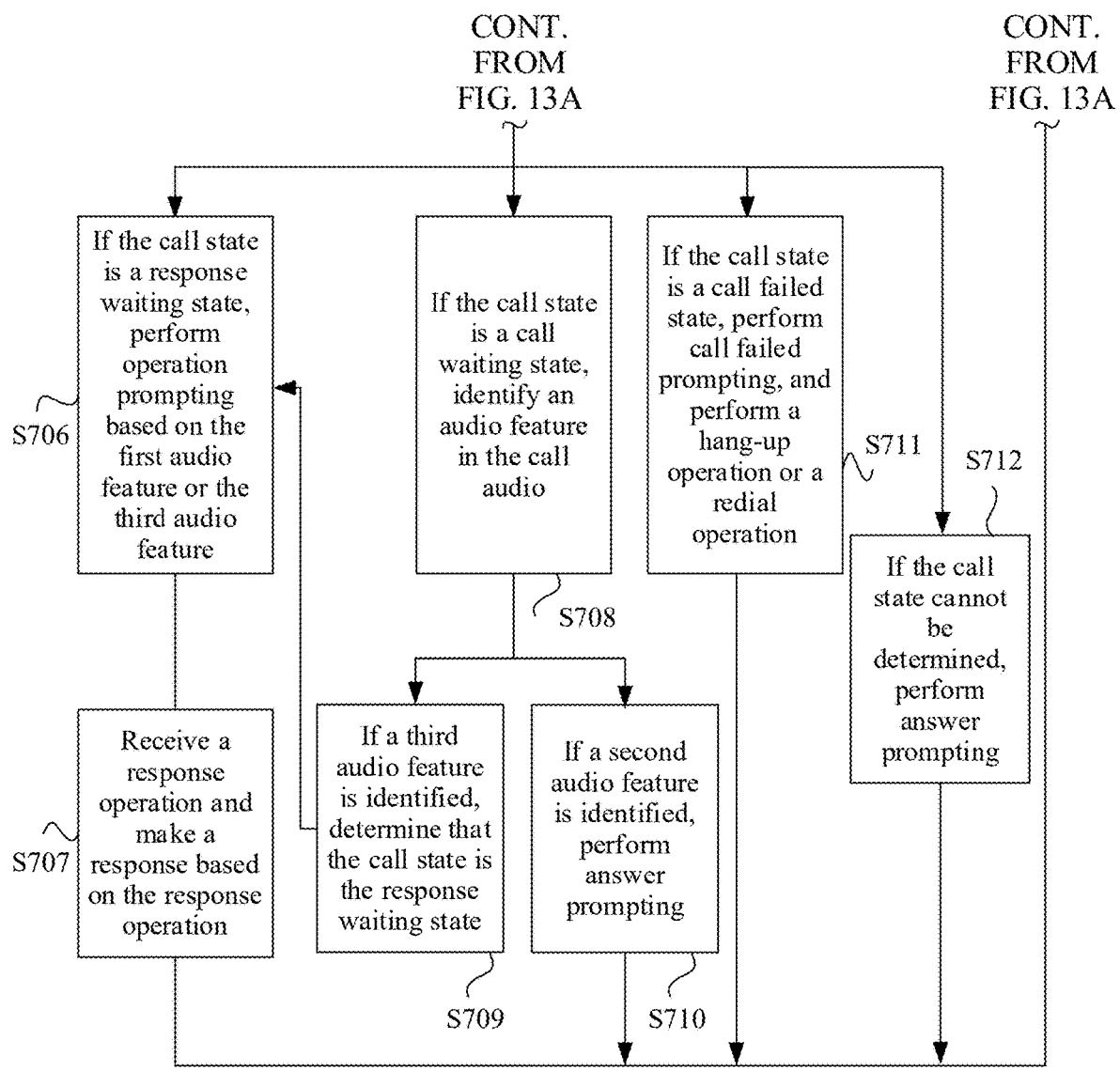

FIG. 13A and FIG. 13B are a schematic flowchart of a prompt method according to another embodiment of this application.

Refer FIG. 13A and FIG. 13B. In this embodiment, the call prompt method includes: S701: A call device starts a call.

In some implementations, the call device may be a calling party or a called party during the call. For example, when an operator service number is dialed by using a call device, the call device is a calling party. When a service call from an organization is answered, the call device is a called party. The call prompt method provided in this application may be applied to both the calling party and the called party. This is not limited herein.

S702: Determine whether the call device meets a call prompt enabling condition; and if the call device meets the call prompt enabling condition, perform S703; or if the call device does not meet the call prompt enabling condition, continue to identify whether the call device meets the call prompt enabling condition.

In this application, the call prompt mode may be enabled by a user, or may be automatically enabled. There are at least three manners for providing enabling the call prompt mode, that is, a manual enabling condition is met, it is determined that the call device meets the automatic enabling condition, or the call prompt mode is enabled by default before delivery of the call device.

It should be noted that, that the call prompt mode is enabled by default before delivery of the call device is already set before delivery of the call device, and does not need to be set by a user. Details are not described herein.

Determining whether the automatic enabling condition is met essentially includes two cases. One is to determine whether the user is answering a call. If the user is not answering the call, call prompting is automatically enabled. Therefore, it may be first detected whether an external call device is enabled, and if no external call device is enabled, it is further detected whether the user answers the call by using an audio listening device (such as a receiver or a speaker) of the call device. The other case is to identify a called number. If a probability that call prompting is required for the called number is relatively high, call prompting is automatically enabled. For example, for a call between users, call prompting generally does not need to be performed. However, when a user dials a functional phone number such as an emergency number or a customer service number, a peer party may use an automatic answering robot or the like, and there is a relatively high probability that call prompting needs to be performed.

The following describes how to detect whether the external call device is enabled and whether the user answers the call by using the audio listening device of the call device.

As an example rather than a limitation, refer to the diagram of the structure of the call device shown in FIG. 1. When it is identified whether the call device enables an external call apparatus to play call audio, whether a headset is connected to a headset interface may be first determined by detecting whether there is load on the headset interface of the call device. If no load is detected on the headset interface, that is, no headset is connected, it may be further determined, by obtaining a wireless communications device list of the call device, whether the call device is currently connected to an external call apparatus such as a Bluetooth headset or a Bluetooth speaker. The wireless communications device list includes all wireless devices connected to the call device.

If there is a connected headset or an external call apparatus, a setting option of outputting audio of the call device further needs to be read, to determine whether the call device is set to output audio by using the headset or the external call apparatus. If it is determined that the call device is not connected to a headset or an external call apparatus, or is connected to the external call apparatus but does not output audio by using the headset or the external call apparatus, it is determined that that the call device does not enable the external call apparatus to play the call audio is identified.

As an example rather than a limitation, if a true wireless stereo (True Wireless Stereo, TWS) headset is connected to the call device. The TWS headset is connected to the call device through Bluetooth, and the wireless communications device list of the call device includes a device name of the TWS headset.

When the TWS headset is not worn, it may be detected that the headset interface of the call device has no load. The wireless communications device list includes a connected external call apparatus. However, in the setting option of outputting audio of the call device, a device that outputs audio is set to a receiver or a speaker, and audio is not output by using the TWS headset. In this case, an identification result is that the external call apparatus is not enabled to play the call audio.

When the TWS headset is worn, after detecting that the TWS headset is placed into ears, the TWS headset sends, to the call device by using Bluetooth, an indication signal indicating that the headset is worn. After receiving the indication signal indicating that the headset is worn, the call device sets a device that outputs audio to the TWS headset. In this case, an identification result is that the external call apparatus is enabled to play the call audio. It should be noted that, when the call device waits to answer, the indication signal indicating that the headset is worn may be further used to control the call device to answer a call.

In some implementations, when it is identified whether the user listens to the call audio by using the audio listening device of the call device, it may be first detected whether the user enables the speaker to play the audio. For example, when a setting option of a call device is read, if the setting option indicates audio is played by using a speaker, it is determined that a user enables the speaker. If the setting option indicates that the audio is played by using a receiver or an external call apparatus, it is determined that the user does not enable the speaker.

If the speaker is not enabled, there is a need to detect whether the user sticks the call device to an ear to answer a call. If it is detected that the user sticks the call device to an ear to answer a call, it is determined that the user answers the call by using the audio listening device of the call device. Otherwise, if it is not detected that the user sticks the call device to an ear to answer a call, it is determined that the user does not answer the call by using the audio listening device of the call device.

In some implementations, when the call device is disposed with an optical proximity sensor or a distance sensor near the receiver, and it is detected that light near the receiver of the call device is blocked or an obstacle is stuck close to the receiver, that is, it is determined that a distance between the receiver and a face of the user is less than a preset threshold, it may be determined that the user sticks the call device to an ear to answer a call. Alternatively, when brightness of an image collected by a camera (for example, a front camera) located near a receiver of the call device is lower than a brightness threshold or an image of skin is identified in the image, it may also be determined that a distance between the receiver and a face of the user is less than a preset threshold, that is, the user sticks the call device to an ear to answer a call. As an example rather than a limitation, both a sensor and a camera may be used for detection. For example, if an optical proximity sensor near a receiver detects that a light intensity is less than an intensity threshold, a front camera is enabled to collect an image. If brightness of a collected image is lower than a brightness threshold or skin can be identified in the image, it may be determined that the user sticks the call device to an ear to answer a call.

After it is determined that the call device does not enable the external call apparatus to play the call audio and the user does not answer the call by using the audio listening device of the call device, the call prompt mode may be automatically enabled.

Figure 14:
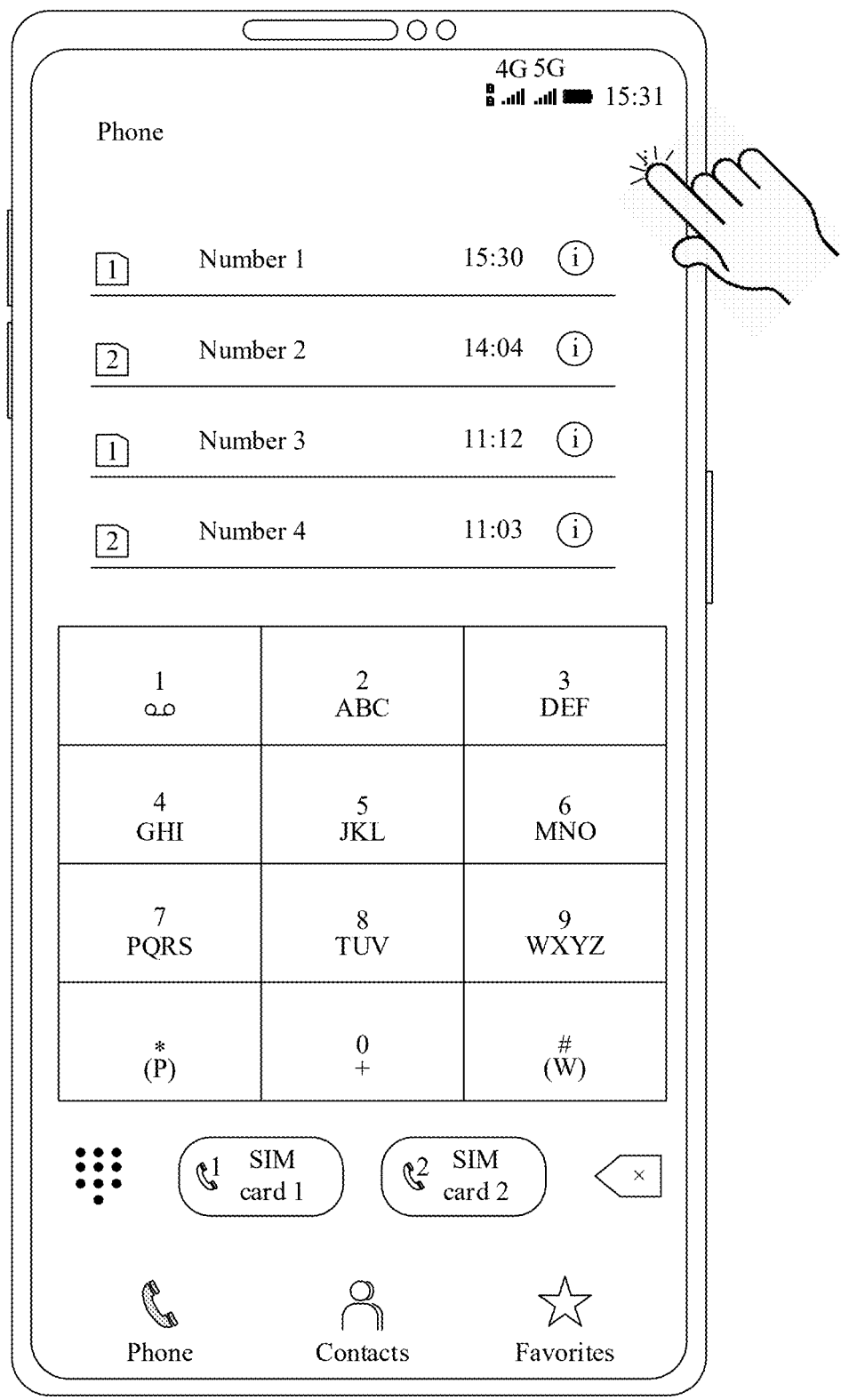
FIG. 14 is a schematic diagram of an interface when a call prompt method is applied according to another embodiment of this application.
Figure 18:
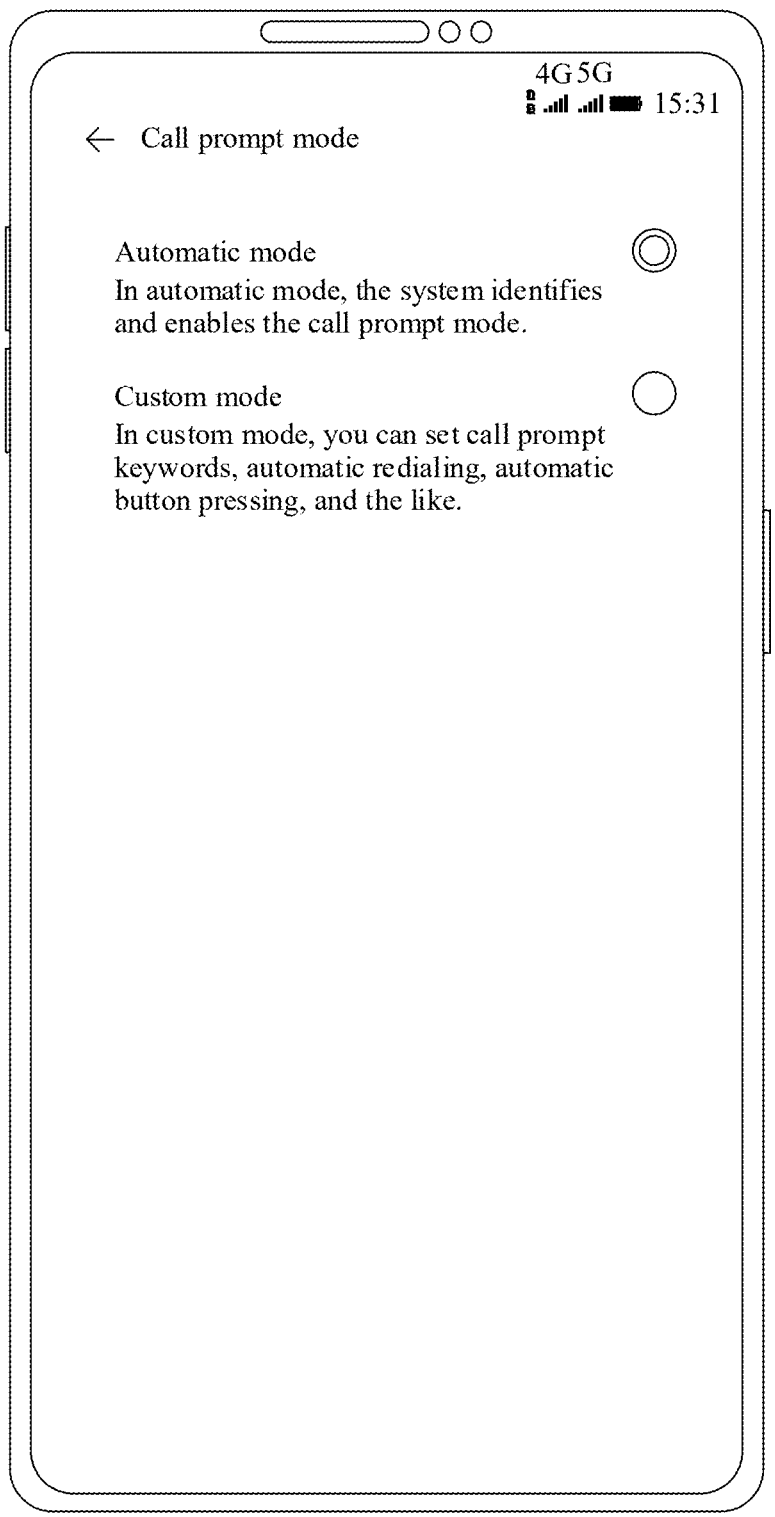
FIG. 18 is a schematic diagram of an interface when a call prompt method is applied according to another embodiment of this application.
Figure 19:
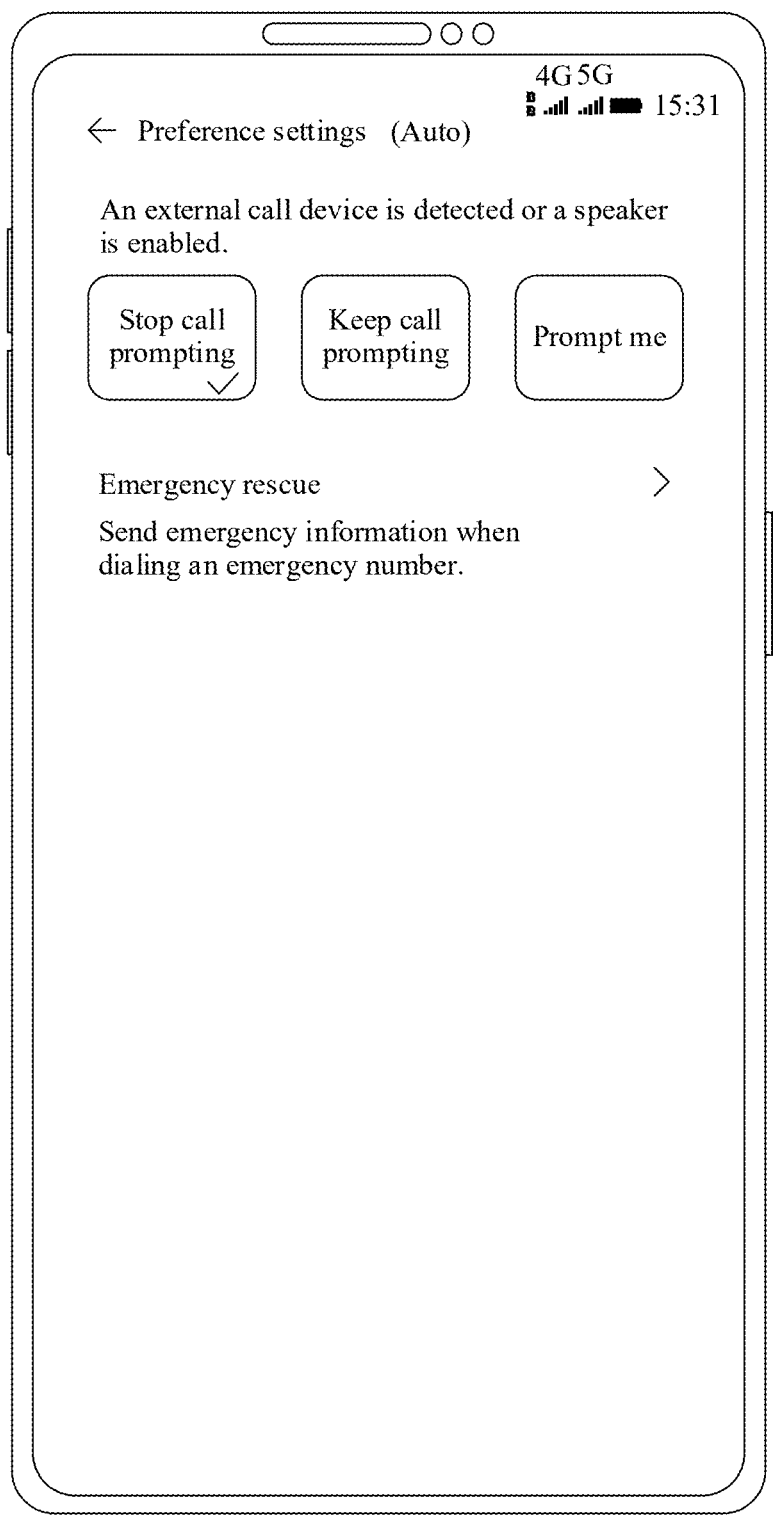
FIG. 19 is a schematic diagram of an interface when a call prompt method is applied according to another embodiment of this application.

Before a call is made, the automatically enabling the call prompt mode (automatic mode) may be further set. Refer to FIG. 14. In a possible implementation, a dialing interface displayed by a call device displays a dialing keyboard, a call record, and an enabling area (in this embodiment, the enabling area is three dots vertically arranged in an upper right corner, but is not limited thereto) of a shortcut setting menu, and the like. After receiving a tap operation performed on the enabling area of the shortcut setting menu, the call device displays a shortcut setting menu shown in FIG. 15. If the call device receives a tap operation performed on a "Settings" option, the call device displays a setting interface shown in FIG. 16. After a tap operation performed on a "Call prompt" option in the setting interface is received, a call prompt setting interface shown in FIG. 17 may be displayed. After a tap operation performed on "Call prompt mode" is received, a call prompt mode selection interface shown in FIG. 18 is displayed. In the interface in FIG. 18, after it is determined, based on a received selection operation, that a call prompt enabling mode is an automatic mode, the call prompt setting interface shown in FIG. 17 may be returned to. When a tap operation performed on "Call prompt preference settings" is received, an interface shown in FIG. 19 is displayed. In the interface, a processing policy when an external call device is detected or a speaker is enabled may be selected. The processing policy includes: "Stop call prompting", "Keep call prompting", and "Prompt me".

When "Stop call prompting" is selected, if the call device has not performed call prompting, the call prompt mode is terminated after the external call device is detected or the speaker is enabled. If the call device is performing call prompting (that is, a call state of the call device is determined), after the external call device is detected or the speaker is enabled, call prompting is terminated when a call state is terminated (that is, a user is prompted to answer a call in a call waiting state, a response is received in a response waiting state, or it is prompted that a user is unable to be connected in a call failed state). When "Keep call prompting" is selected, in a current call, no matter when the external call device is detected or the speaker is enabled, call prompting is kept until the current call ends.

Figure 20:
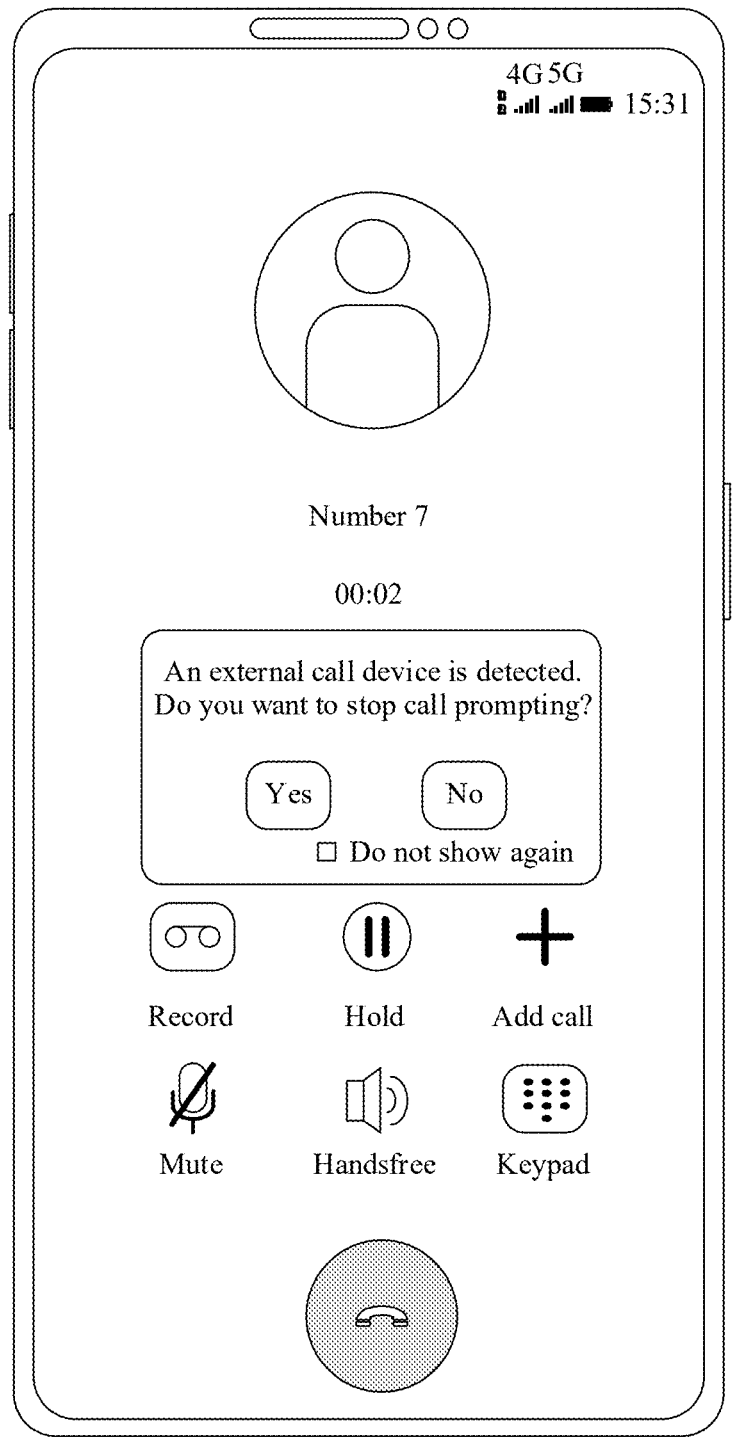
FIG. 20 is a schematic diagram of an interface when a call prompt method is applied according to another embodiment of this application.

Refer to FIG. 20. When "Prompt me" is selected, after the external call device is detected or the speaker is enabled, a selection interface may be displayed, to wait for user input, to select stopping call prompting or keeping call prompting. If a tap operation performed on "Do not prompt again" is received, and then a tap operation performed on "Yes" or "No" is received, a processing policy may be changed to "Keep call prompting" or "Stop call prompting" based on "Yes" or "No" corresponding to the tap operation.

When a detected called number is a preset enabling number, the preset enabling number may be obtained by the call device from a third-party server, or may be set locally. For example, a call device sends a called number feature of a current call to a third-party server. The third-party server performs matching based on the called number feature, and if a response number is matched, determines that the called number of the current call is a preset enabling number. Alternatively, a call device may further periodically download an enabling number database from a third-party server locally, and then during a call, match a called number with a number in the enabling number database, and if a corresponding number is matched, determine that the called number of the current call is a preset enabling number. Alternatively, a plurality of numbers may be pre-stored in a local enabling number database. If a called number during a call matches one of the plurality of pre-stored numbers, it is determined that the called number of the current call is the preset enabling number.

When the preset enabling number is an emergency rescue number, emergency rescue settings may be enabled. For example, still refer to FIG. 9. If a tap operation performed on an "Emergency rescue" option is received, an "Emergency rescue" setting interface shown in FIG. 14 may be displayed.

Figure 21:
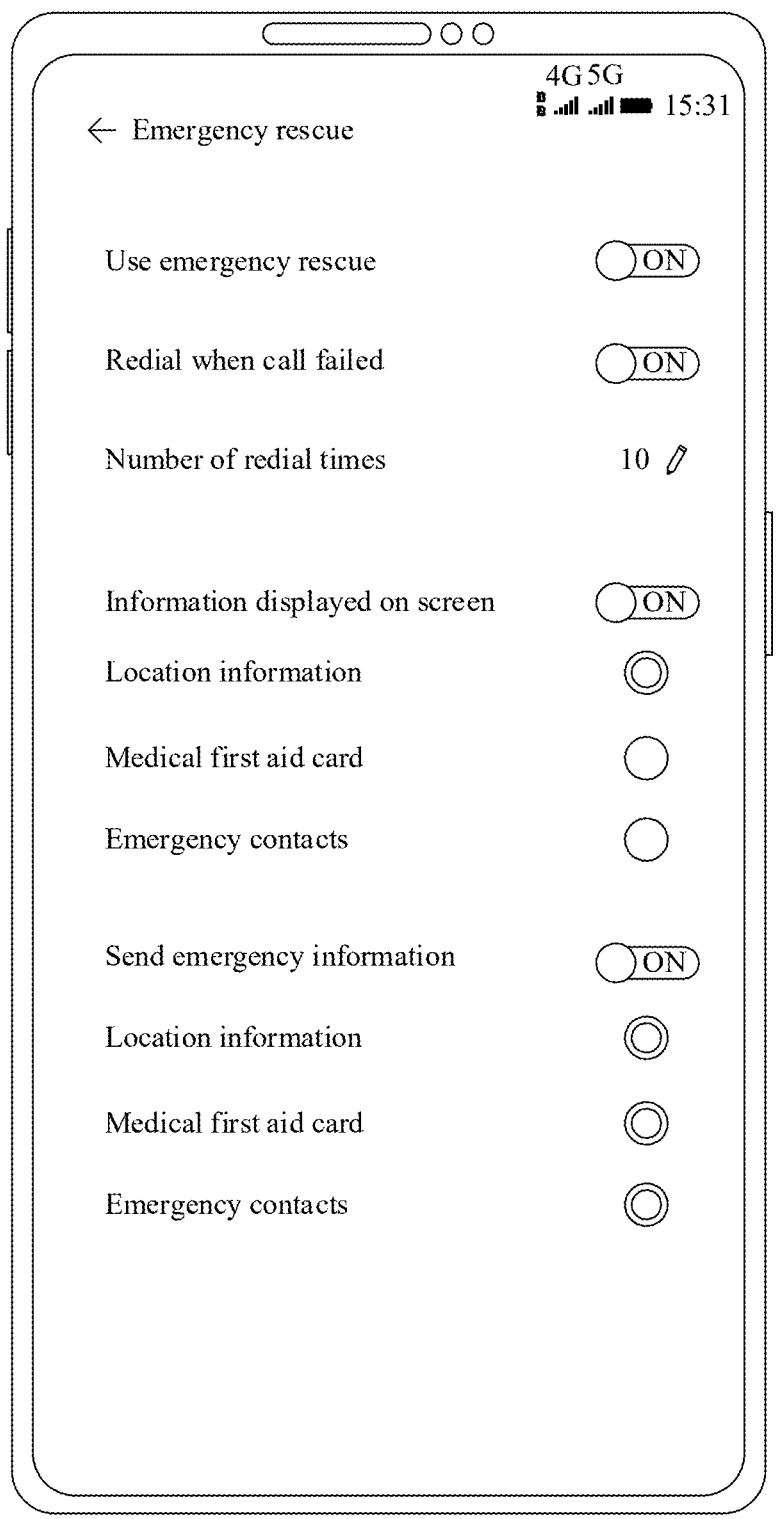
FIG. 21 is a schematic diagram of an interface when a call prompt method is applied according to another embodiment of this application.

As shown in FIG. 21, in a setting interface, whether to use emergency rescue, whether to redial when a call fails, a quantity of times of redialing, and the like may be set. In addition, whether to display emergency information on a screen (such as current location information, a preset medical first aid card, and emergency contacts) and whether to send emergency information to an emergency rescue number may further be set.

When emergency rescue is used, and when a number dialed is identified as an emergency help number, prompting may be performed based on preset emergency rescue options. The emergency help number is a police number, a fire emergency number, an emergency number, or the like, for example, 110, 119, or 120, or emergency help numbers of other countries and regions, such as 911, 999, and 000.

In some implementations, a corresponding prompt may be displayed on the screen based on a type of the dialed emergency help number. For example, when 120 is dialed, a medical first aid card may be displayed; and when 119 is dialed, location information may be displayed. Similarly, different emergency information may also be sent to the emergency numbers based on the different dialed numbers, and details are not described herein.

Refer to FIG. 21. In some other implementations, when an emergency rescue number is dialed, a prompt box may be displayed on a call interface, to prompt a user that call prompting of emergency rescue may be enabled for the current number. If an operation that the user selects to enable call prompting is received, call prompting may be performed based on preset emergency rescue settings.

Determining whether the manual enabling condition is met essentially is determining whether an enabling instruction of the user is received. The enabling instruction of the user may be an enabling setting performed in a setting menu, or may be a preset operation gesture, or the like. This is not limited herein.

Figure 24:
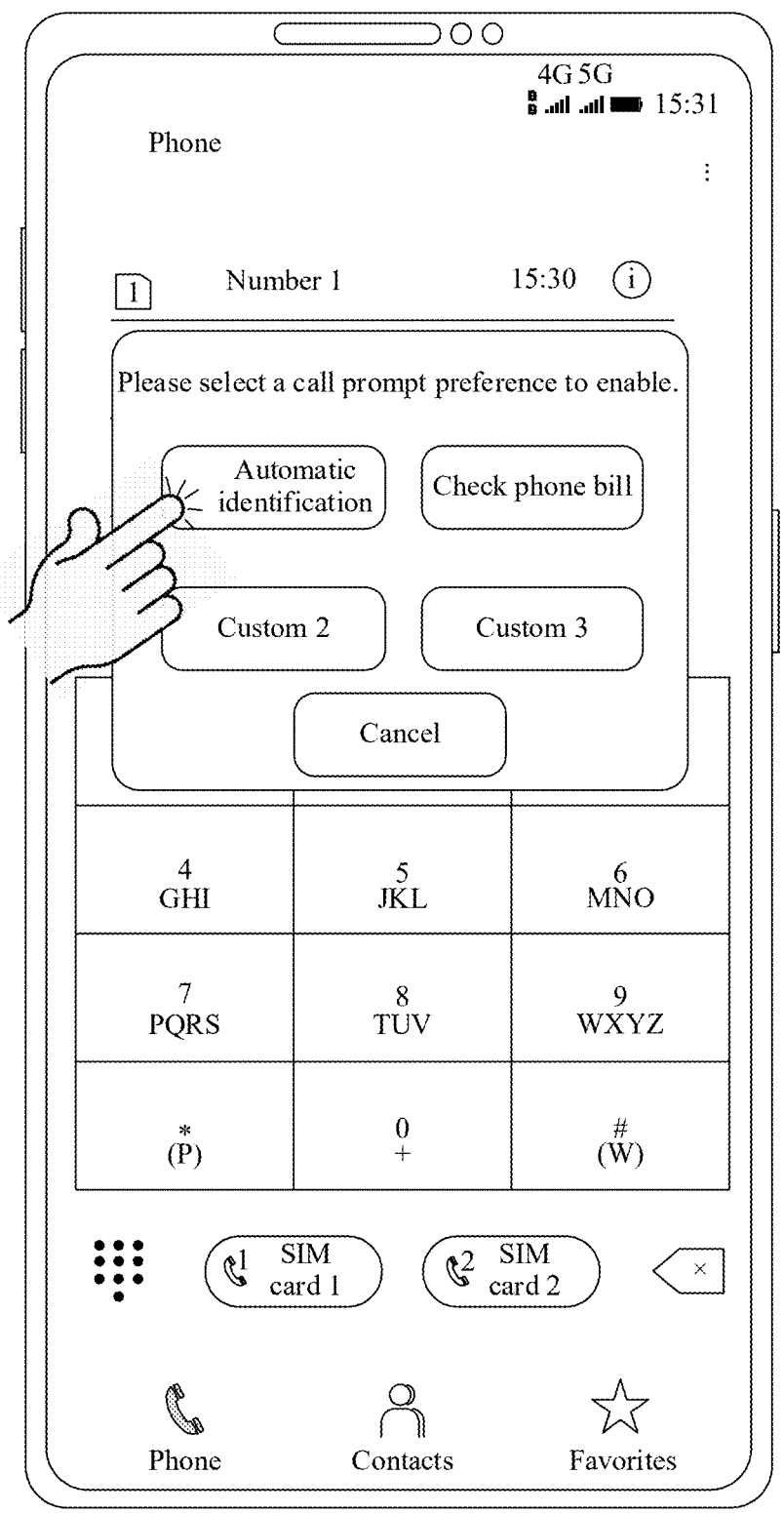
FIG. 24 is a schematic diagram of an interface when a call prompt method is applied according to another embodiment of this application.

Refer to FIG. 14. In a possible implementation, a dialing interface displayed by a call device displays a dialing keyboard, a call record, and an enabling area (in this embodiment, the enabling area is three dots vertically arranged in an upper right corner, but is not limited thereto) of a shortcut setting menu, and the like. After receiving a tap operation performed on an enabling area of a shortcut setting menu, the call device displays a shortcut setting menu shown in FIG. 23. If a tap operation performed on "Enabling call prompting" is received, a call prompt preference selection menu in FIG. 24 is displayed. In the menu, "Automatic identification" and a plurality of customized options are displayed, and each customized option corresponds to a preset call prompt rule. If a tap operation performed on the "Automatic identification" option is received, the call prompt mode is enabled, and conditions such as a prompt manner and prompt triggering of the call prompt mode are the same as those in a case of automatically enabling the call prompt mode.

When a tap operation performed on a customized option such as "Check phone bill", "Custom 2", or "Custom 3" is received, the call prompt mode is enabled based on a call prompt rule corresponding to the customized option.

Figure 15:
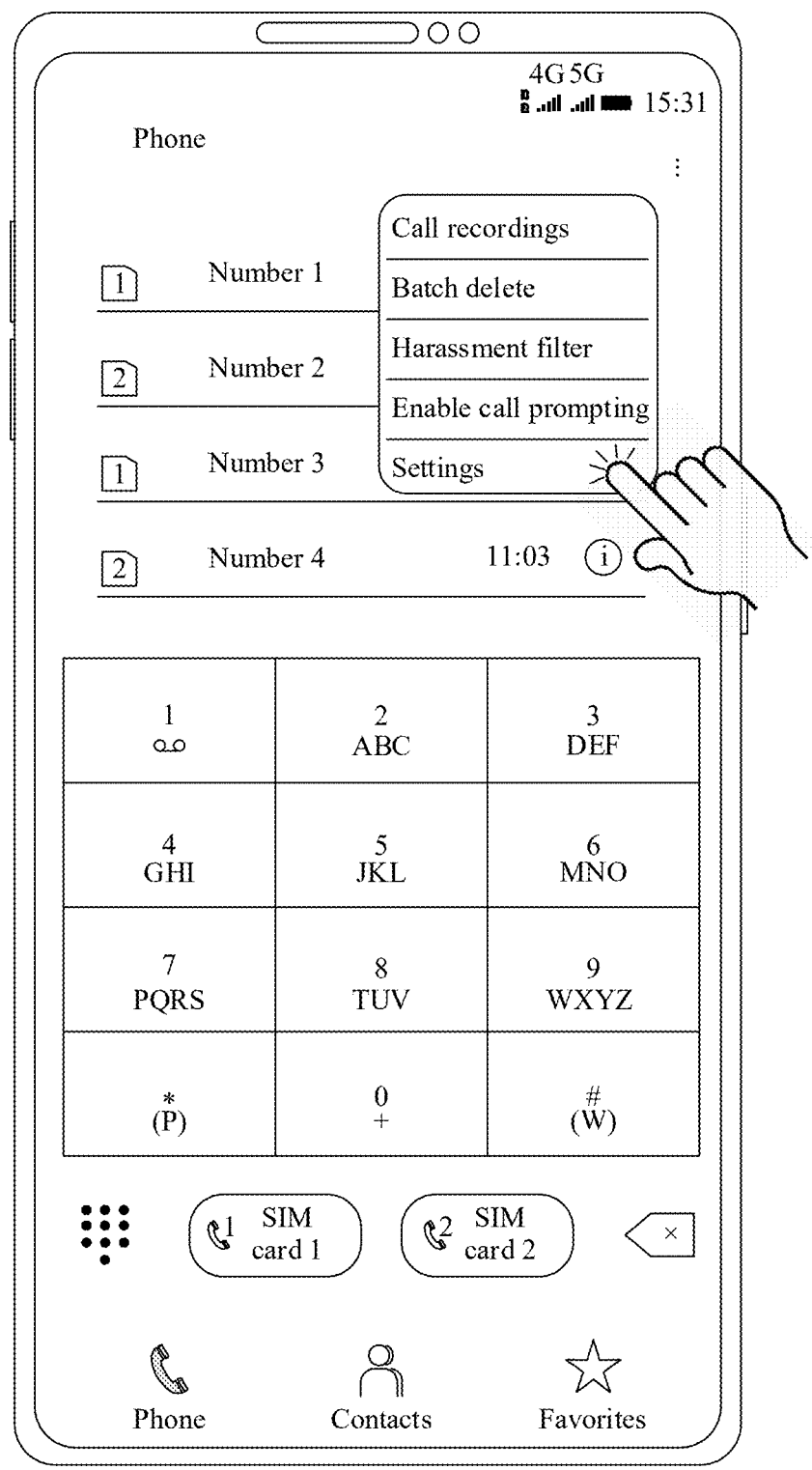
FIG. 15 is a schematic diagram of an interface when a call prompt method is applied according to another embodiment of this application.
Figure 16:
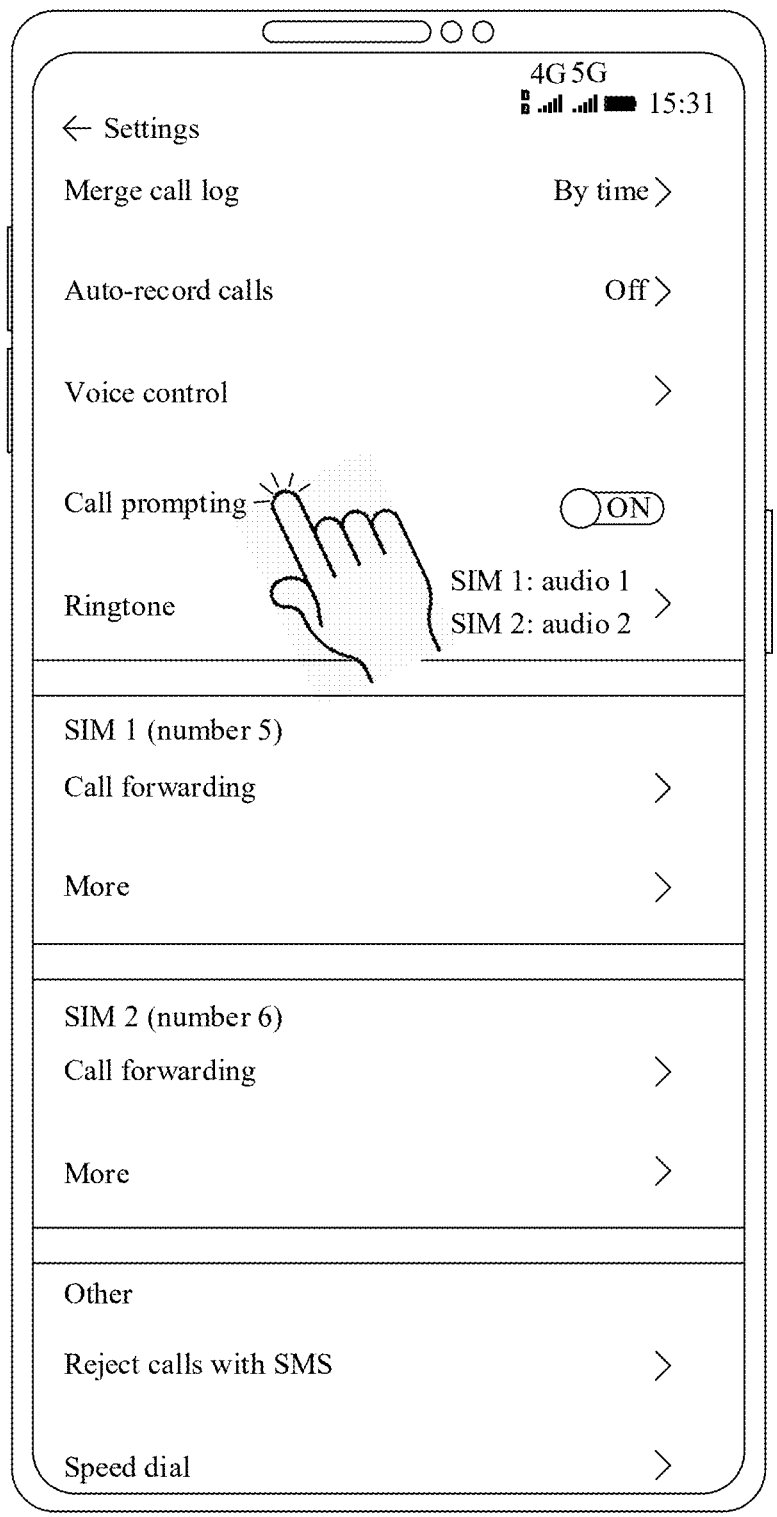
FIG. 16 is a schematic diagram of an interface when a call prompt method is applied according to another embodiment of this application.

Refer to the shortcut setting menu shown in FIG. 15. In a possible implementation, similar to the case of automatically enabling the call prompt mode, if a tap operation performed on the "Settings" option is received, a setting interface shown in FIG. 16 is displayed.

For example only, on the "Call prompt" option, an enabling button can be set. The enabling button shown in FIG. 16 is displayed as "ON", indicating that the call prompt mode is enabled. If a tap operation or a drag operation performed on the enabling button is received, the call prompt mode is disabled, and the enabling button is displayed as "OFF", so that the user can quickly enable or disable the call prompt mode.

Figure 17:
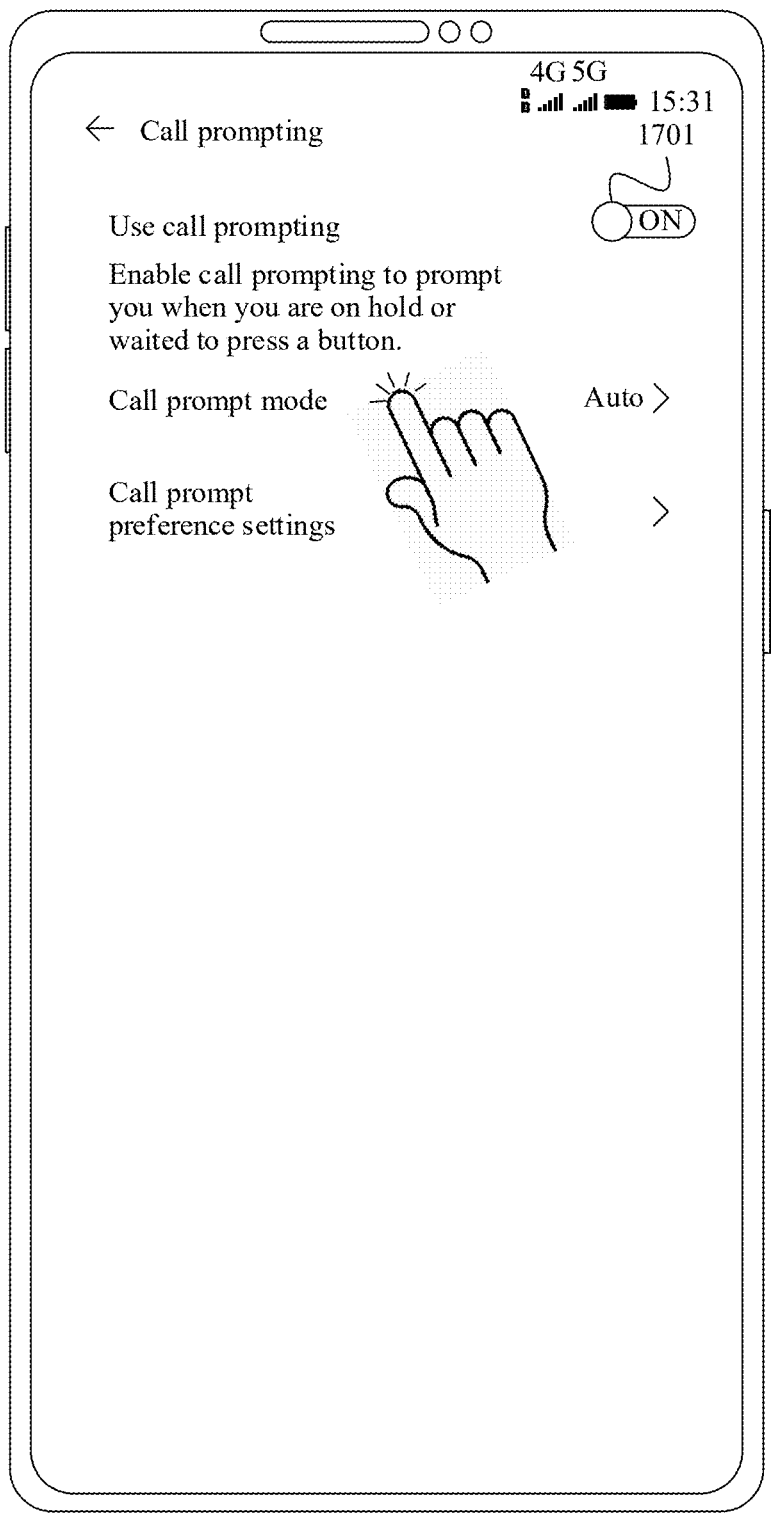
FIG. 17 is a schematic diagram of an interface when a call prompt method is applied according to another embodiment of this application.

In some implementations, a call prompt setting interface may be the interface shown in FIG. 17. In the interface, call prompting may be enabled or disabled. Enabling or disabling the call prompt mode in FIG. 17 is associated with the enabling button in FIG. 16, that is, same settings are maintained. For example, if the call prompt mode is disabled in the interface shown in FIG. 16, when the interface shown in FIG. 17 is entered, the call prompt mode is also disabled.

Figure 25:
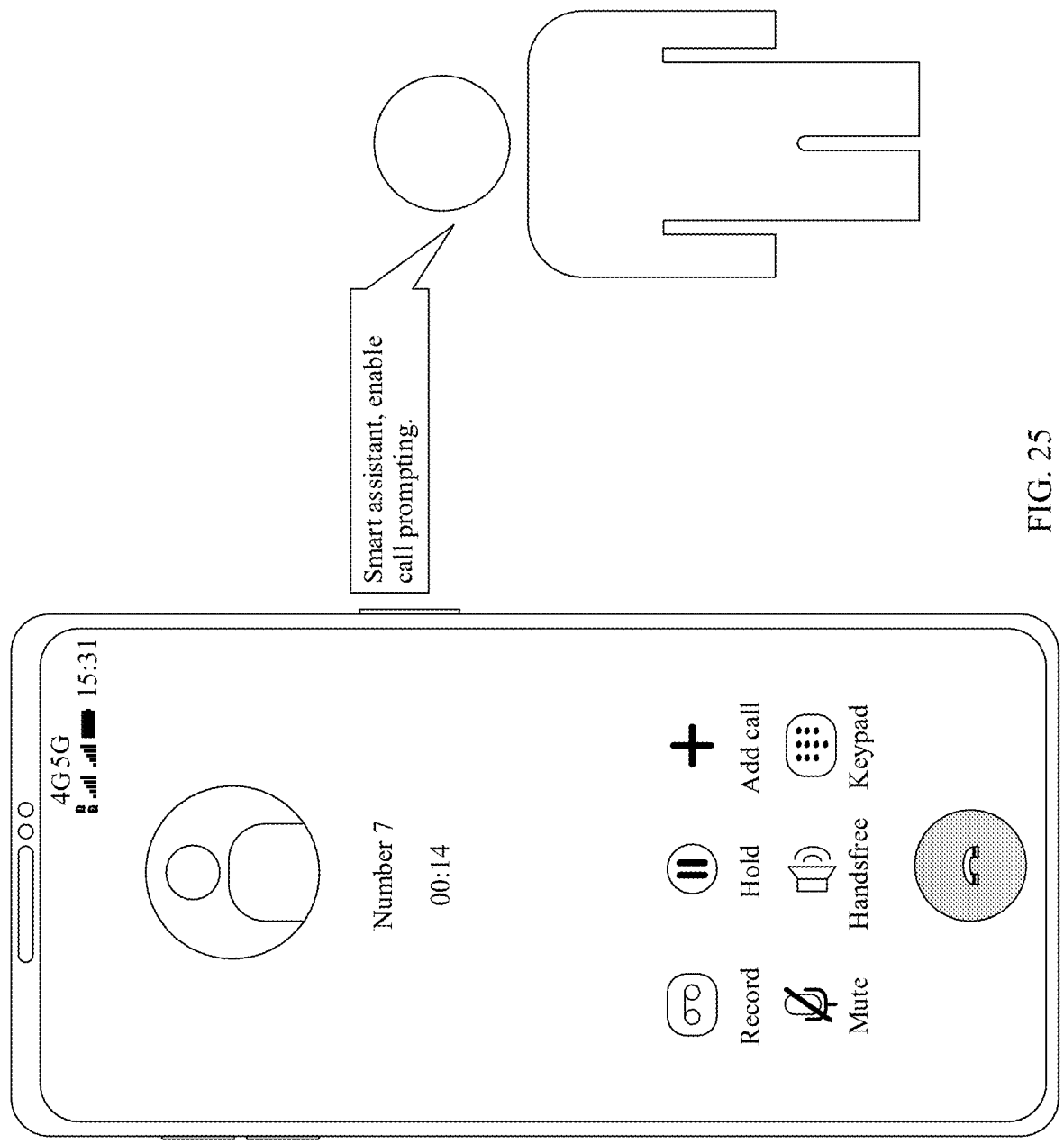
FIG. 25 is a schematic diagram of an interface when a call prompt method is applied according to another embodiment of this application.

In some other implementations, call prompting may be further enabled by using a voice instruction. When receiving a preset wakeup command, the call device may enable or disable call prompting based on the wakeup command. Refer to FIG. 25. For example, if the preset wakeup command starts with "Smart assistant", during a call, if "Smart assistant" is detected in a received voice, the call device analyzes audio following "Smart assistant", obtains a command represented by the audio after "Smart assistant", and performs a corresponding operation. For example, if a voice following "Smart assistant" is "enable call prompting", a command represented by "enable call prompting" may be a call prompt mode enabling instruction. If a voice following "Smart assistant" is "stop call prompting", a command represented by "stop call prompting" may be a call prompt mode termination instruction.

If the call prompt mode is enabled, after a tap operation performed on "Call prompt mode" is received, the call prompt mode selection interface shown in FIG. 18 is displayed. In the interface in FIG. 18, after it is determined, based on a received selection operation, that a call prompt mode is a custom mode, the call prompt setting interface shown in FIG. 17 may be returned to. When a tap operation performed on "Call prompt preference settings" is received, an interface for setting a customized call prompt mode shown in FIG. 26 is displayed.

Figure 26:
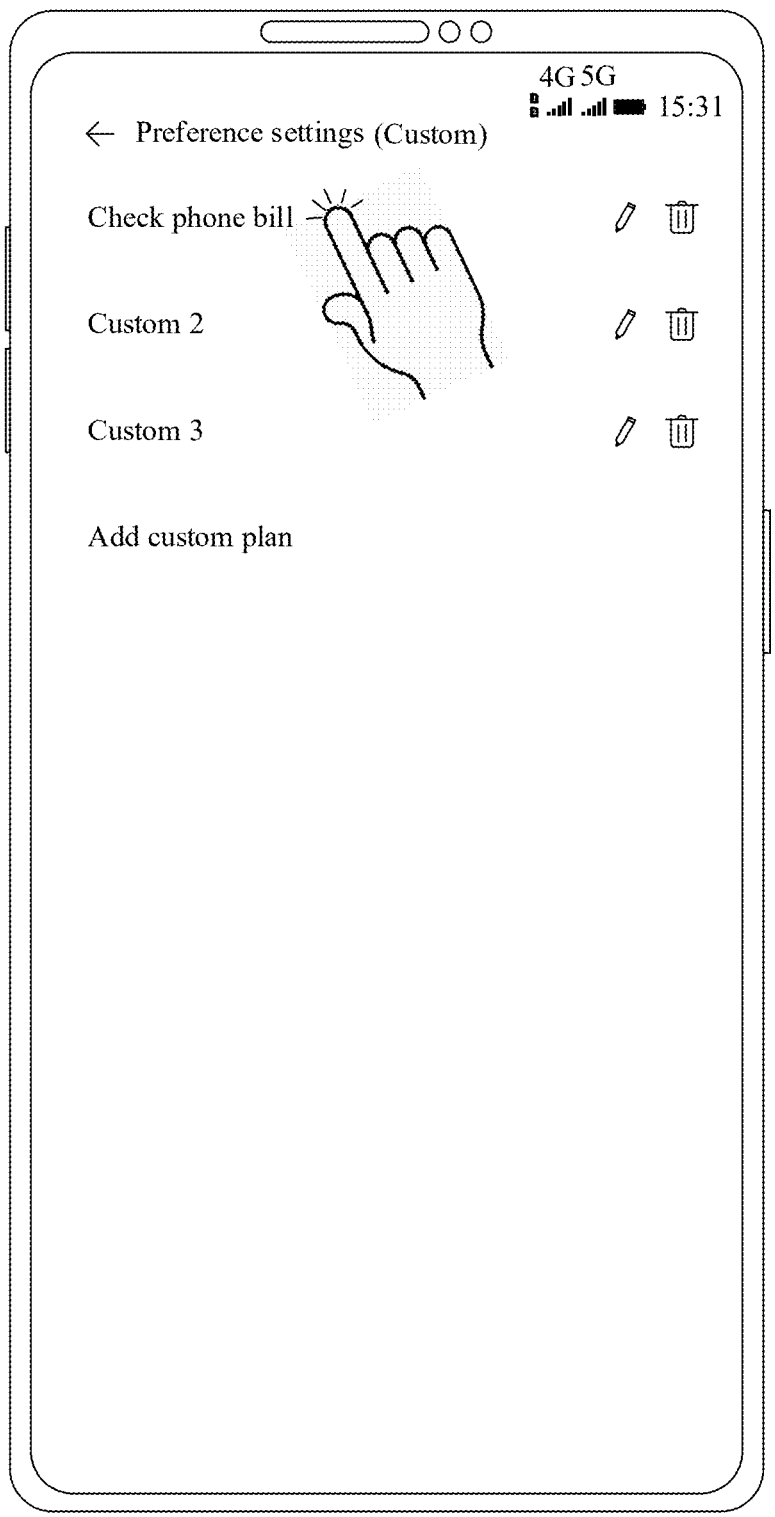
FIG. 26 is a schematic diagram of an interface when a call prompt method is applied according to another embodiment of this application.

In FIG. 26, a plurality of user-defined options that can be selected are shown. Each user-defined option may be used to perform an editing operation or a deleting operation by performing an operation on an editing mark (shown in a pencil shape in the figure) or a deletion mark (shown in a trash can shape in the figure) corresponding to the option. The editing operation is used to change a name and sequence of a customized option. For example, after a tap operation performed on an editing mark is received, a name editing window may be displayed, to receive an input name of a customized option, for example, "Check phone bill", "Transfer to the manual service", or "Redial". If a touch-and-hold operation performed on the editing mark is received, the customized option may be moved based on a received sliding operation, to change a sequence of the corresponding customized option in a plurality of customized options. For example, when a touch-and-hold operation performed on an editing mark corresponding to the "Check phone bill" option is received, and then a downward sliding operation is received, the "Check phone bill" option is moved to the bottom of all customized options. After the sliding operation ends, the "Check phone bill" option stays at the end of the plurality of customized options. However, a customized option that has been displayed on the interface may be deleted by using a tap operation performed on the deleting mark. For example, when a tap operation performed on a corresponding deleting mark after "Custom 3" is received, the "Custom 3" option may be deleted, and only two options "Check phone bill" and "Custom 2" remain on the interface. Finally, a customized option may be added when a tap operation for "Add custom plan" is received. When a customized option is added, a name that is of the new customized option and that is input by the user may be received by displaying a pop-up window, or may be named as "Custom N" by default, where N is a number of existing customized options plus one. For example, three customized options are shown in FIG. 26. If a default name is used, a name of a newly added customized option is "Custom 4".

In some implementations, after a tap operation performed on a customized option is received, a setting interface corresponding to the customized option is displayed. For example, after a tap operation performed on the "Check phone bill" option is received, an interface shown in FIG. 17 is displayed. In the interface shown in FIG. 27, a processing policy used when an external call device is detected or a speaker is turned on may be selected. Similar to the automatic mode, a processing policy of the custom mode also includes: "Stop call prompting", "Keep call prompting", and "Prompt me". In addition, a processing manner corresponding to each policy is the same as that in the automatic mode. Details are not described herein.

Figure 27:
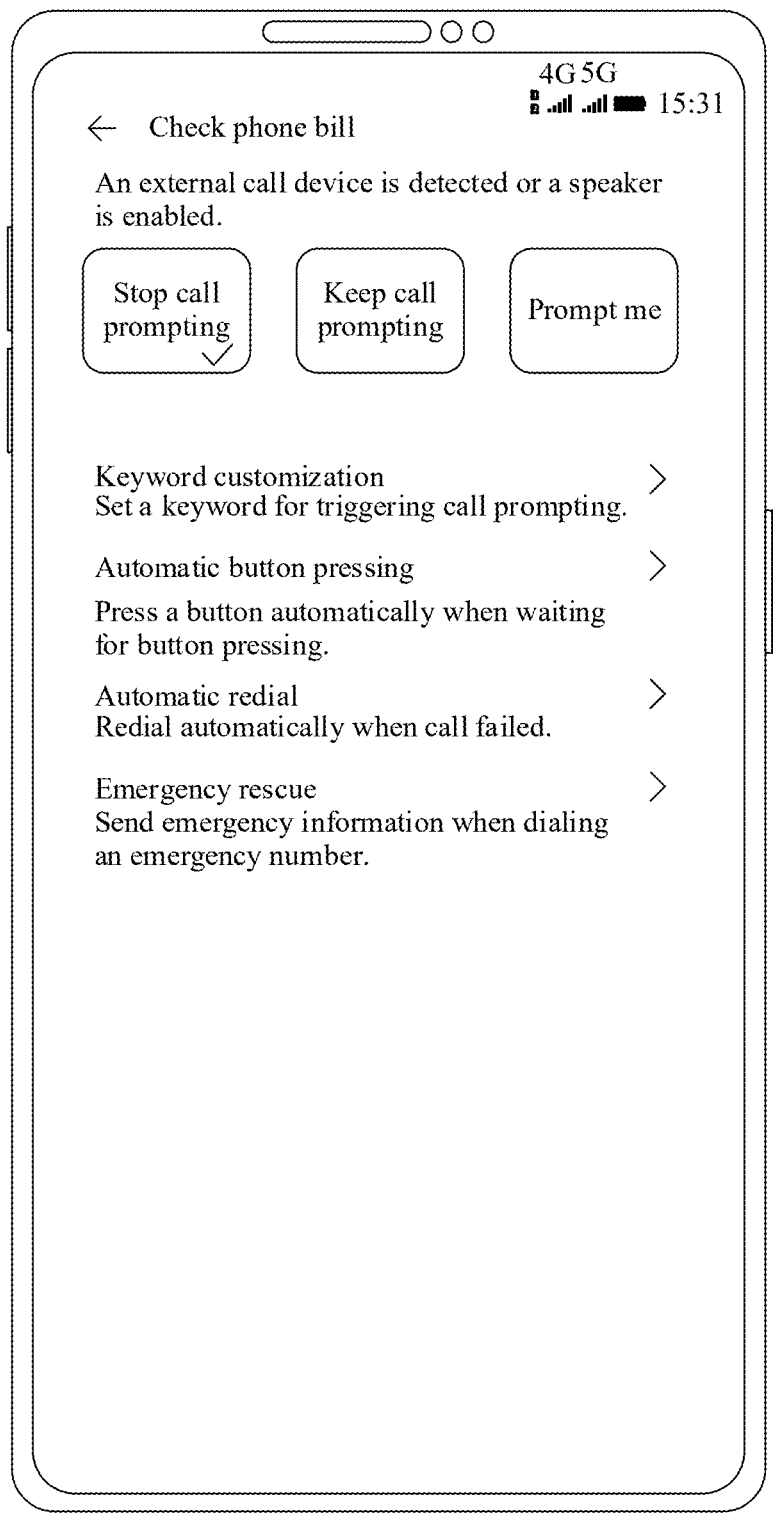
FIG. 27 is a schematic diagram of an interface when a call prompt method is applied according to another embodiment of this application.

In some implementations, in the interface shown in FIG. 27, "Keyword customization", "Automatic button pressing", "Automatic redial ", or "Emergency rescue" may be selected to be set by using a tap operation performed on a corresponding option.

Figure 28:
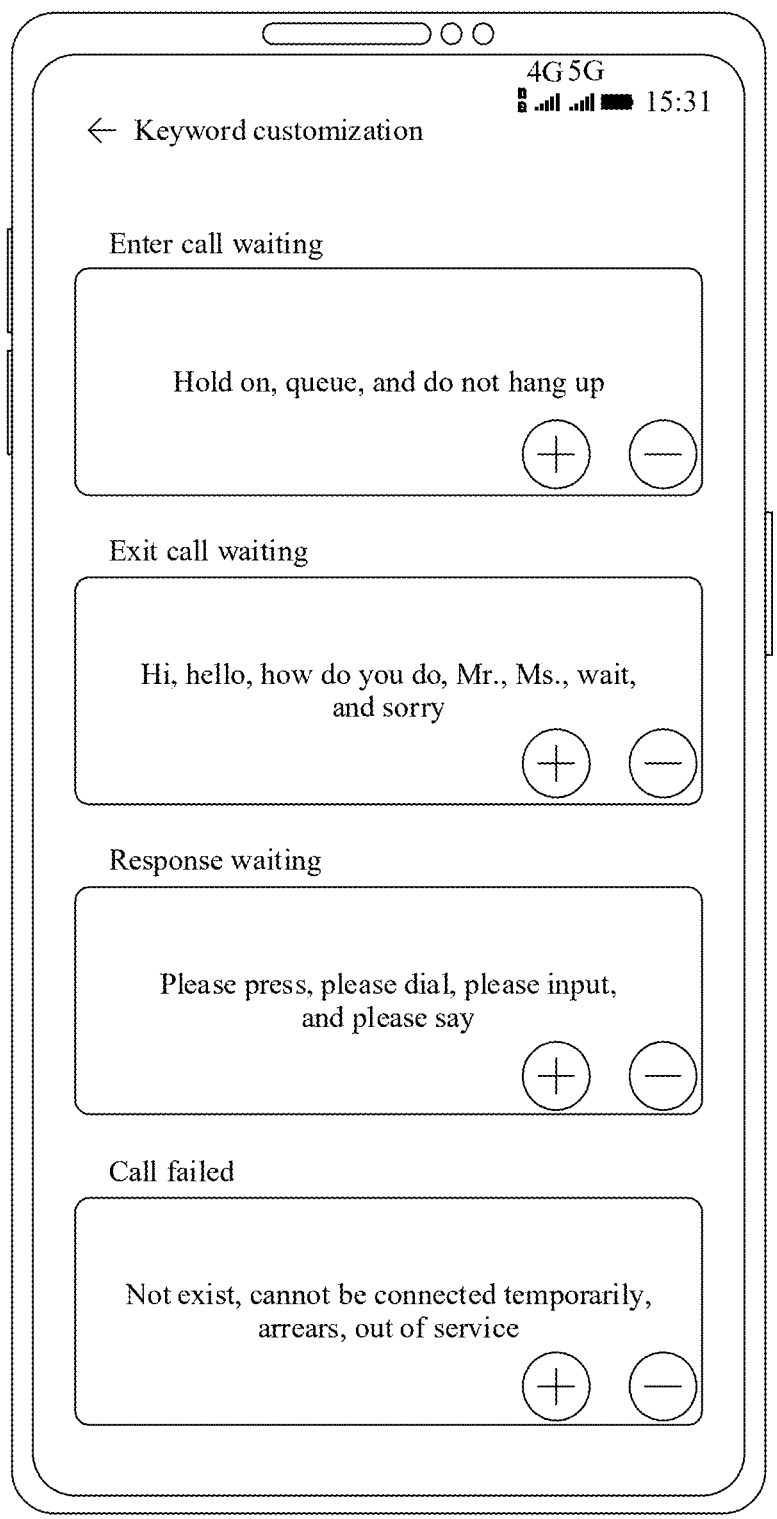
FIG. 28 is a schematic flowchart of a prompt method according to another embodiment of this application.

As an example rather than a limitation, after a tap operation performed on "Keyword customization" is received, an interface shown in FIG. 28 may be displayed. In the interface shown in FIG. 18, keywords (audio features of call waiting) such as "Hold on", "queue", and "do not hang up" for determining a call waiting state may be set. Keywords (second audio features) such as "Hi", "Hello", "How do you do", "Mr.", "Ms.", "wait", and "sorry" for exiting call waiting may also be set. Keywords (third audio features) such as "Please press", "please dial", "please input", and "please say" for determining a response waiting state may also be set. Finally, keywords such as "Does not exist", "cannot be connected temporarily", "arrears", and "not in the service area" for determining a call failed state may also be set.

It should be noted that, after the input customized keywords are received, keywords of a category are based on the customized keywords, and the correspondence in the call state identification database is no longer referred to. For example, refer to the keywords for entering call waiting in FIG. 28. If there is a correspondence "call waiting state-hold on" in the call status identification database, but there is no "hold on" in the customized keywords, when the audio feature "hold on" appears, it is not determined that the call state is the call waiting state.

It should be further noted that, if an input customized keyword is not received for a category, a correspondence in the call state identification database is used as a reference for a keyword of the category. For example, if no customized keyword is input in "Response waiting", a response waiting state is determined during a call based on a correspondence prestored in the call status identification database.

Figure 29:
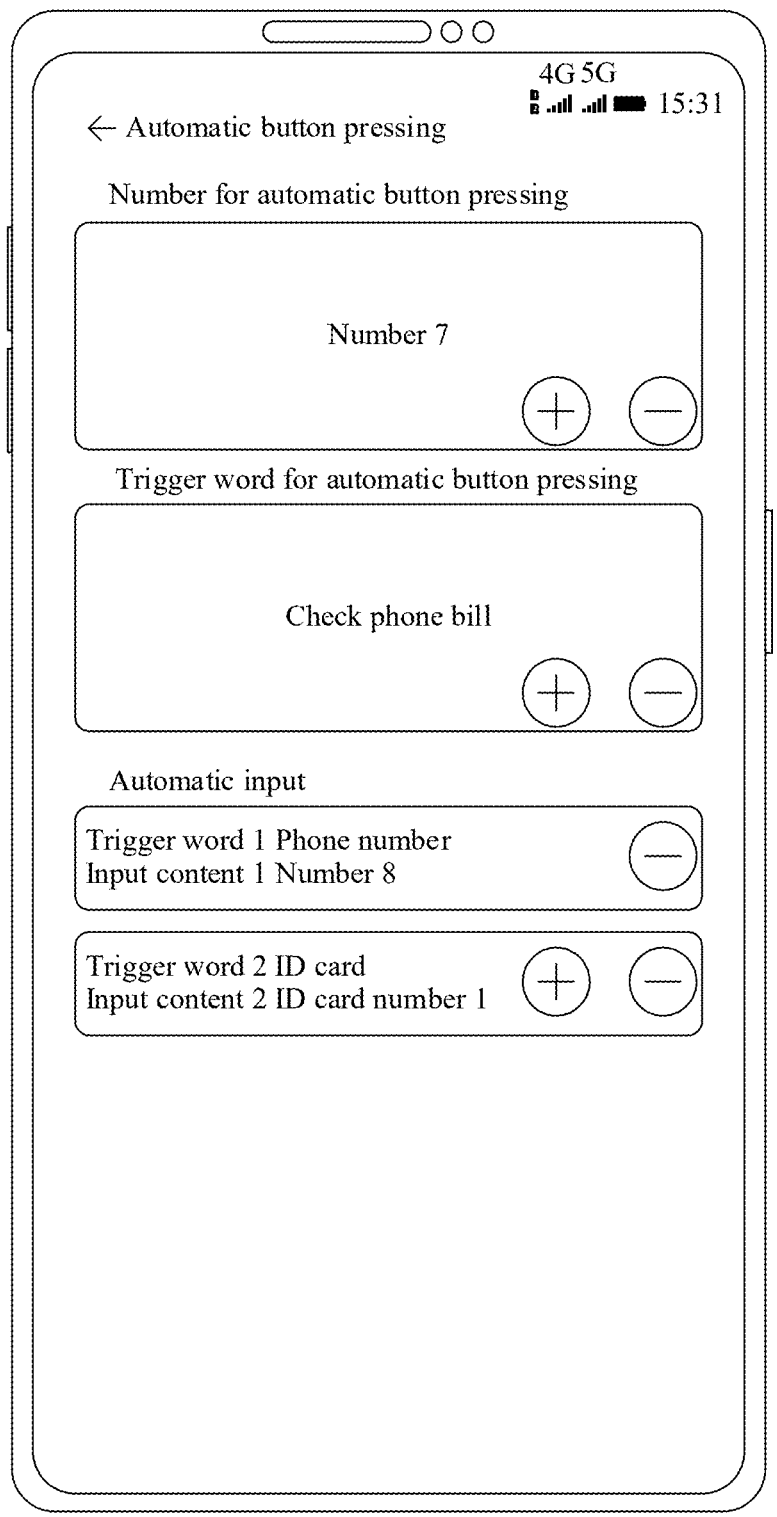
FIG. 29 is a schematic flowchart of a prompt method according to another embodiment of this application.

In some implementations, when a tap operation performed on the "Automatic button pressing" is received, an interface shown in FIG. 29 may be displayed. In the interface shown in FIG. 29, a number and trigger words such as "Number 7", "Check phone bill", and "transfer to the manual service" for triggering "Automatic button pressing" may be set. After "Press a button automatically" is triggered, trigger words for automatic input such as "Phone number" and "ID card" may be set.

As an example rather than a limitation, when a number of a call is a number of "Number for automatic button pressing", and a statement including "Trigger word for automatic button pressing" is identified in the call, a button indicated in the statement in which the trigger word is located is automatically dialed. For example, if "Check phone bill" is set for "Trigger word for automatic button pressing", "1" is automatically dialed when "Press 1 to check a phone bill" is detected. If "Transfer to the manual service" is set for "Trigger word for automatic button pressing", "o" is automatically dialed when "Press 0 to transfer to the manual service" is detected.

In a possible implementation, required content may be automatically input when a trigger word of "Automatic input" is recognized. For example, if a trigger word 1 is set as "Phone number", corresponding input content 1 is "Number 8". When "Please enter the phone number for the query and press the pound key (#) to end" is identified, "Number 8+pound key (#)" are automatically dialed. If a triggering word 2 is set as "ID card", corresponding input content 2 is "ID card number 1". When "Please enter the ID card number and press the pound key (#) to end" is identified, "ID card number 1+pound key (#)" are automatically dialed.

It should be noted that, when a button operation of the user is received, a button corresponding to an area in which a touchscreen receives a tap operation is first determined, and then button information of a digit or a character corresponding to the button is generated and sent to a processor, where the button information is used to instruct to perform a button operation on the corresponding digit or character. The processor performs dialing based on digits or characters corresponding to a plurality of pieces of received button information, or sends the digits or characters corresponding to the received button information to a number in a call.

Automatic dialing can be performed by a call device to simulate a button pressing operation of a user. For example, when buttons involved in automatic dialing are digits o to 9 and characters "*" and "#", button information corresponding to each digit and character may be pre-stored. When automatic dialing needs to be performed, pre-stored corresponding button information is sent to the processor in sequence based on a digit or a character that needs to be dialed. The processor sends the digit or character corresponding to the received button information to a number in the call.

Figure 30:
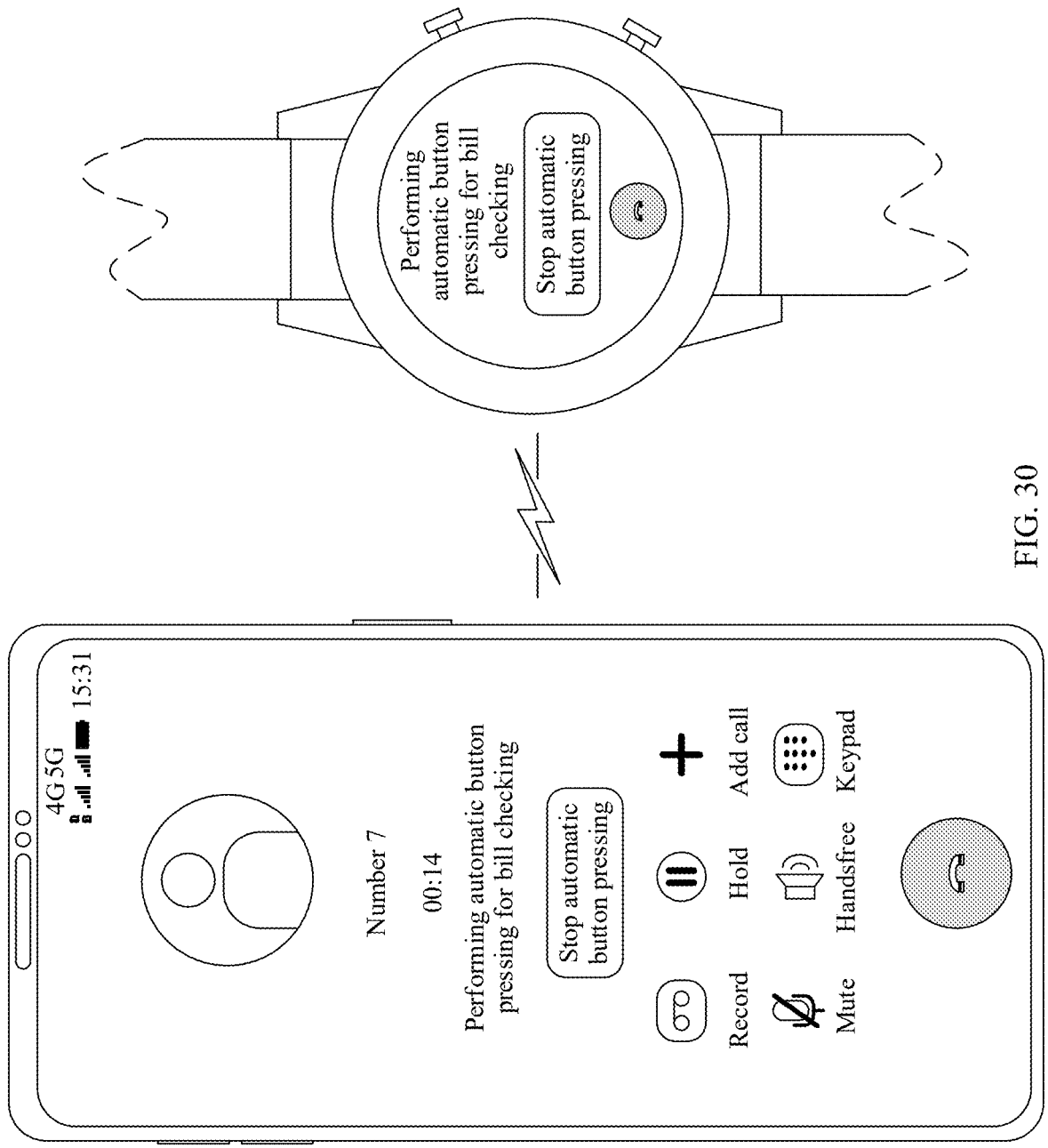
FIG. 30 is a schematic flowchart of a prompt method according to another embodiment of this application.

Refer to FIG. 30 and the foregoing example. The preference of "Check phone bill" is enabled and a dialed number is "Number 7". When the trigger word of "Check phone bill" is identified, "Press a button automatically" is enabled. "Performing automatic button pressing for bill checking" is prompted on a screen and simultaneously, prompt information of "Stop automatic button pressing" is displayed. If no operation of the user is received, a button response based on a preset automatic button pressing parameter is performed. If a tap operation performed on "Stop automatic button pressing" is received, automatic button pressing is terminated, and a response operation (for example, a tap operation or a voice input) is waited for the user to perform.

Figure 31:
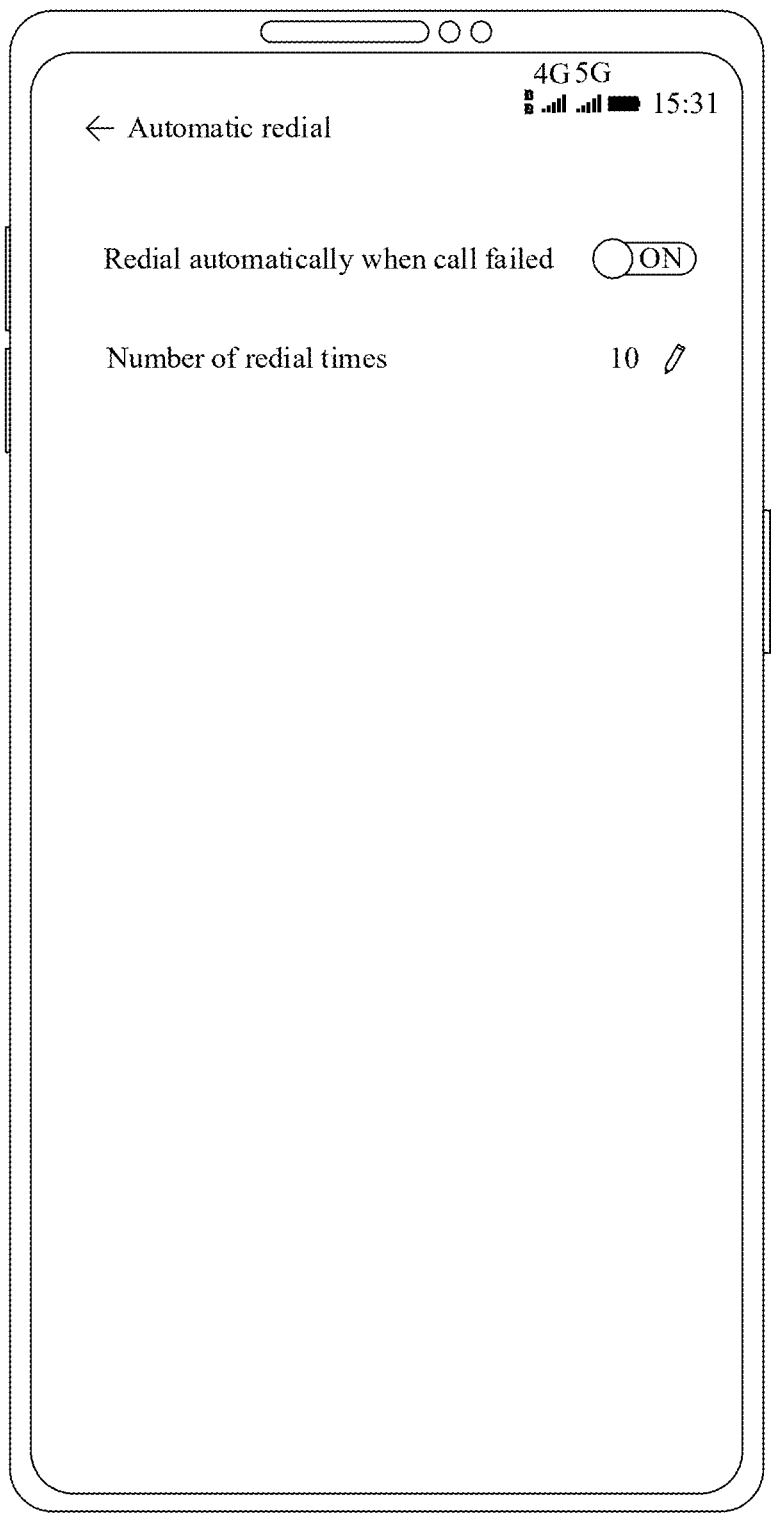
FIG. 31 is a schematic flowchart of a prompt method according to another embodiment of this application.

In some implementations, when a tap operation performed on "Automatic redial" is received, an interface shown in FIG. 31 may be displayed. In the interface shown in FIG. 31, whether to enable automatic redial and a number of redial times after automatic redial is enabled may be set. It should be noted that, to prevent a called party from being disturbed due to an excessive number of redial times, a maximum number of redial times may be set to 10, but this is not limited thereto.

S703: Enable a call prompt mode.

It should be noted that, after the call prompt mode is enabled, the call prompt mode may further be manually disabled. For example, refer to FIG. 32. After a tap operation performed on the "Automatic identification" option or the customized option is received, if a tap operation performed on the enabling area of the shortcut setting menu is received again, a shortcut setting menu shown in FIG. 7 may be displayed. The original "Enable call prompting" is changed to "Disable call prompting", and if a tap operation performed on "Disable call prompting" is received, call prompting may be disabled (that is, the mobile phone is set to not use the call prompt mode).

In some implementations, when call prompting is enabled, if it is identified that the call device meets a termination condition of the call prompt mode, call prompting is terminated. The termination condition of the call prompt mode includes: receiving a call prompting termination instruction during a call or identifying, during the call, that a user starts to listen to the call audio. The call prompting termination instruction may be an option button displayed on a call interface, or may be a preset operation, for example, double-tapping a volume-down button, or sliding a preset track on the touchscreen by using a finger. This is not limited herein.

It should be noted that S701 to S703 is an implementation of S31 in FIG. 3.

S704: Identify a first audio feature of received call audio.

As an example rather than a limitation, the identifying a first audio feature may be that voice activity detection (Voice Activity Detection, VAD) on audio data of received call audio is first performed, and a mute segment in the audio data is cut off, to determine boundaries of a voice part in the audio data. Frame division is performed on the audio data in the boundaries, and the audio data in the boundaries is divided into a plurality of frames, where each frame corresponds to a segment of waveform. Then, a Mel-frequency cepstral coefficient (Mel-scale Frequency Cepstral Coefficients, MFCC) characteristic of each frame is extracted, and a waveform of each frame is converted into a 12-dimensional vector (it is assumed that an acoustic feature of the audio data has 12 dimensions in total). A matrix (referred to as an observation sequence) with 12 rows and N columns may be obtained, and the matrix may represent audio data in the foregoing boundaries. Then, a state corresponding to each frame in the observation sequence is determined based on an existing acoustic model, where three states may form one phoneme, and a pronunciation of a word is composed of a plurality of phonemes. Finally, a hidden Markov model (Hidden Markov Model, HMM) is used to match the state corresponding to each frame in the observation sequence to determine recognized text. If there is a keyword that can be used to determine a call state in the recognized text, the keyword is used as the first audio feature.

In another possible implementation, reference may be made to the foregoing method for identifying a keyword. If no keyword is identified, the call audio may be music, a phone signal tone, or the like. For example, in some customer service calls, the call audio may be waiting music played when a call is transferred to the manual service, RBT played when the call waits for the other party to answer, the call connection tone, or the occupation tone.

As an example rather than a limitation, the audio data may be matched with audio in a preset sound database. For example, an acoustic feature of the audio data is first extracted from a frequency domain by a short-time Fourier transform (Short-Time Fourier Transform, STFT). Then, feature matching is performed between the acoustic feature and an acoustic feature in the preset sound database, to determine a music type corresponding to the audio data. For example, if the waiting music, the RBT, the connection tone, and the like are matched, it is determined that the music type is an answer waiting type. If the occupation tone is matched, it is determined that the music type is a call-failed type. Finally, the obtained music type is used as the first audio feature.

S705: Determine a call state based on the first audio feature. If the call state is a response waiting state, S706 is performed; if the call state is a call waiting state, S708 is performed; if the call state is a call failed state, S711 is performed; or if the call state cannot be determined, S712 is performed.

It should be further noted that S704 and S705 are an implementation of S32 in FIG. 3.

S706: If the call state is the response waiting state, perform operation prompting based on the first audio feature or a third audio feature.

S707: Receive a response operation, make a response based on the response operation, exit the response waiting state after the response, and perform S702.

S706 and S707 are an implementation of S51 and S52. A manner of performing operation prompting and a manner of performing operation responding are the same as those in S51 and S52. Details are not described herein again.

S708: If the call state is the call waiting state, identify an audio feature in the call audio.

A manner of identifying the audio feature is the same as that in S704. Details are not described herein again.

S709: If the third audio feature is identified, determine that the call state is the response waiting state, and perform S706.

S710: If a second audio feature is identified, perform answer prompting, exit the call waiting state after the prompt, and perform S702.

S710 is an implementation of S41 and S42. A manner of performing answer prompting is the same as those in S41 and S42. Details are not described herein again.

S711: When the call state is the call-failed state, perform call-failed prompting, perform a hang-up operation or a redial operation, exit the call-failed state after the prompt, and perform S702.

S711 is an implementation of S61 and S62, and a manner of performing call-failed prompting and performing a hang-up operation or a redial operation in S711 is the same as those in S61 and S62. Details are not described herein again.

S712: If the call status cannot be determined, perform answer prompting, and perform S702 after the prompt.

In some implementations, when the first audio feature is not identified in the call audio, for example, content of the call audio does not indicate any call state, the user is prompted to answer the call, to prevent the user from missing information because the user does not answer the call. A manner of performing answer prompting is the same as those in S41 and S42. Details are not described herein again.

In this embodiment, the call prompt method is performed cyclically to ensure that call prompting is provided in time. For example, when a call device dials an operator service number, after the call is connected, it is determined that the call device enables a call prompt mode, and then after call audio is received, a first audio feature is identified. For example, call audio of "Please press 1 to query the call fee, press 2 to handle a service, and press 0 to transfer to the manual service" may be received, and the recognized first audio feature is "Please press", to indicate that a call state is a response waiting state. Then, prompt information of "Check phone bill", "Handle service", and "Transfer to the manual service" is displayed on a screen. If a tap operation for "Transfer to the manual service" is received, the response waiting state is exited and "o" is dialed to a calling party.

After receiving "o", the calling party enters a process of transferring to the manual service. That the call device enables the call prompt mode continues to be determined and a first audio feature is identified. For example, when the call is transferred to the manual service, if call audio of "The attendant is busy, please hold on" is received, the first audio feature is "please hold on", and it is determined that the call state is a call waiting state. After the waiting ends, when the attendant answers the call, the attendant may receive call audio of "Hello, sir, sorry to have kept you waiting". After a second audio feature such as "sir" or "wait" is identified, answer prompting such as vibration and prompt information displaying is performed, the call device exits the call waiting state. That the call device enables the call prompt mode continues to be determined and a first audio feature is identified.

If the first audio feature is identified again in the call audio, the call device enters a corresponding call state and performs prompting until the call device exits the call prompt mode or the call ends.

Figure 32:
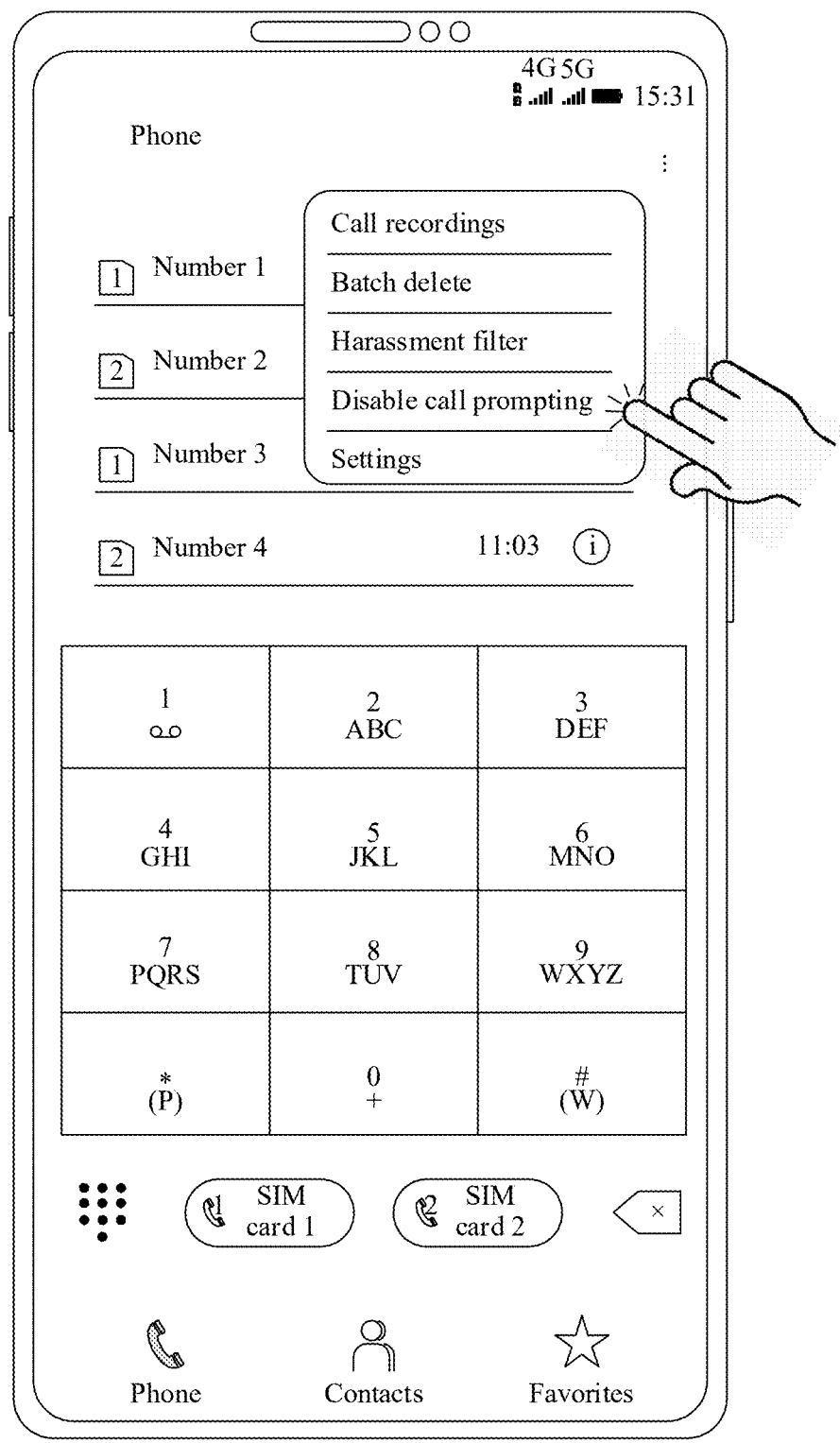
FIG. 32 is a schematic flowchart of a prompt method according to another embodiment of this application.
Figure 33A:
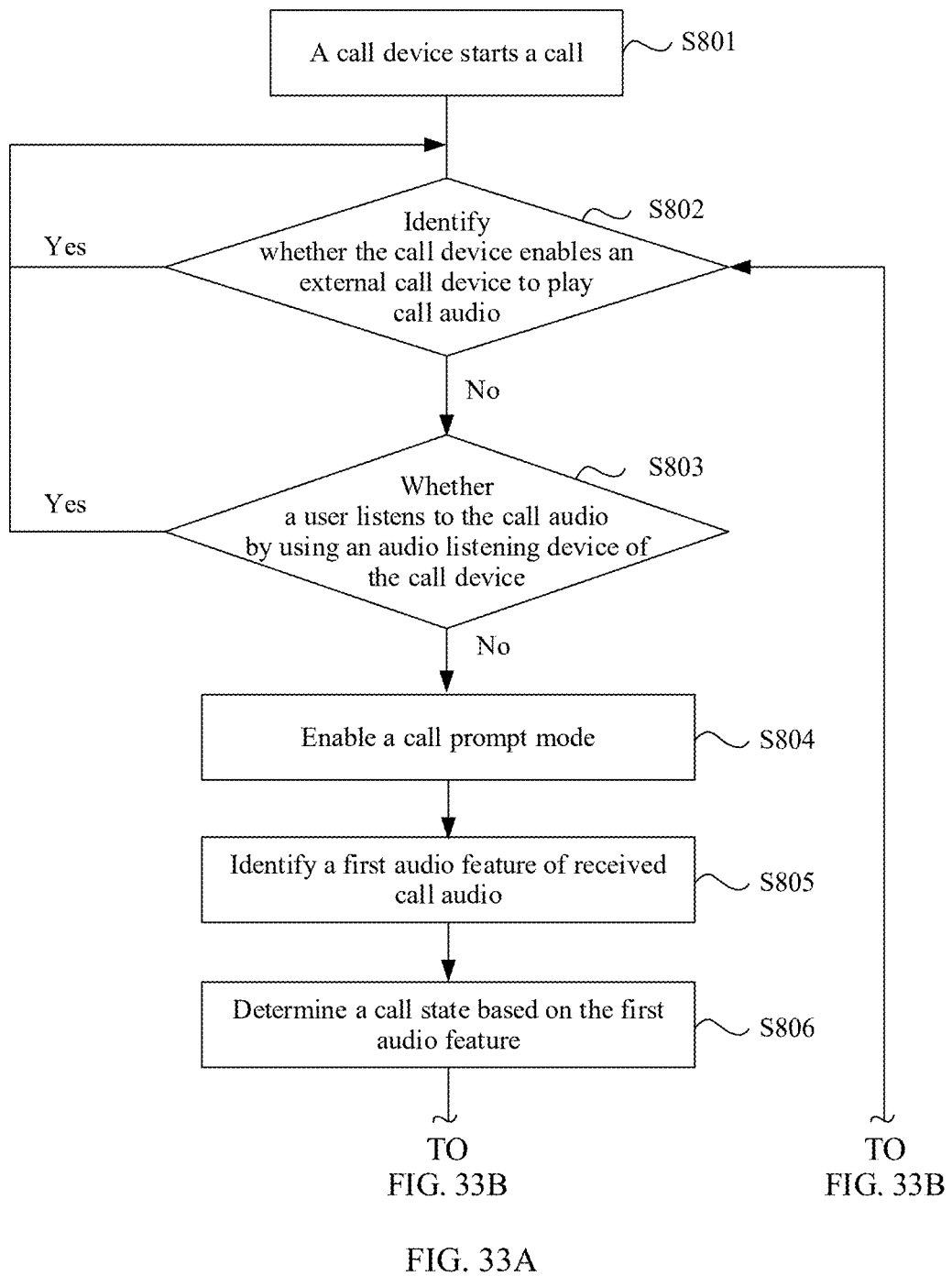
FIG. 33A and FIG. 33B are a schematic flowchart of a prompt method according to another embodiment of this application.
Figure 33B:
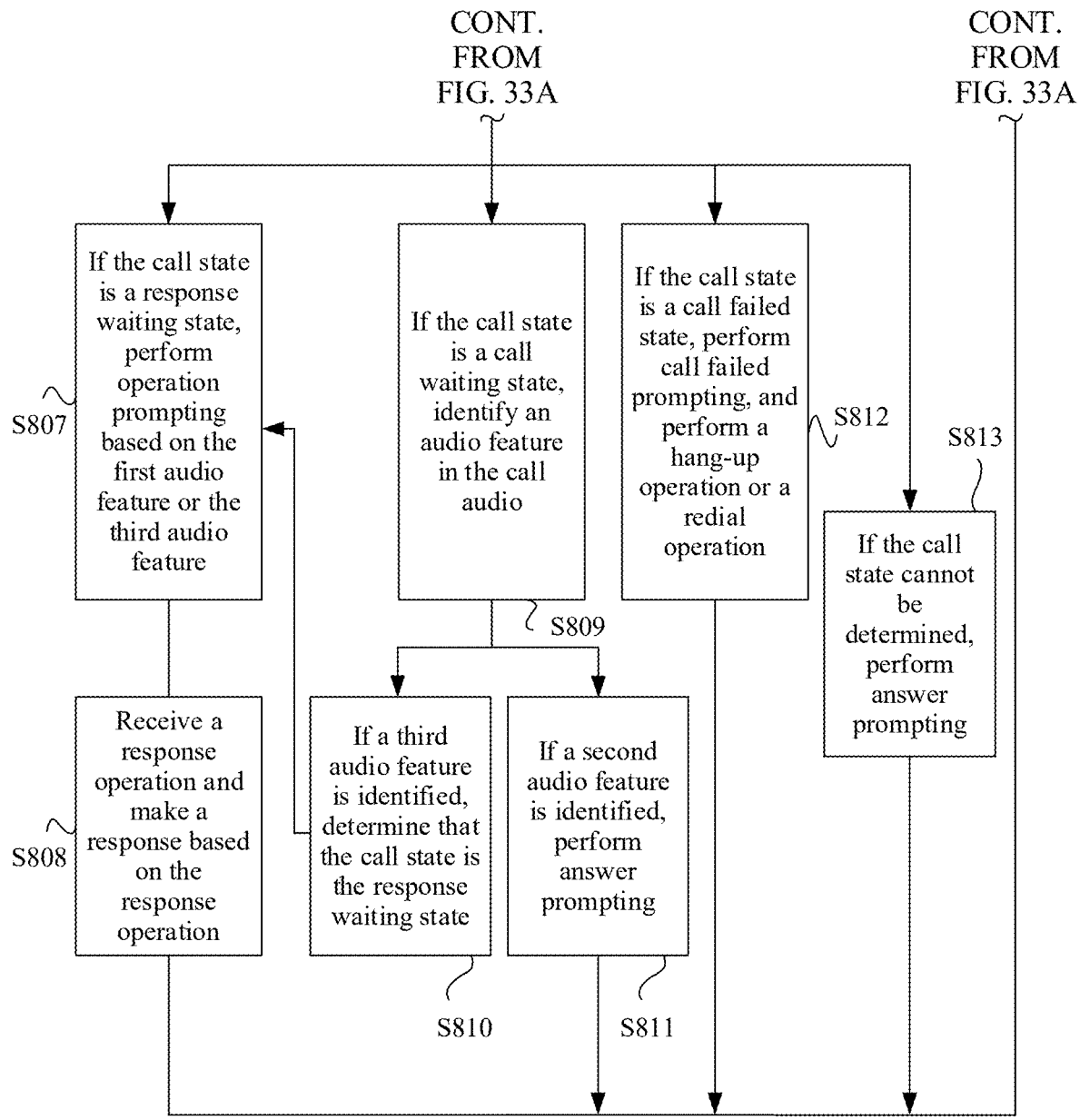

Based on FIG. 32, FIG. 33A and FIG. 33B show an embodiment of enabling call prompting based on detecting whether a user answers call audio.

In this embodiment, a call prompt method includes the following steps:

S801: A call device starts a call.

S802: Identify whether the call device enables an external call apparatus to play call audio; and if the call device does not enable the external call apparatus to play the call audio, perform S803; otherwise, continue to identify whether the external call apparatus is enabled to play the call audio.

When it is identified whether the call device enables the external call apparatus to play the call audio, whether there is load on a headset interface of the call device may be first detected to determine whether a headset is connected to the headset interface. If no load is detected on the headset interface, a wireless communications device list of the call device is further obtained, to determine whether the call device is currently connected to an external call apparatus such as a Bluetooth headset or a Bluetooth speaker. If there is a connected headset or an external call apparatus, a setting option of outputting audio of the call device needs to be read, to determine whether the call device is set to output audio by using the headset or the external call apparatus.

If it is determined that the call device is not connected to a headset or an external call apparatus, or is connected to the external call apparatus but does not output audio by using the headset or the external call apparatus, it is determined that that the call device does not enable the external call apparatus to play the call audio is identified.

S803: Identify whether a user listens to the call audio by using an audio listening device of the call device; if the user does not listen to the call audio, perform S804; otherwise, continue to identify whether to enable the external call apparatus to play the call audio.

The audio listening device includes a speaker and a receiver. During identification, the setting option of the call device may be first read. If the setting option indicates that audio is played by using the speaker, it is determined that the user enables the speaker, that is, the user listens to the call audio by using the audio listening device of the call device.

If the setting option indicates that the audio is played by using the receiver or the external call apparatus, it needs to be detected whether the user sticks the call device to an ear to answer a call. If it is detected that the user sticks the call device to an ear to answer a call, it is determined that the user answers the call by using the audio listening device of the call device. Otherwise, if it is not detected that the user sticks the call device to an ear to answer a call, it is determined that the user does not answer the call by using the audio listening device of the call device.

In some implementations, when the call device is disposed with an optical proximity sensor or a distance sensor near the receiver, and it is detected that light near the receiver of the call device is blocked or an obstacle is stuck close to the receiver, that is, it is determined that a distance between the receiver and a face of the user is less than a preset threshold, it may be determined that the user sticks the call device to an ear to answer a call. Alternatively, when brightness of an image collected by a camera (for example, a front camera) located near a receiver of the call device is lower than a brightness threshold or an image of skin is identified in the image, it may also be determined that the user sticks the call device to an ear to answer a call. As an example rather than a limitation, both a sensor and a camera may be used for detection. For example, if an optical proximity sensor near a receiver detects that a light intensity is less than an intensity threshold, a front camera is enabled to collect an image. If brightness of a collected image is lower than a brightness threshold or skin can be identified in the image, it may be determined that the user sticks the call device to an ear to answer a call. S804: Enable a call prompt mode.

In some implementations, S802 and S803 are an implementation in which the call device automatically identifies the enabled call prompt mode, and settings during prompting is a preset preference. The preset preference may be changed in an operating system of the call device. A setting manner of the preset preference is described in S702. Details are not described herein again.

S805: Identify a first audio feature of received call audio.

A manner of identifying the first audio feature in the call audio is the same as that in S704. Details are not described herein again.

S806: Determine a call state based on the first audio feature. If the call state is a response waiting state, S806 is performed; if the call state is a call waiting state, S808 is performed; if the call state is a call failed state, S811 is performed; or if the call state cannot be determined, S812 is performed.

S807: If the call state is the response waiting state, perform operation prompting based on the first audio feature or a third audio feature.

S808: Receive a response operation, make a response based on the response operation, exit the response waiting state after the response, and perform S802.

In S807 and S808, a manner of performing operation prompting and a manner of performing operation responding are the same as those in S51 and S52. Details are not described herein again.

S809: If the call state is the call waiting state, identify an audio feature in the call audio.

A manner of identifying the audio feature is the same as that in S805. Details are not described herein again.

S810: If the third audio feature is identified, determine that the call state is the response waiting state, and perform S807.

S811: If a second audio feature is identified, perform answer prompting, exit the call waiting state after the prompt, and perform S802.

In S811, a manner of performing answer prompting is the same as those in S41 and S42. Details are not described herein again.

S812: When the call state is the call-failed state, perform call-failed prompting, perform a hang-up operation or a redial operation, exit the call-failed state after the prompt, and perform S802.

In S812, and a manner of performing call-failed prompting and performing a hang-up operation or a redial operation is the same as those in S61 and S62. Details are not described herein again.

S813: If the call status cannot be determined, perform answer prompting, and perform S802 after the prompt.

In this embodiment, the call prompt mode is enabled by identifying whether the user listens to the call audio, so that a service can be provided for the user more pertinently, and experience of the user when using the call device is improved.

Figure 34A:
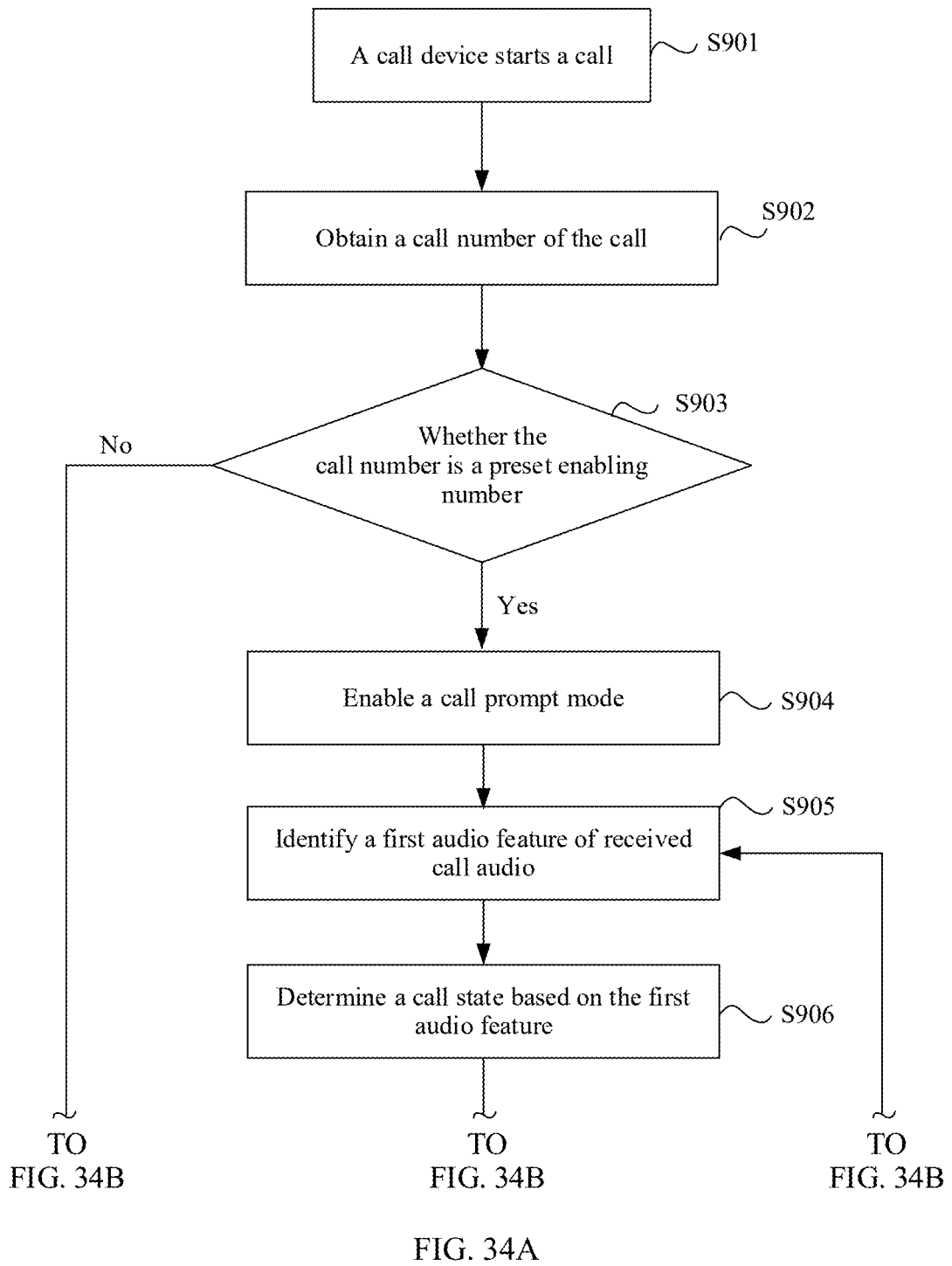
FIG. 34A and FIG. 34B are a schematic flowchart of a prompt method according to another embodiment of this application.
Figure 34B:
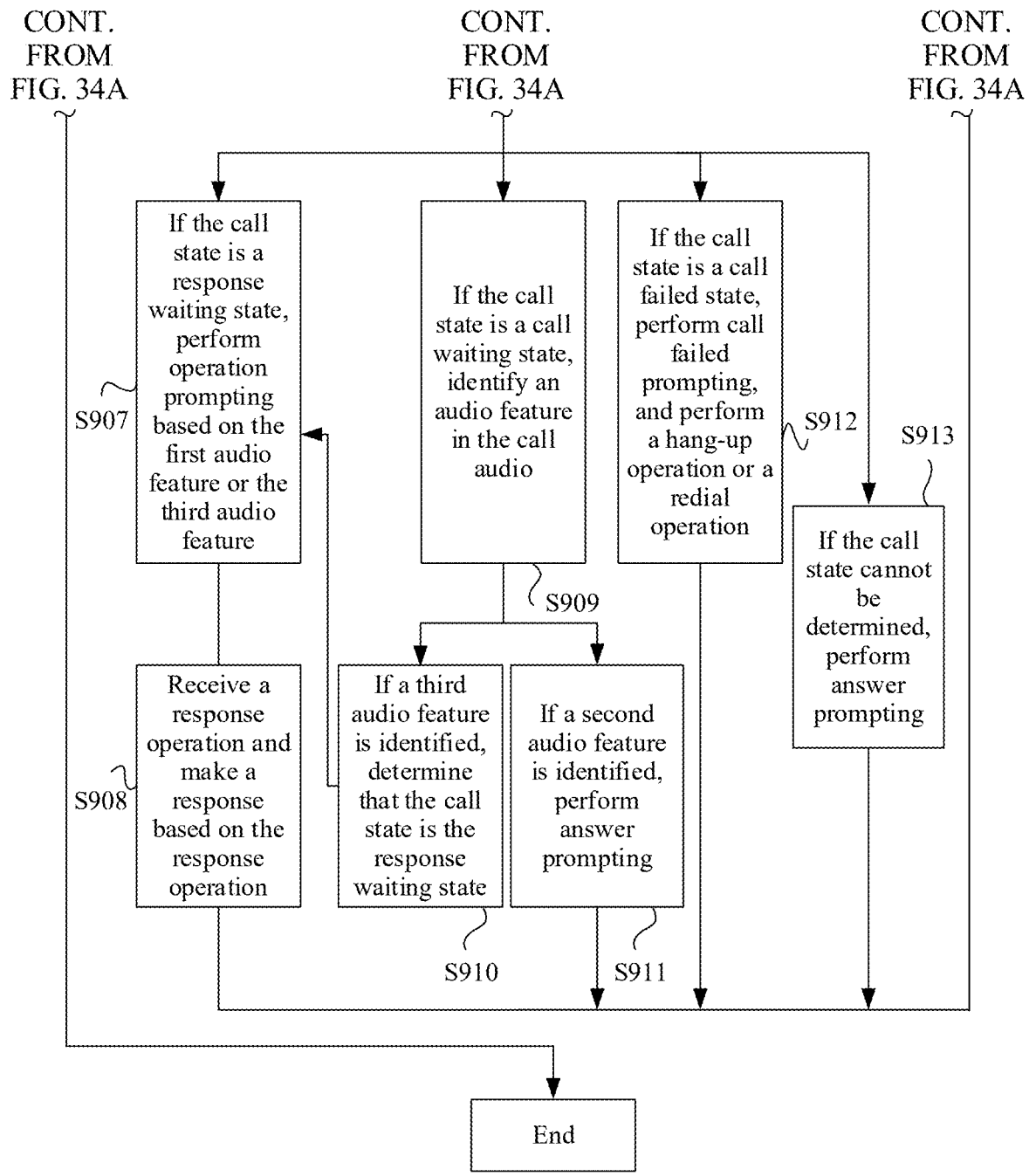

Based on FIG. 32, FIG. 34A and FIG. 34B show an embodiment of enabling call prompting based on a detected called number.

In this embodiment, a call prompt method includes the following steps:

S901: A call device starts a call.

S902: Obtain a called number of the call.

The called number of the call may be obtained from a call request when the call device starts the call. For example, when a call device is used as a calling party, the call device may obtain a called number when receiving user dialing information. When a call device is used as a called party, the call device may obtain a called number in a call request when receiving the call request.

S903: Identify whether the called number is a preset enabling number, if the called number is a preset enabling number, perform S904, and if the called number is not a preset enabling number, directly end the process.

The preset enabling number may be obtained by the call device from a third-party server, or may be set locally. For example, a call device sends a called number feature of a current call to a third-party server. The third-party server performs matching based on the called number feature, and if a response number is matched, determines that the called number of the current call is a preset enabling number. Alternatively, a call device may further periodically download an enabling number database from a third-party server locally, and then during a call, match a called number with a number in the enabling number database, and if a corresponding number is matched, determine that the called number of the current call is a preset enabling number. Alternatively, a plurality of numbers may be pre-stored in a local enabling number database. If a called number during a call matches one of the plurality of pre-stored numbers, it is determined that the called number of the current call is the preset enabling number.

S904: Enable a call prompt mode.

In some implementations, S902 and S903 are an implementation in which the call device automatically identifies the enabled call prompt mode, and settings during prompting is a preset preference. The preset preference may be changed in an operating system of the call device. A setting manner of the preset preference is described in S702. Details are not described herein again.

S905: Identify a first audio feature of received call audio.

A manner of identifying the first audio feature in the call audio is the same as that in S704. Details are not described herein again.

S906: Determine a call state based on the first audio feature. If the call state is a response waiting state, S906 is performed; if the call state is a call waiting state, S908 is performed; if the call state is a call failed state, S911 is performed; or if the call state cannot be determined, S912 is performed.

S907: If the call state is the response waiting state, perform operation prompting based on the first audio feature or a third audio feature.

S908: Receive a response operation, make a response based on the response operation, exit the response waiting state after the response, and perform S905.

In S907 and S908, a manner of performing operation prompting and a manner of performing operation responding are the same as those in S51 and S52. Details are not described herein again.

S909: If the call state is the call waiting state, identify an audio feature in the call audio.

A manner of identifying the audio feature is the same as that in S905. Details are not described herein again.

S910: If the third audio feature is identified, determine that the call state is the response waiting state, and perform S907.

S911: If a second audio feature is identified, perform answer prompting, exit the call waiting state after the prompt, and perform S905.

In S911, a manner of performing answer prompting is the same as those in S41 and S42. Details are not described herein again.

S912: When the call state is the call-failed state, perform call-failed prompting, perform a hang-up operation or a redial operation, exit the call-failed state after the prompt, and perform S905.

In S912, and a manner of performing call-failed prompting and performing a hang-up operation or a redial operation is the same as those in S61 and S62. Details are not described herein again.

S913: If the call status cannot be determined, perform answer prompting, and perform S905 after the prompt.

In this embodiment, a call prompt mode is enabled by identifying a called number, so that call prompting can be performed for a number that has a relatively high probability that call prompting needs to be performed, thereby improving user experience when using a call device.

It should be understood that sequence numbers of the steps do not mean execution sequences in the foregoing embodiments. The execution sequences of the processes should be determined based on functions and internal logic of the processes, and should not be construed as any limitation on the implementation processes of embodiments of this application.

Figure 35:
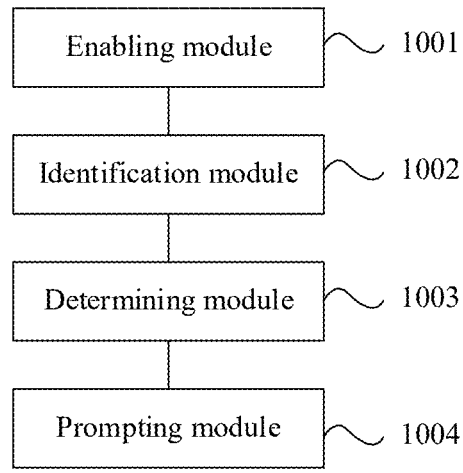
FIG. 35 is a schematic diagram of a structure of a call prompt apparatus according to an embodiment of this application.

Corresponding to the call prompt methods in the foregoing embodiments, FIG. 35 is a block diagram of a structure of a prompt apparatus according to an embodiment of this application. For ease of description, only parts related to embodiments of this application are shown.

Refer to FIG. 35. The apparatus includes: an enabling module 1001, configured to enable a call prompt mode;

an identification module 1002, configured to identify a first audio feature of received call audio;

a determining module 1003, configured to determine a call state based on the first audio feature; and a prompting module 1004, configured to perform call prompting based on a call prompting manner corresponding to the call state.

In some implementations, the enabling module 1001 is specifically configured to: if a preset operation input by a user is received, enable the call prompt mode, or if an automatic enabling condition is met, enable the call prompt mode.

In some implementations, the enabling module 1001 is specifically configured to: receive a touch operation applied to a virtual button having a function of enabling a call prompt mode; or receive a button operation applied to a preset physical button; or receive a preset operation gesture.

In some implementations, the enabling module 1001 is specifically configured to: determine that the user does not listen to the call audio; or identify that a called number of a call is a preset enabling number.

In some implementations, the enabling module 1001 is specifically configured to: determine that an external call apparatus is not enabled to play the call audio, and identify that the user does not listen to the call audio by using an audio listening device of an electronic device.

In some embodiments, the audio listening device includes a receiver and a speaker. The enabling module is specifically configured to: determine that the user does not listen to the call audio by using the receiver, and determine that the user does not listen to the call audio by using the speaker.

In some implementations, the enabling module 1001 is specifically configured to: obtain a distance between the receiver and a face of the user, and if the distance is greater than a preset threshold, determine that the user does not listen to the call audio by using the receiver.

In some implementations, the enabling module 1001 is specifically configured to read audio play setting information of the electronic device. If the call audio is not played by using a speaker in the audio play setting information, it is determined that the user does not listen to the call audio by using the speaker.

Figure 36:
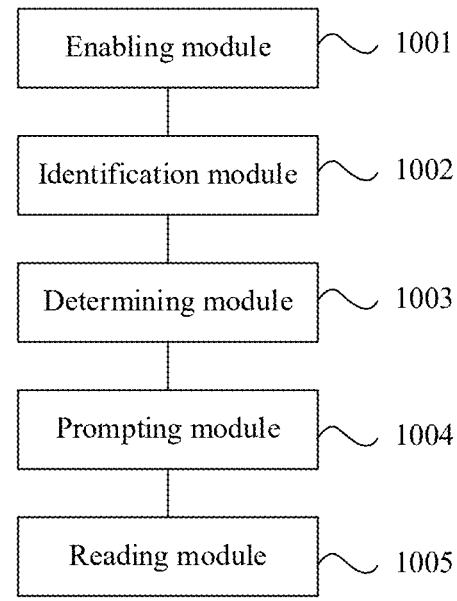
FIG. 36 is a schematic diagram of a structure of a call prompt apparatus according to another embodiment of this application.

Refer to FIG. 36. In some implementations, the apparatus further includes a reading module 1005, configured to read setting information of the preset call prompt mode.

In some implementations, the setting information includes keyword information. The identification module 1002 is specifically configured to identify the first audio feature of the received call audio based on the keyword information included in the setting information.

Figure 37:
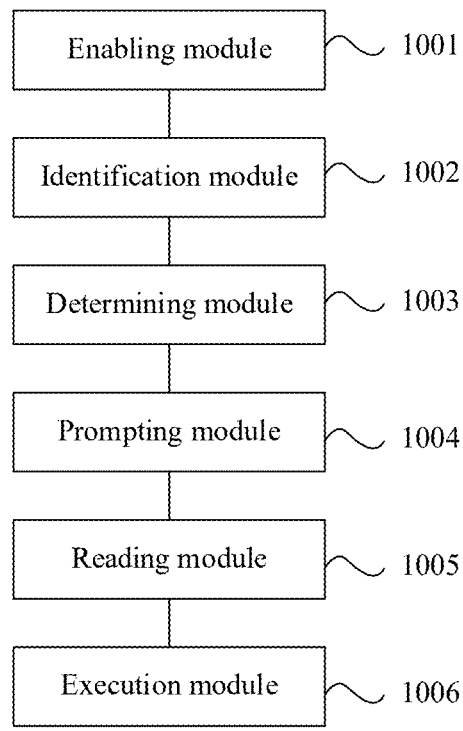
FIG. 37 is a schematic diagram of a structure of a call prompt apparatus according to another embodiment of this application.

Refer to FIG. 37. In some implementations, the setting information includes preset operation information. The apparatus further includes an execution module 1006, configured to perform a preset operation based on the preset operation information.

In a possible implementation, the call state is a call waiting state. The prompting module 1004 is specifically configured to: if a second audio feature indicating that the call waiting state ends is identified in the call audio, perform answer prompting, where the answer prompting is used to indicate the user to answer the call.

In some implementations, the identification module 1002 is further configured to: after it is determined that the call state is the call waiting state, if a third audio feature indicating a response waiting state is identified in the call audio, determine that the call state is switched from the call waiting state to the response waiting state.

Correspondingly, the prompting module 1004 is specifically configured to perform operation prompting based on the third audio feature, where the operation prompting is used to prompt the user to perform call responding.

In some implementations, the call state is a response waiting state.

The prompting module 1004 is specifically configured to perform operation prompting based on the first audio feature. The operation prompting is used to prompt the user to perform call responding.

Figure 38:
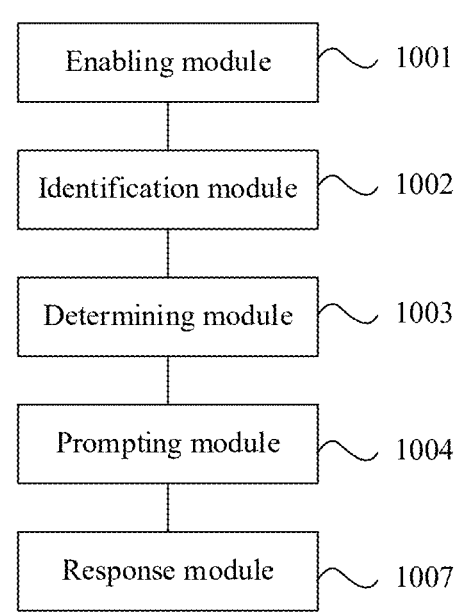
FIG. 38 is a schematic diagram of a structure of a call prompt apparatus according to another embodiment of this application.

Refer to FIG. 38. In some implementations, the apparatus further includes a response module 1007, configured to: receive a response operation of the user; and perform an operation indicated by the response operation.

In some implementations, the call state is a call failed state.

The prompting module 1004 is specifically configured to: perform call failed prompting, and perform a hang-up operation or a redial operation.

In some implementations, the identification module 1004 is specifically configured to: if it is identified that the call device meets a termination condition of the call prompt mode, terminate call prompting.

In some implementations, the identification module 1004 is specifically configured to identify, during a call, a mid-call prompt termination instruction; or identify, during a call, that the user starts to listen to the call audio.

In some implementations, the identification module 1004 is specifically configured to: if it is identified that the call device enables the external call apparatus to play the call audio, or it is identified that the user listens to the call audio by using the audio listening device of the call device, terminate the call prompt mode.

It should be noted that content such as information exchange between the foregoing modules and an execution process thereof is based on a same concept as the method embodiments of this application. For details about specific functions and technical effects of the content, refer to the method embodiments. The details are not described herein again.

It may be clearly understood by a person skilled in the art that, for convenient and brief description, division into the foregoing functional units and modules is merely used as an example for description. During actual application, the foregoing functions can be allocated to different functional units and modules for implementation based on a requirement, that is, an inner structure of the apparatus is divided into different functional units or modules to implement all or some of the functions described above. Functional units and modules in embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units or modules are merely provided for distinguishing between the units or modules, but are not intended to limit the protection scope of this application. For a specific working process of the units or modules in the foregoing system, refer to a corresponding process in the foregoing method embodiments. Details are not described herein again.

An embodiment of this application further provides a network device. The network device includes at least one processor, a memory, and a computer program that is stored in the memory and that can run on the at least one processor. When executing the computer program, the processor implements steps in any one of the foregoing method embodiments.

Figure 39:
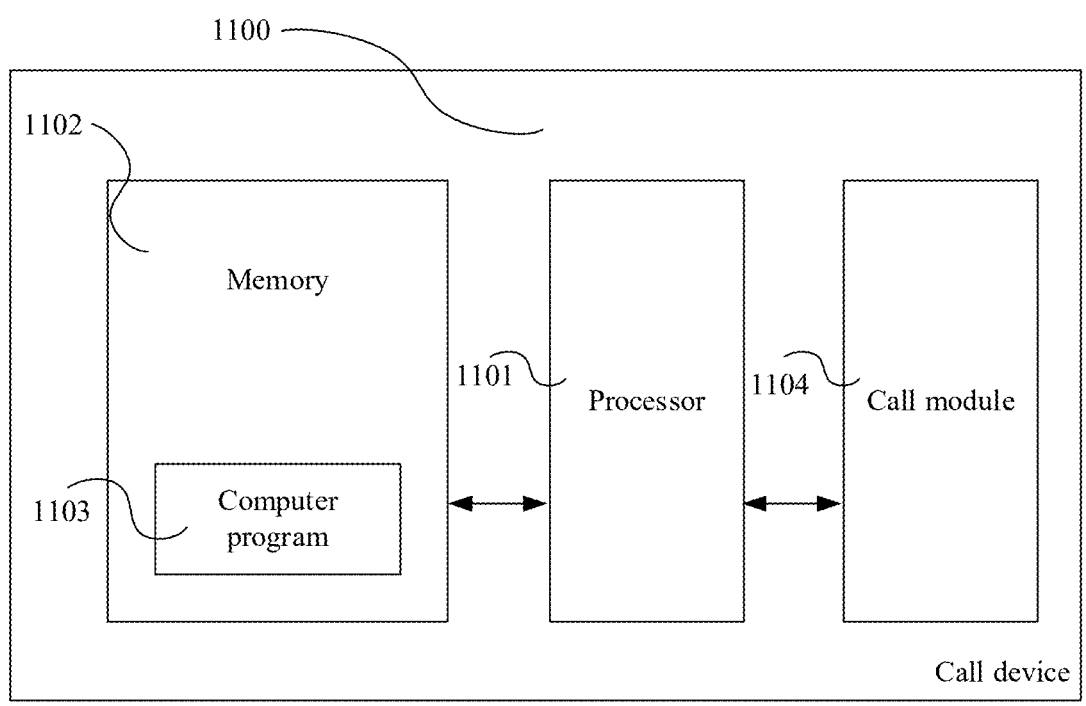
FIG. 39 is a schematic diagram of a structure of a call device according to an embodiment of this application.

FIG. 39 is a schematic diagram of a structure of a call device according to an embodiment of this application. As shown in FIG. 39, the call device 1100 in this embodiment includes: at least one processor 1101 (only one processor is shown in FIG. 39), a memory 1102, a call module 1104, and a computer program 1103 that is stored in the memory 1102 and that can run on the at least one processor 1101. When executing the computer program 1103, the processor 1101 implements steps in any of the foregoing call device method embodiments.

The call device 1100 may be a computing device such as a desktop computer, a notebook computer, a palmtop computer, or a cloud server. The call device may include but is not limited to a processor 1101, a memory 1102, and a call module 1104. A person skilled in the art may understand that FIG. 39 is only an example of the call device 1100, and does not constitute a limitation on the call device 1100. The call device may include more or fewer components than those shown in the figure, or some components may be combined, or different components may be used. For example, the call device may further include an input/output device, or a network access device.

The processor 1101 may be a central processing unit (Central Processing Unit, CPU), or the processor 1101 may be another general purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate or transistor logic component, a discrete hardware component, or the like. The general-purpose processor may be a microprocessor, or the processor may be any conventional processor or the like.

In some embodiments, the memory 1102 may be an internal storage unit of the call device 110, for example, a hard disk or memory of the call device 1100. In some other embodiments, the memory 1102 may alternatively be an external storage device of the call device 1100, for example, a plug-in hard disk, a smart media card (Smart Media Card, SMC), a secure digital (Secure Digital, SD) card, or a flash card (Flash Card) that is provided on the call device 1100. Further, the memory 1102 may include both the internal storage unit and the external storage device that are of the call device 1100. The memory 1102 is configured to store an operating system, an application, a bootloader (BootLoader), data, another program, and the like, for example, program code of a computer program. The memory 1102 may be further configured to temporarily store data that has been output or is to be output.

The call module 1104 may include components such as a communications module that supports communications standards or protocols such as GSM, CDMA, WCDMA, LTE, TD-WCDMA, TD-LTE and 5G NR, a slot configured to access a SIM card, and an antenna, and is configured to communicate with another call device.

An embodiment of this application further provides a computer-readable storage medium. The computer-readable storage medium stores a computer program. When the computer program is executed by a processor, steps in the foregoing method embodiments can be implemented.

An embodiment of this application provides a computer program product. When the computer program product runs on a call device, the call device implements the steps in the foregoing method embodiments when executing the computer program product.

An embodiment of this application provides a chip system. The chip system includes a memory and a processor. The processor executes a computer program stored in the memory, to implement steps in the foregoing method embodiments.

An embodiment of this application provides a chip system. The chip system includes a processor, the processor is coupled to the computer-readable storage medium according to the fourth aspect, and the processor executes the computer program stored in the computer-readable storage medium, to implement steps in the foregoing method embodiments.

When the integrated unit is implemented in the form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code. The computer program code may be in a source code form, an object code form, an executable file form, some intermediate forms, or the like. The computer-readable medium may include at least any entity or apparatus that can carry the computer program code to a call device, a recording medium, a computer memory, a read-only memory (ROM, Read-Only Memory), a random access memory (RAM, Random Access Memory), an electrical carrier signal, a telecommunications signal, and a software distribution medium, for example, a USB flash drive, a removable hard disk, a magnetic disk, or an optical disk. In some jurisdictions, the computer-readable medium cannot be the electrical carrier signal or the telecommunications signal according to legislation and patent practices.

In the foregoing embodiments, descriptions of all embodiments have respective focuses. For a part that is not described in detail or recorded in an embodiment, refer to related descriptions in other embodiments.

A person skilled in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different method to implement the described functions for each particular application scenario, but it should not be considered that the implementation goes beyond the scope of this application.

In embodiments provided in this application, it should be understood that the disclosed call prompt method, apparatus, and the call device may be implemented in another manner. For example, the described embodiments of the call prompt apparatus and the call device are merely exemplary. For example, the module or unit division is merely logical function division, and there may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   enabling a call prompt mode based on determining that an automatic enabling condition is met;
   identifying, by an electronic device, a first audio feature of received call audio of a call after the call is connected or the call fails;
   determining, by the electronic device, a call state based on the first audio feature; and
   performing, by the electronic device, call prompting based on a call prompting manner corresponding to the call state, the call state being one of a call waiting state, a response waiting state, or a call failed state, wherein the determining that the automatic enabling condition is met comprises:
   determining, by the electronic device, that a user does not listen to the received call audio; or
   identifying, by the electronic device, that a called number of the call is a preset enabling number.

2. The method according to claim 1, wherein the determining that the user does not listen to the received call audio comprises:
   determining that an external call apparatus is not enabled to play the received call audio; and
   identifying that the user does not listen to the received call audio by using an audio listening device of the electronic device.

3. The method according to claim 2, wherein the audio listening device comprises a receiver and a speaker, and
   wherein the identifying that the user does not listen to the received call audio by using the audio listening device of the electronic device comprises:
   determining that the user does not listen to the received call audio by using the receiver; and
   determining that the user does not listen to the received call audio by using the speaker.

4. The method according to claim 3, wherein the determining that the user does not listen to the received call audio by using the receiver comprises:
   obtaining a distance between the receiver and a face of the user; and
   determining that the user does not listen to the received call audio by using the receiver based on the distance being greater than a preset threshold.

5. The method according to claim 3, wherein the determining that the user does not listen to the received call audio by using the speaker comprises:
   retrieving audio play setting information of the electronic device; and
   determining that the user does not listen to the received call audio by using the speaker based on the received call audio not being played by using the speaker in the audio play setting information.

6. The method according to claim 1, wherein the method further comprises:
   retrieving setting information of a preset call prompt mode after the enabling the call prompt mode.

7. The method according to claim 6, wherein the setting information comprises keyword information, and
   wherein the identifying the first audio feature of the received call audio comprises:
   identifying the first audio feature of the received call audio based on the keyword information in the setting information.

8. The method according to claim 6, wherein the setting information comprises preset operation information, and
   wherein the method further comprises:
   performing a preset operation based on the preset operation information after the enabling the call prompt mode.

9. The method according to claim 1, wherein the call state is the call waiting state, and
   wherein the performing the call prompting based on the call prompting manner corresponding to the call state comprises:
   performing answer prompting based on a second audio feature indicating that the call waiting state ends being identified in the received call audio, wherein the answer prompting indicates to the user to answer the call.

10. The method according to claim 1, further comprising:
    after determination that the call state is the call waiting state, determining that the call state is switched from the call waiting state to the response waiting state based on a third audio feature indicating the response waiting state being identified in the received call audio,
    wherein the performing the call prompting based on the call prompting manner corresponding to the call state comprises:
    performing operation prompting based on the third audio feature, wherein the operation prompting prompts the user to perform call responding.

11. The method according to claim 1, wherein the call state is the response waiting state, and
    wherein the performing the call prompting based on the call prompting manner corresponding to the call state comprises:

performing operation prompting based on the first audio feature, wherein the operation prompting prompts the user to perform call responding.

12. The method according to claim 10, wherein the method further comprises:
after the performing the operation prompting:
receiving a response operation of the user; and
performing an operation indicated by the response operation.

13. The method according to claim 1, wherein the call state is the call failed state, and
wherein the performing the call prompting based on the call prompting manner corresponding to the call state comprises:
performing call failed prompting; and
performing a hang-up operation or a redial operation.

14. A device comprising:
at least one processor; and
a memory storing programming, the programming including instructions that, when executed by the at least one processor, cause the device to perform operations including:
enabling a call prompt mode based on determining that an automatic enabling condition is met;
identifying a first audio feature of received call audio of a call after the call is connected or the call fails;
determining a call state based on the first audio feature; and
performing call prompting based on a call prompting manner corresponding to the call state, the call state being one of a call waiting state, a response waiting state, or a call failed state, wherein the determining that the automatic enabling condition is met comprises:
determining that a user does not listen to the received call audio; or
identifying that a called number of the call is a preset enabling number.

15. The device according to claim 14, wherein the determining that the user does not listen to the received call audio comprises:
determining that an external call apparatus is not enabled to play the received call audio; and
identifying that the user does not listen to the received call audio by using an audio listening device of the device.

16. The device according to claim 15, wherein the audio listening device comprises a receiver and a speaker, and
wherein the identifying that the user does not listen to the received call audio by using the audio listening device of the device comprises:
determining that the user does not listen to the received call audio by using the receiver; and
determining that the user does not listen to the received call audio by using the speaker.

17. The device according to claim 16, wherein the determining that the user does not listen to the received call audio by using the receiver comprises:
obtaining a distance between the receiver and a face of the user; and
determining that the user does not listen to the received call audio by using the receiver based on the distance being greater than a preset threshold.

18. The device according to claim 16, wherein the determining that the user does not listen to the received call audio by using the speaker comprises:
retrieving audio play setting information of the device; and
determining that the user does not listen to the received call audio by using the speaker based on the received call audio not being played by using the speaker in the audio play setting information.

19. The device according to claim 14, wherein the operations further comprise:
retrieving setting information of a preset call prompt mode after the enabling the call prompt mode.

20. The device according to claim 19, wherein the setting information comprises keyword information, and
wherein the identifying the first audio feature of the received call audio comprises:
identifying the first audio feature of the received call audio based on the keyword information in the setting information.

* * * * *